(12) United States Patent
Knapp

(10) Patent No.: US 9,108,543 B1
(45) Date of Patent: Aug. 18, 2015

(54) PORTABLE CHILD RESTRAINT SEAT

(71) Applicant: The C.E. White Co., New Washington, OH (US)

(72) Inventor: Robert Knapp, Ft. Myers, FL (US)

(73) Assignee: THE C.E. WHITE CO., New Washington, OH (US)

( * ) Notice: Subject to any disclaimer, the term of this patent is extended or adjusted under 35 U.S.C. 154(b) by 247 days.

(21) Appl. No.: 13/670,855

(22) Filed: Nov. 7, 2012

Related U.S. Application Data

(60) Provisional application No. 61/557,557, filed on Nov. 9, 2011.

(51) Int. Cl.
*B60N 2/28* (2006.01)
*B60N 2/26* (2006.01)
*B60R 22/10* (2006.01)

(52) U.S. Cl.
CPC .. *B60N 2/28* (2013.01); *B60N 2/26* (2013.01); *B60N 2/2875* (2013.01); *B60R 22/105* (2013.01)

(58) Field of Classification Search
CPC ............................... B60N 2/28; B60N 2/2875
USPC ................. 297/250.1, 253, 254, 255
See application file for complete search history.

(56) References Cited

U.S. PATENT DOCUMENTS

| | | | |
|---|---|---|---|
| 4,715,652 A * | 12/1987 | Ward | 297/252 |
| 4,854,638 A | 8/1989 | Marcus et al. | |
| 4,900,086 A | 2/1990 | Steward | |
| 5,158,337 A * | 10/1992 | Leggett | 297/250.1 |
| 5,265,828 A | 11/1993 | Bennington | |
| 5,310,242 A * | 5/1994 | Golder | 297/14 |
| 5,797,654 A | 8/1998 | Stroud | |
| 5,810,437 A | 9/1998 | Sharpe | |
| 5,829,834 A | 11/1998 | Silverman | |
| 6,015,190 A * | 1/2000 | Wend | 297/378.1 |
| 6,390,552 B1 | 5/2002 | Veron | |
| 6,543,722 B1 | 4/2003 | Parrow et al. | |
| 6,616,242 B1 * | 9/2003 | Stoll | 297/485 |
| 6,783,135 B1 | 8/2004 | Nord | |
| 6,886,889 B2 | 5/2005 | Vits et al. | |
| 7,029,067 B2 | 4/2006 | Vits et al. | |
| 7,040,696 B2 | 5/2006 | Vits et al. | |
| 7,063,389 B2 | 6/2006 | Kennedy, Sr. | |
| 7,100,976 B1 | 9/2006 | Desalve | |
| 7,131,703 B1 | 11/2006 | Sheridan et al. | |
| 7,144,085 B2 | 12/2006 | Vits et al. | |
| 7,347,494 B2 | 3/2008 | Boyle et al. | |
| 7,364,199 B2 | 4/2008 | Elizondo et al. | |
| 7,374,241 B2 | 5/2008 | Gold et al. | |
| 7,380,878 B2 | 6/2008 | Clement et al. | |
| 7,422,276 B2 | 9/2008 | Flannery | |
| 7,488,038 B2 | 2/2009 | Boyle et al. | |
| 7,571,961 B2 | 8/2009 | Gold et al. | |
| 7,740,313 B1 | 6/2010 | Hei et al. | |
| 7,770,969 B2 | 8/2010 | Boyle et al. | |
| 7,883,143 B2 | 2/2011 | Reynolds | |
| 7,954,895 B2 | 6/2011 | Freeman et al. | |

(Continued)

*Primary Examiner* — Elizabeth A Plummer
(74) *Attorney, Agent, or Firm* — Calfee, Halter & Griswold LLP

(57) ABSTRACT

A portable seat assembly for safely securing an occupant such as a child within a vehicle is provided. The portable seat assembly readily converts between an expanded state and a collapsed state. In the expanded state, the portable seat assembly can secure the occupant in the vehicle. In the collapsed state, the portable seat assembly is readily carried and/or stowed by a user.

7 Claims, 63 Drawing Sheets

(56) References Cited

U.S. PATENT DOCUMENTS

| | | |
|---|---|---|
| 2003/0020307 A1* | 1/2003 | Dunham .................... 297/250.1 |
| 2003/0025380 A1 | 2/2003 | Vits et al. |
| 2003/0090134 A1* | 5/2003 | James et al. ............... 297/250.1 |
| 2003/0173817 A1 | 9/2003 | Vits et al. |
| 2004/0061366 A1* | 4/2004 | Meeker et al. ............. 297/250.1 |
| 2004/0155506 A1 | 8/2004 | Gentry |
| 2004/0227381 A1 | 11/2004 | Redzisz et al. |
| 2004/0239164 A1 | 12/2004 | Vits et al. |
| 2005/0269846 A1 | 12/2005 | Vits et al. |
| 2007/0001495 A1 | 1/2007 | Boyle et al. |
| 2007/0040441 A1 | 2/2007 | Boyle et al. |
| 2007/0052278 A1 | 3/2007 | Jones |
| 2007/0236061 A1* | 10/2007 | Meeker et al. ............. 297/250.1 |
| 2008/0018152 A1 | 1/2008 | Vadai |
| 2008/0179358 A1 | 7/2008 | Redzisz et al. |
| 2008/0203793 A1 | 8/2008 | Boyle et al. |
| 2008/0224514 A1* | 9/2008 | Zink et al. .................... 297/255 |
| 2008/0258525 A1* | 10/2008 | Mendenhall ............... 297/250.1 |
| 2008/0290707 A1 | 11/2008 | Schramek-Flye |
| 2010/0052385 A1 | 3/2010 | Martini |
| 2010/0176635 A1 | 7/2010 | Glance |
| 2010/0237667 A1 | 9/2010 | Guy et al. |
| 2010/0244517 A1 | 9/2010 | Britton et al. |
| 2010/0264706 A1* | 10/2010 | Vogt et al. ................. 297/250.1 |

* cited by examiner

206

206

206

390

DETAIL A

PORTABLE CHILD RESTRAINT SEAT

RELATED APPLICATION

The present application is being filed as a U.S. non-provisional patent application claiming priority/benefit under 35 U.S.C. §119(e) from the U.S. provisional patent application having Ser. No. 61/557,557 and filed on Nov. 9, 2011, the entire disclosure of which is incorporated herein by reference.

FIELD

The general inventive concepts relate to seat assemblies and, in particular, to portable child seat assemblies.

BACKGROUND

Child seats for safely securing a child occupant inside a vehicle are known in the art (see, e.g., U.S. Pat. No. 7,954,895 assigned to Britax Excelsior Limited (GB), the entire disclosure of which is herein incorporated by reference). Typically, child seats are situated on and secured to seats that are installed in the vehicle. These installed seats and/or their restraints (e.g., belts) are generally not sized appropriately for the child occupant, thereby necessitating use of the child seats. Given their construction, child seats are often rigid, heavy, bulky items that are not readily portable over a considerable distance. Thus, there is a need for an improved child seat for safely securing a child occupant inside a vehicle, wherein the child seat is also readily portable.

SUMMARY

The general inventive concepts relate to and contemplate seat assemblies and, in particular, portable child seat assemblies. According to the general inventive concepts, the seat assemblies can readily convert from an expanded state to a collapsed state, and vice versa.

In one exemplary aspect of the general inventive concepts, a portable seat assembly can selectively assume one of an expanded state and a collapsed state. The seat assembly includes a seat portion and a back portion, with the back portion having a lower part and an upper part. The seat portion and the back portion are pivotably connected to one another (e.g., about an axis). In the expanded state, the seat portion and the back portion are positioned relative to one another such that an angle θ is formed between the seat portion and the lower and upper parts of the back portion. In the collapsed state, the seat portion and the back portion are positioned relative to one another such that the seat portion is positioned or otherwise situated between the lower part of the back portion and the upper part of the back portion.

In one exemplary embodiment, the angle θ is 90°. In one exemplary embodiment, the angle θ is greater than 90°. In one exemplary embodiment, the angle θ is between 85° and 95°.

In one exemplary embodiment, the seat portion includes a rigid seat member and a soft seat member. In one exemplary embodiment, the seat portion includes a seat cover, wherein the rigid seat member and the soft seat member fit within and are substantially surrounded or enclosed by the seat cover. In one exemplary embodiment, the rigid seat member is plastic. In one exemplary embodiment, the soft seat member is foam. In one exemplary embodiment, the seat cover is one of fabric, vinyl, and leather.

In one exemplary embodiment, the lower part of the back portion is a lower rigid back member and the upper part of the back portion is an upper rigid back member. In one exemplary embodiment, the back portion includes a back cover, and wherein the lower rigid back member and the upper rigid back member fit within and are substantially surrounded or enclosed by the back cover. In one exemplary embodiment, the lower rigid back member is plastic. In one exemplary embodiment, the upper rigid back member is plastic. In one exemplary embodiment, the back cover is one of fabric, vinyl, and leather.

In one exemplary embodiment, the back cover includes a lower flexible portion and an upper flexible portion, wherein the lower flexible portion is located between the lower rigid back member and the upper rigid back member, and wherein the upper flexible portion is located above the upper rigid back member.

In one exemplary embodiment, the back cover includes an upper flap, and the upper flap extends above the upper flexible portion of the back portion. In one exemplary embodiment, when the seat portion and the back portion are positioned relative to one another in the collapsed state, the seat portion is surrounded by the lower part of the back portion, the upper part of the back portion, the lower flexible portion of the back cover, and the upper flap of the back cover.

In one exemplary embodiment, the portable seat assembly includes a connecting member, wherein the connecting member connects the seat portion and the lower part of the back portion.

In one exemplary embodiment, the portable seat assembly includes restraining means for securing an occupant in the seat assembly in the expanded state. In one exemplary embodiment, the restraining means includes at least one belt. In one exemplary embodiment, the restraining means is a five-point harness.

In one exemplary embodiment, the portable seat assembly includes mounting means for securing the seat assembly to fixed structure within a vehicle. In one exemplary embodiment, the fixed structure is a seat of the vehicle. In one exemplary embodiment, the seat of the vehicle includes a seat base and a seat back, and an opening is formed where the seat base abuts the seat back. In one exemplary embodiment, the mounting means interfaces with at least one of the seat base, the seat back, and the opening.

In one exemplary embodiment, the mounting means includes a front mount assembly, a lower mount assembly, and a rear mount assembly. The lower mount assembly extends through the opening between the seat base and the seat back. The front mount assembly wraps around the seat base and interfaces with the lower mount assembly. The rear mount assembly wraps around the seat back and interfaces with the lower mount assembly.

In one exemplary embodiment, when the seat assembly is mounted to the fixed structure, the angle θ is substantially fixed.

In one exemplary embodiment, the portable seat assembly includes a carrying strap, wherein the carrying strap facilitates transport of the seat assembly in the collapsed state.

Numerous other aspects, advantages and/or features of the general inventive concepts will become more readily apparent from the following detailed description of exemplary embodiments, from the eventual claims, and from the accompanying drawings and related papers being submitted herewith.

BRIEF DESCRIPTION OF THE DRAWINGS

The general inventive concepts as well as embodiments and advantages thereof are described below in greater detail, by way of example, with reference to the drawings in which:

FIG. 1A is a perspective view of the portable seat assembly. FIG. 1B is a front elevational view of the portable seat assembly. FIG. 1C is a top plan view of the portable seat assembly. FIG. 1D is a right side elevational view of the portable seat assembly. FIG. 1E is a rear elevational view of the portable seat assembly.

FIG. 4A is a perspective view of the seat cover. FIG. 4B is a bottom plan view of the seat cover. FIG. 4C is a front elevational view of the seat cover. FIG. 4D is a right side elevational view of the seat cover, the left side being a mirror image thereof.

FIG. 5A is a perspective view of the rigid seat insert. FIG. 5B is a top plan view of the rigid seat insert. FIG. 5C is a left side elevational view of the rigid seat insert, the right side being a mirror image thereof. FIG. 5D is a rear elevational view of the rigid seat insert.

FIG. 6A is a perspective view of the soft seat insert. FIG. 6B is a front elevational view of the soft seat insert, the rear being a mirror image thereof. FIG. 6C is a right side elevational view of the soft seat insert, the left side being a mirror image thereof.

FIG. 7A is a perspective view of the back cover. FIG. 7B is a front elevational view of the back cover. FIG. 7C is a rear elevational view of the back cover. FIG. 7D is a right side elevational view of the back cover, the left side being a mirror image thereof.

FIG. 8A is a perspective view of the upper rigid back insert. FIG. 8B is a rear elevational view of the upper rigid back insert. FIG. 8C is a bottom plan view of the upper rigid back insert. FIG. 8D is a right side elevational view of the upper rigid back insert, the left side being a mirror image thereof.

FIG. 9A is a perspective view of the support rod. FIG. 9B is a top plan view of the support rod. FIG. 9C is a front elevational view of the support rod.

FIG. 10A is a perspective view of the lower rigid back insert. FIG. 10B is a front elevational view of the lower rigid back insert. FIG. 10C is a bottom plan view of the lower rigid back insert. FIG. 10D is a right side elevational view of the lower rigid back insert, the left side being a mirror image thereof.

FIG. 11A is a perspective view of the lower soft back insert. FIG. 11B is a front elevational view of the lower soft back insert, the rear being a mirror image thereof. FIG. 11C is a right side elevational view of the lower soft back insert, the left side being a mirror image thereof.

FIG. 12A is a perspective view of the rigid member. FIG. 12B is a front elevational view of the rigid member, the rear being a mirror image thereof. FIG. 12C is a right side elevational view of the rigid member, the left side being a mirror image thereof.

FIG. 13A is a perspective view of the connecting bracket. FIG. 13B is a top plan view of the connecting bracket. FIG. 13C is a front elevational view of the connecting bracket. FIG. 13D is a right side elevational view of the connecting bracket, the left side being a mirror image thereof.

FIG. 15A is a perspective view of the five-point harness. FIG. 15B is a front elevational view of the five-point harness. FIG. 15C is a right side elevational view of the five-point harness.

FIG. 17A is a perspective view of the lower mounting assembly. FIG. 17B is a front elevational view of the lower mounting assembly.

FIG. 18A is a front elevational view of the rear mounting assembly. FIG. 18B is a top plan view of the rear mounting assembly. FIG. 18C is a right side elevational view of the connecting bracket, the left side being a mirror image thereof.

FIG. 19A is a perspective view of the carrying strap. FIG. 19B is a top plan view of the carrying strap. FIG. 19C is a front side elevational view of the carrying strap, the rear side being a mirror image thereof.

FIG. 20A is a perspective view of the portable seat assembly on the vehicle seat. FIG. 20B is a front elevational view of the portable seat assembly on the vehicle seat. FIG. 20C is a rear elevational view of the portable seat assembly on the vehicle seat.

DETAILED DESCRIPTION

Figure 1A:
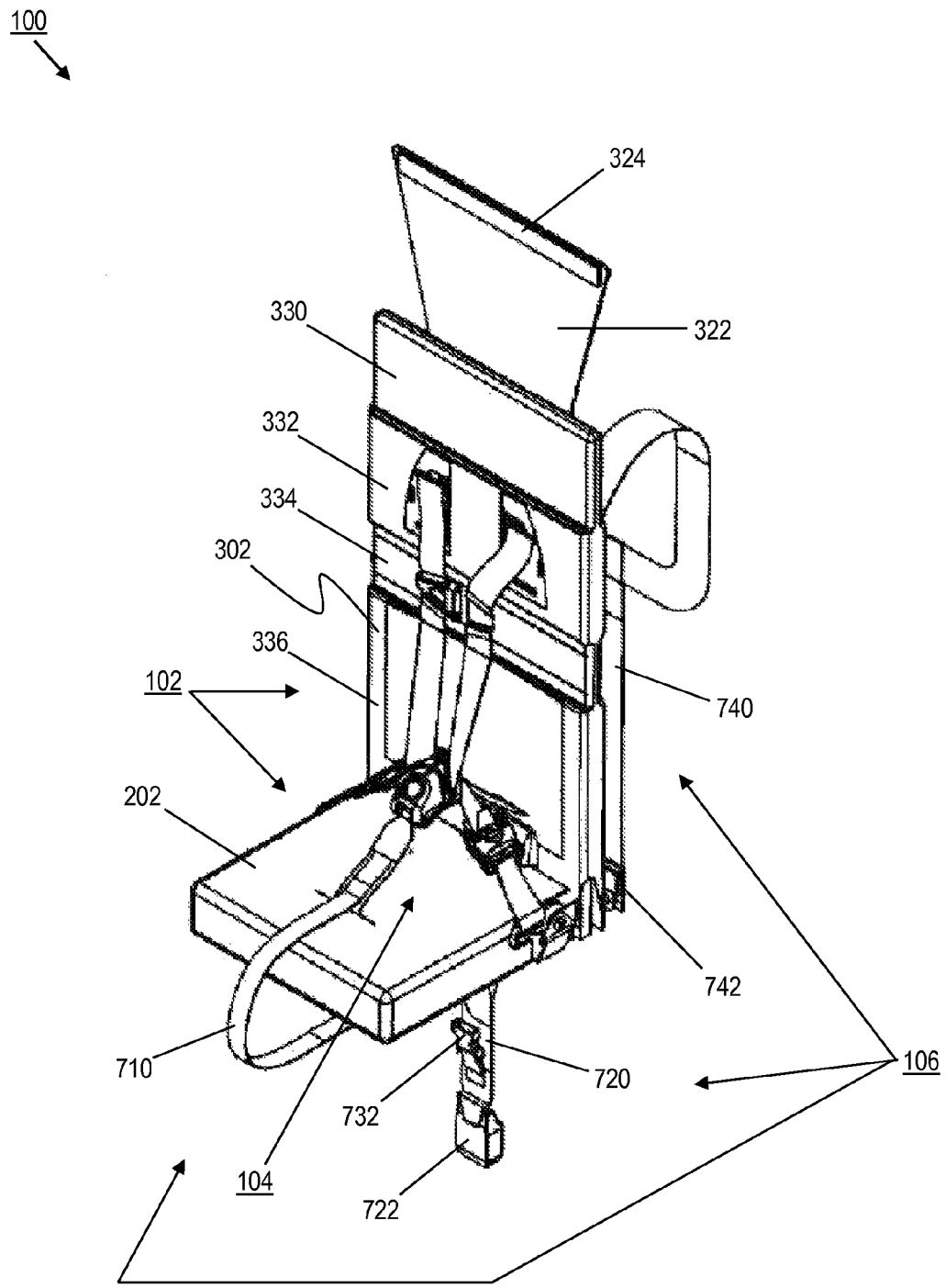
FIGS. 1A-1E show a portable seat assembly according to an exemplary embodiment, wherein the portable seat assembly is in an expanded state.
Figure 1B:
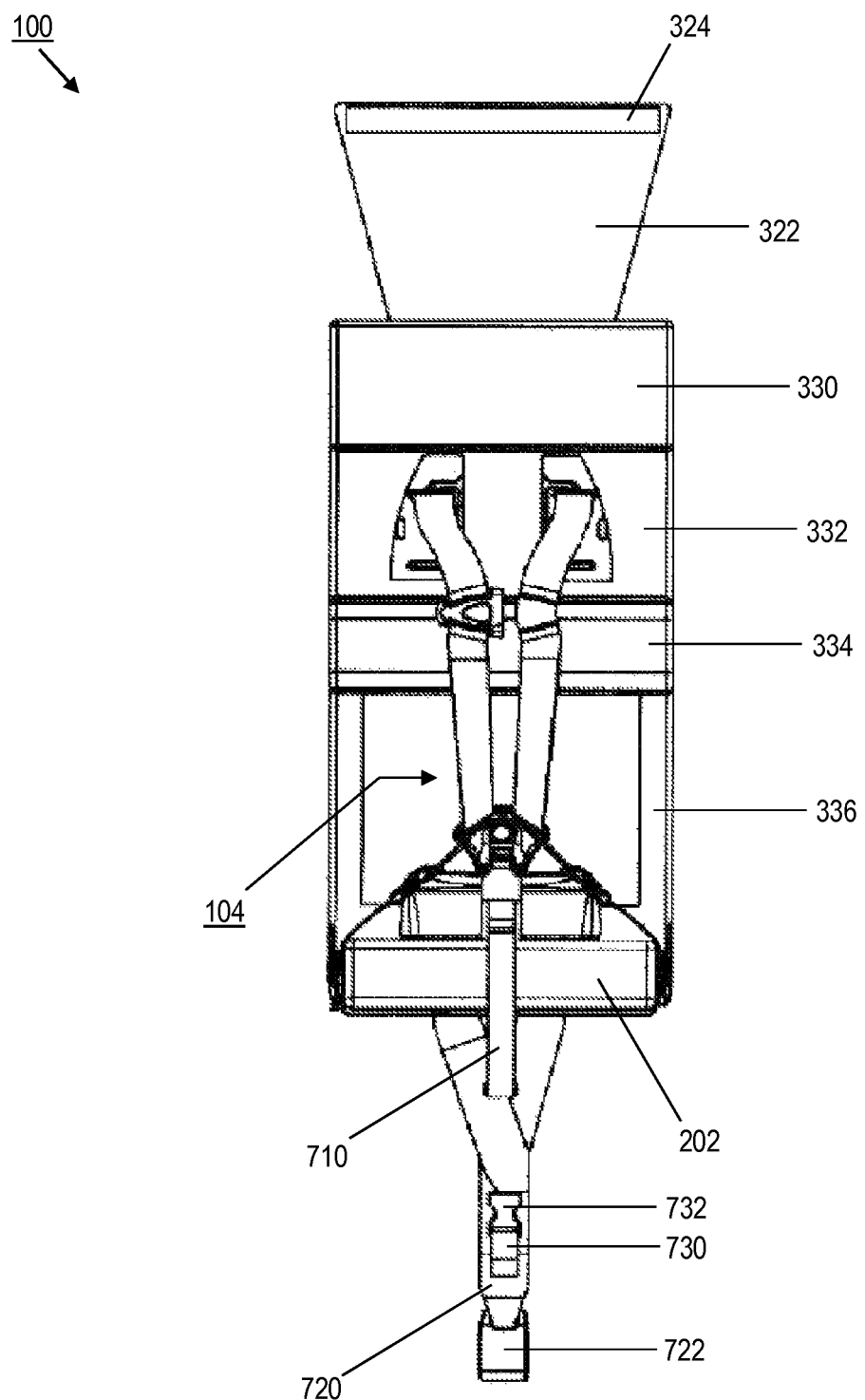
Figure 1C:
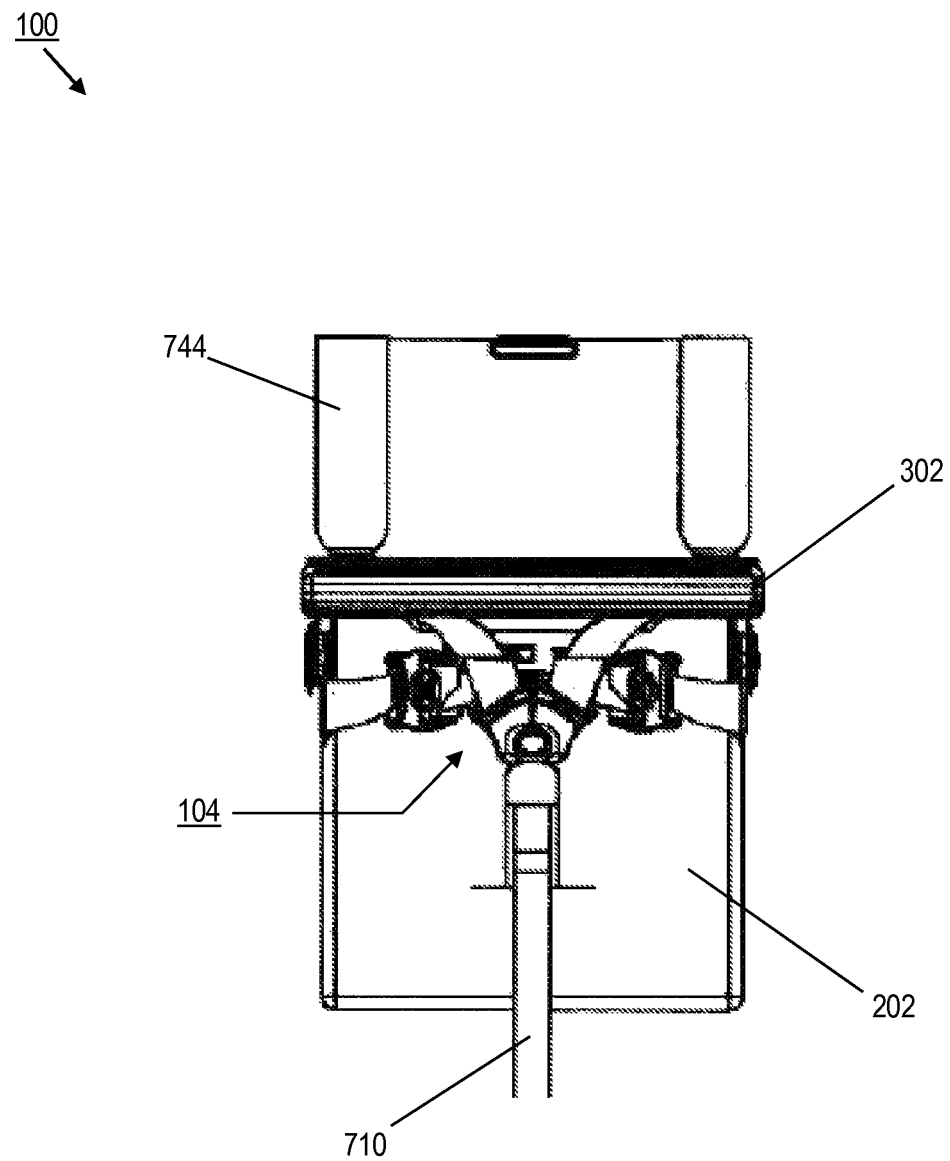
Figure 1D:
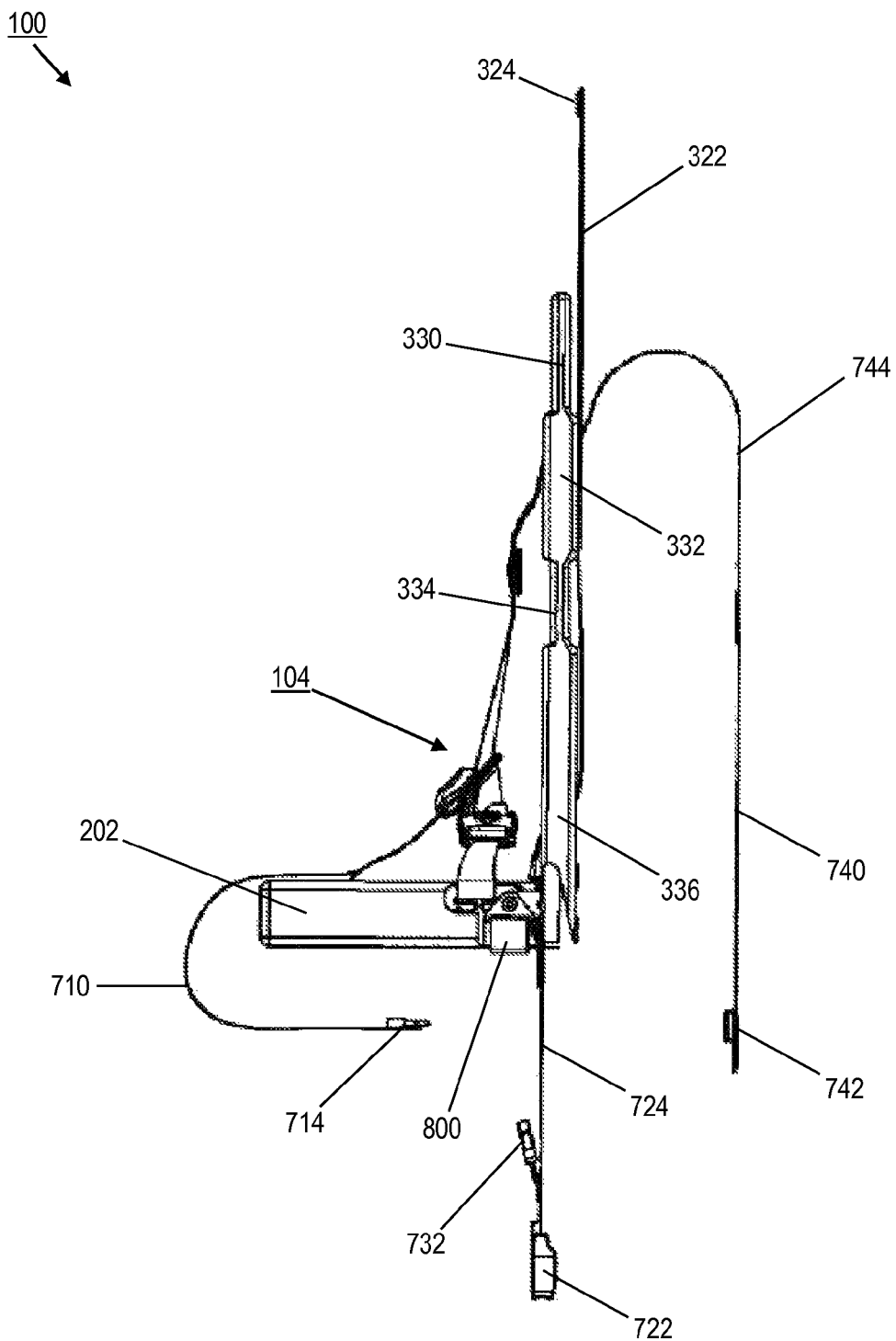

While the general inventive concepts are susceptible of embodiment in many different forms, there are shown in the drawings and will be described herein in detail specific embodiments thereof with the understanding that the present disclosure is to be considered as an exemplification of the principles of the general inventive concepts. Accordingly, the general inventive concepts are not intended to be limited to the specific embodiments illustrated herein.

The general inventive concepts contemplate a portable seat assembly that is designed to alternate between an expanded state (see FIGS. 1A-1E and 2) and a collapsed state (see FIG. 3), as disclosed herein. In the expanded state, the portable seat assembly is operable to mount, install, attach, or otherwise secure to an installed seat or related structure of a vehicle. Once so mounted, the portable seat assembly can safely secure a child occupant within the vehicle. In the expanded state, the portable seat assembly is able to mount to a variety of vehicle seats having different sizes and/or shapes, such as those found in cars, trucks, buses, boats, airplanes, etc. In one exemplary embodiment, the portable seat assembly is operable to mount to an installed or native vehicle seat having an opening or separation between a back rest of the vehicle seat and a seat portion of the vehicle seat.

In the collapsed state, the portable seat assembly assumes a relatively compact form and is operable to be readily carried by a person. In one exemplary embodiment, the portable seat assembly weighs between 7 lb. and 8 lb. In one exemplary embodiment, the portable seat assembly weighs approximately 7 lb. and 8 oz. In one exemplary embodiment, the portable seat assembly weighs less than 8 lb.

As described herein, the portable seat assembly may include a carrying strap or similar structure to facilitate its transport. With the aid of such a carrying strap, a person might carry the portable seat assembly using a single hand. In one exemplary embodiment, the portable seat assembly includes a carrying strap of sufficient length for the portable seat assembly to be worn over a shoulder of a person (e.g., like a purse). In one exemplary embodiment, the portable seat assembly includes two or more carrying straps of sufficient length for the portable seat assembly to be worn like a backpack.

In the collapsed state, the portable seat assembly has relatively compact dimensions. In one exemplary embodiment, the portable seat assembly has dimensions of approximately 5.88 in. by 13.00 in. by 13.50 in. (width/length/height), when in the collapsed state. In one exemplary embodiment, the portable seat assembly has a width of less than 6 in., when in the collapsed state. In one exemplary embodiment, the portable seat assembly has a length of less than 14 in., when in the collapsed state. In one exemplary embodiment, the portable seat assembly has a height of less than 14 in., when in the collapsed state. Thus, in addition to being readily portable in the collapsed state, the portable seat assembly is also easy to store. For example, the portable seat assembly in the collapsed state might be easily stored in an overhead bin on a plane.

In one exemplary embodiment, the portable seat assembly is structured to be buoyant (e.g., made from buoyant materials and/or combined with buoyant materials), such that the portable seat assembly in the collapsed state could also function as a flotation device.

In one exemplary embodiment, the portable seat assembly is structured to be relatively soft (e.g., made from or covered with soft materials and/or combined with soft materials), such that the portable seat assembly in the collapsed state could also function as a pillow or cushion.

In one exemplary embodiment, the portable seat assembly is made of foam cushioning surrounded by or otherwise contained by a vinyl cover. In one exemplary embodiment, the portable seat assembly is made primarily from urethane foam.

A portable seat assembly 100, according to one exemplary embodiment, is illustrated in FIGS. 1A-1E, 2, and 3. The portable seat assembly 100 includes supporting means 102, structure, or the like; restraining means 104, structure, or the like; and mounting means 106, structure or the like. The supporting means 102 is for supporting an occupant in and/or on the portable seat assembly 100. The restraining means 104 is for securing the occupant in and/or on the portable seat assembly 100. The mounting means 106 is for mounting the portable seat assembly 100 to an installed or secured vehicle seat, frame, support, or similar structure.

Figure 6A:
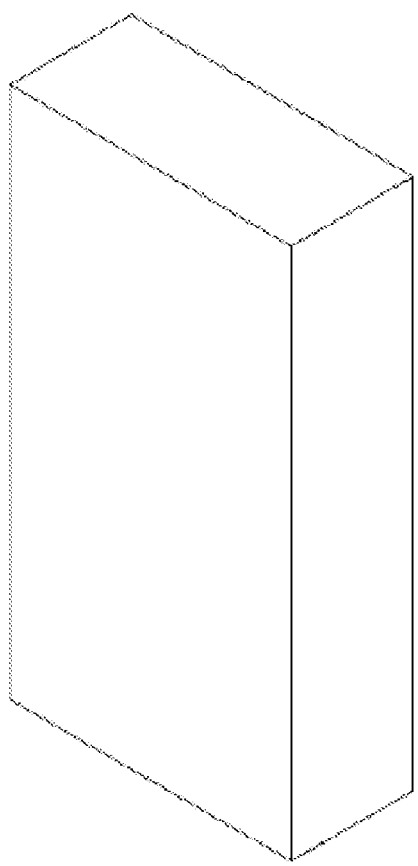
FIGS. 6A-6C show a soft seat insert, according to an exemplary embodiment, which is used in the portable seat assembly of FIG. 1.
Figure 6B:
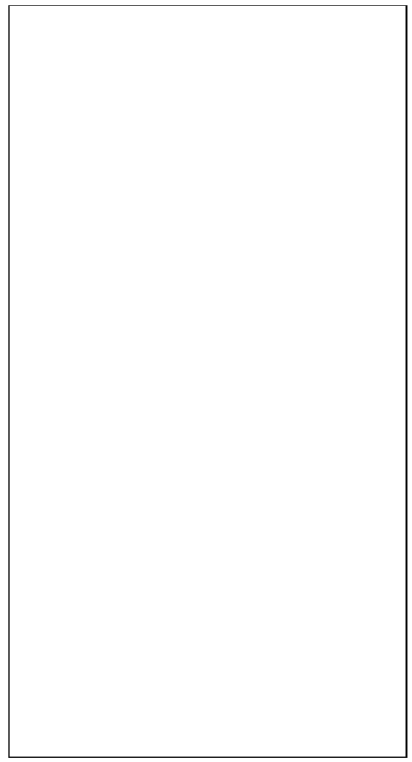
Figure 6C:
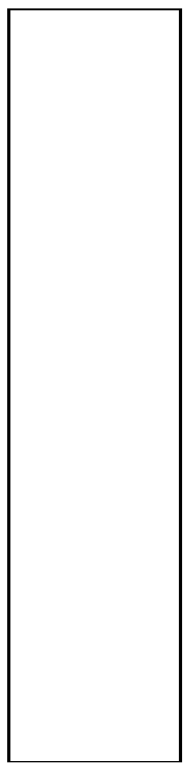
Figure 9A:
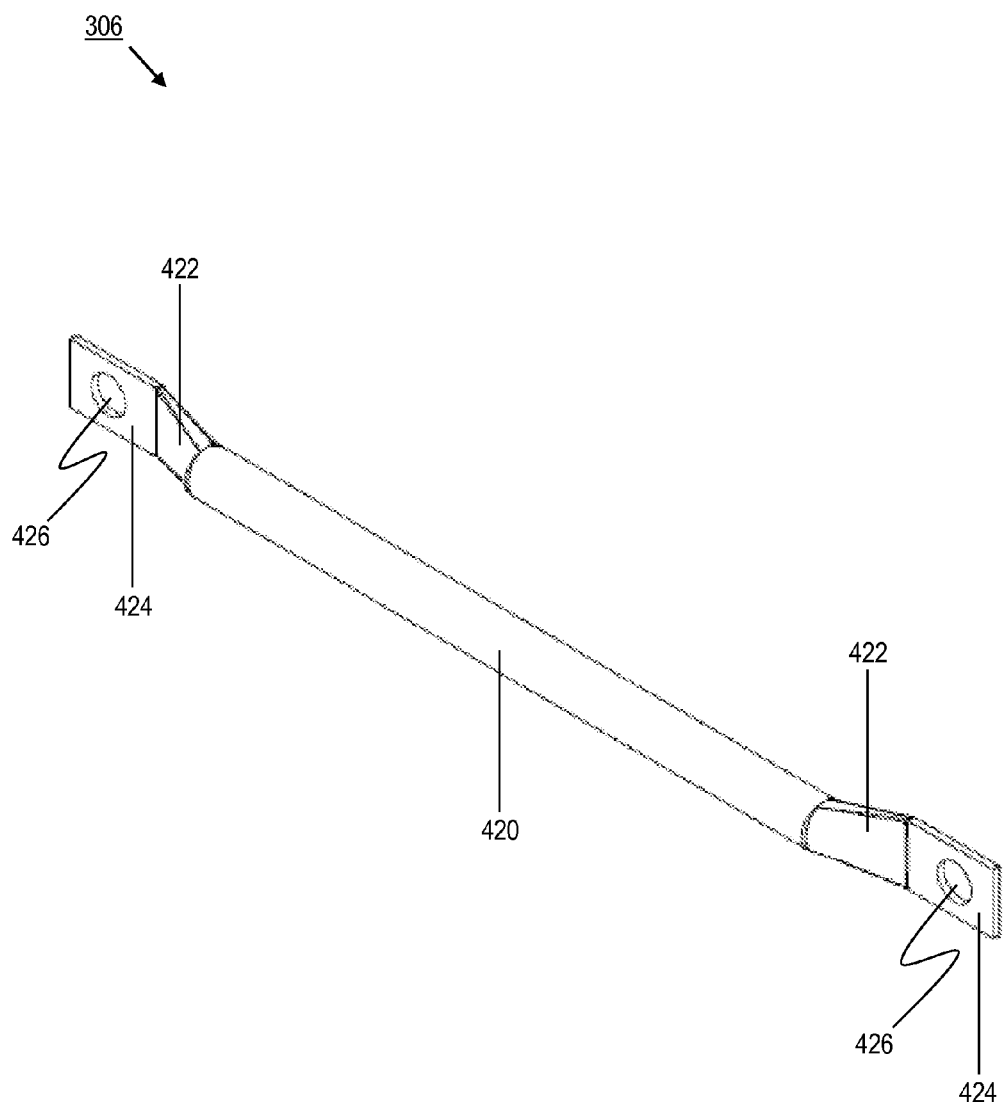
FIGS. 9A-9C show a support rod, according to an exemplary embodiment, which is used in the portable seat assembly of FIG. 1.
Figure 9B:
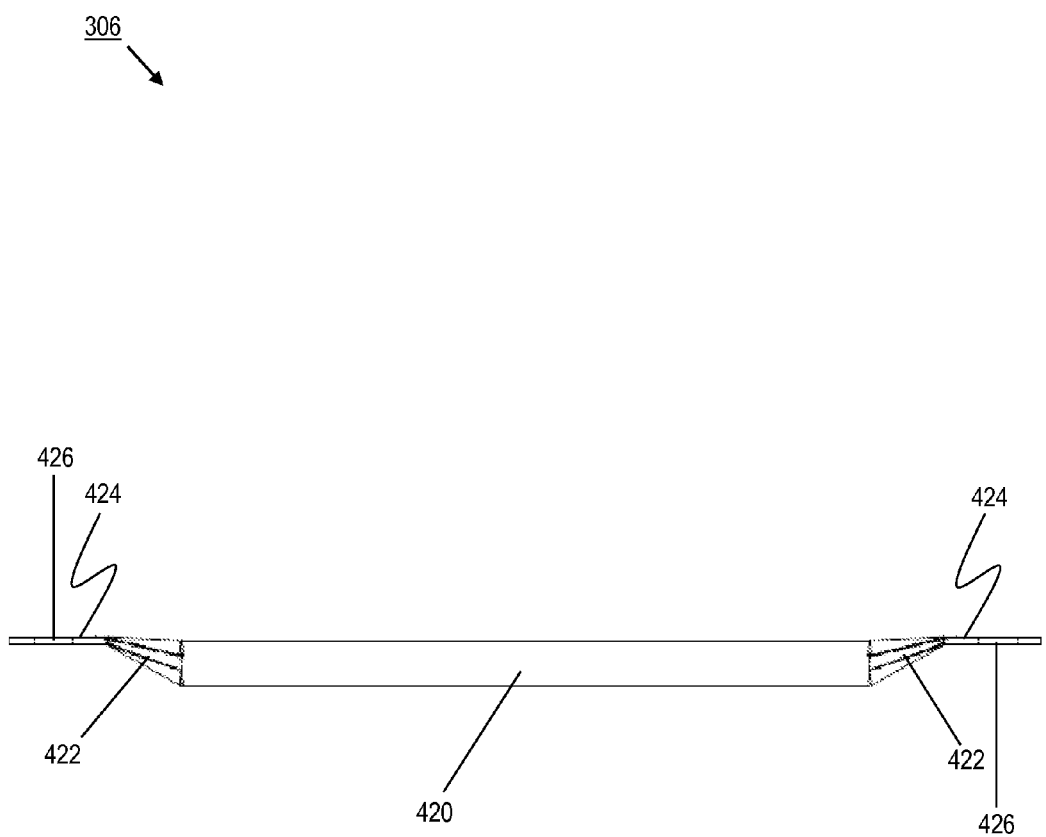
Figure 9C:
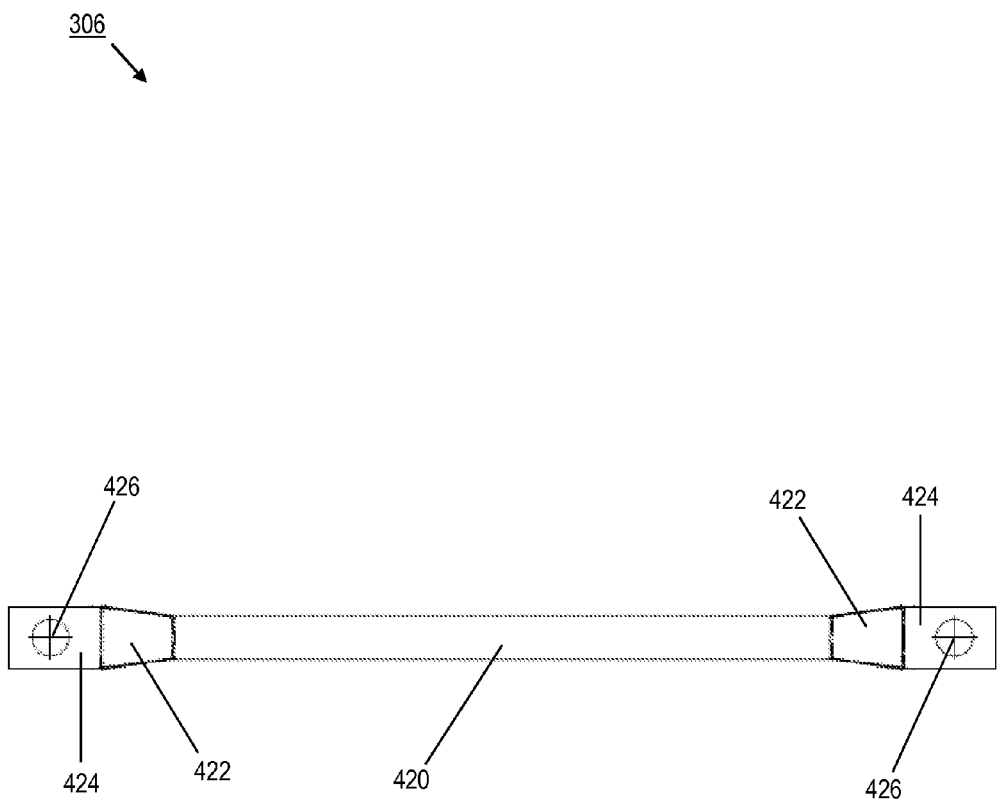
Figure 10A:
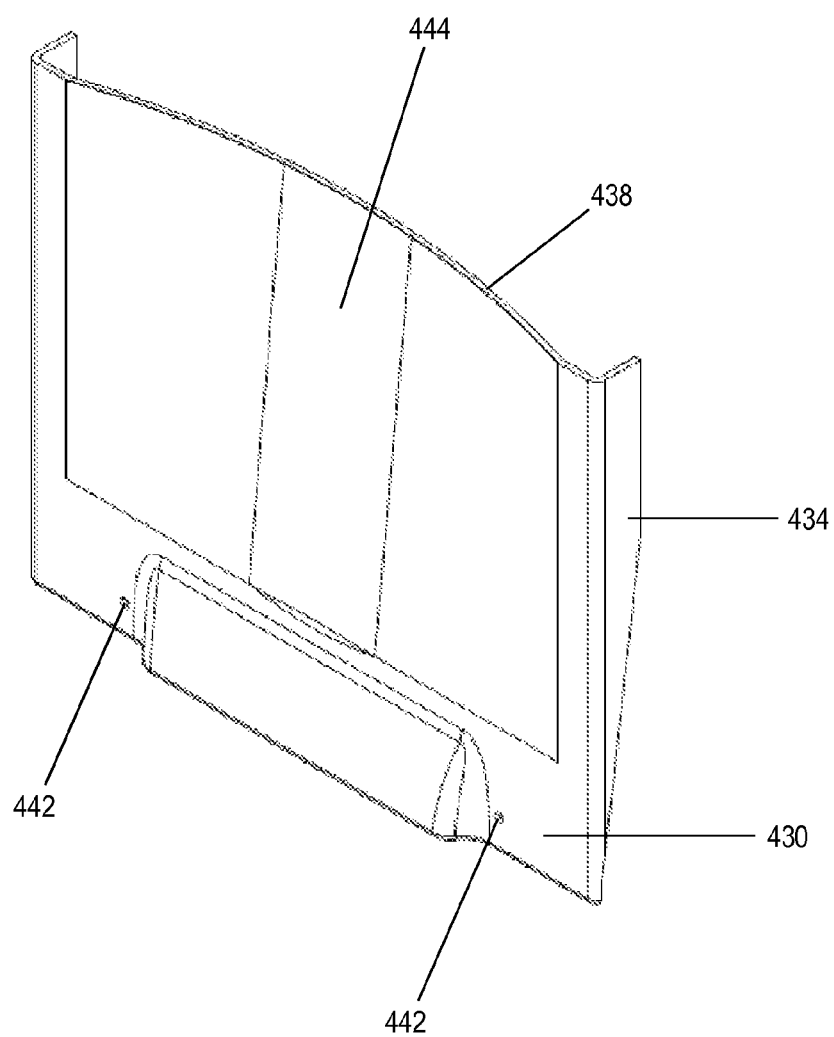
FIGS. 10A-10D show a lower rigid back insert, according to an exemplary embodiment, which is used in the portable seat assembly of FIG. 1.
Figure 10B:
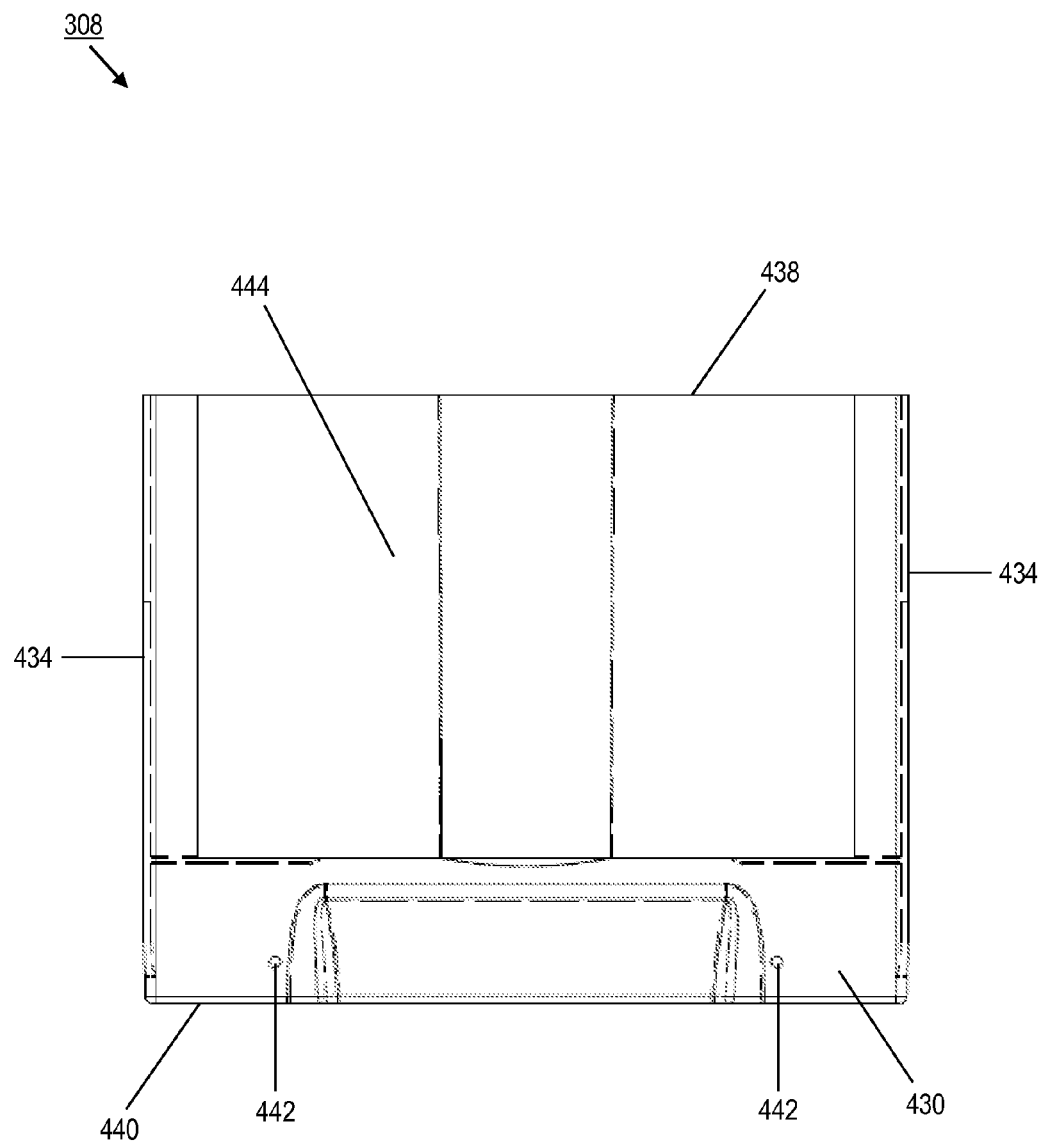
Figure 10C:
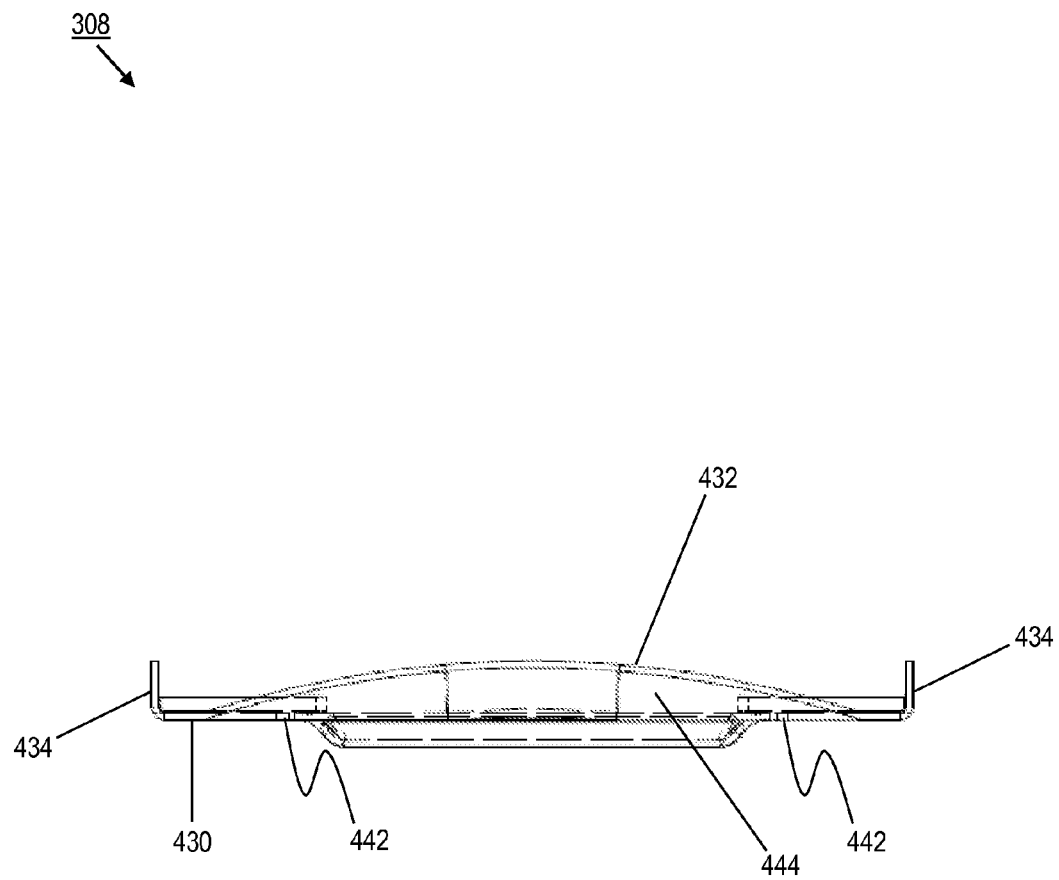
Figure 10D:
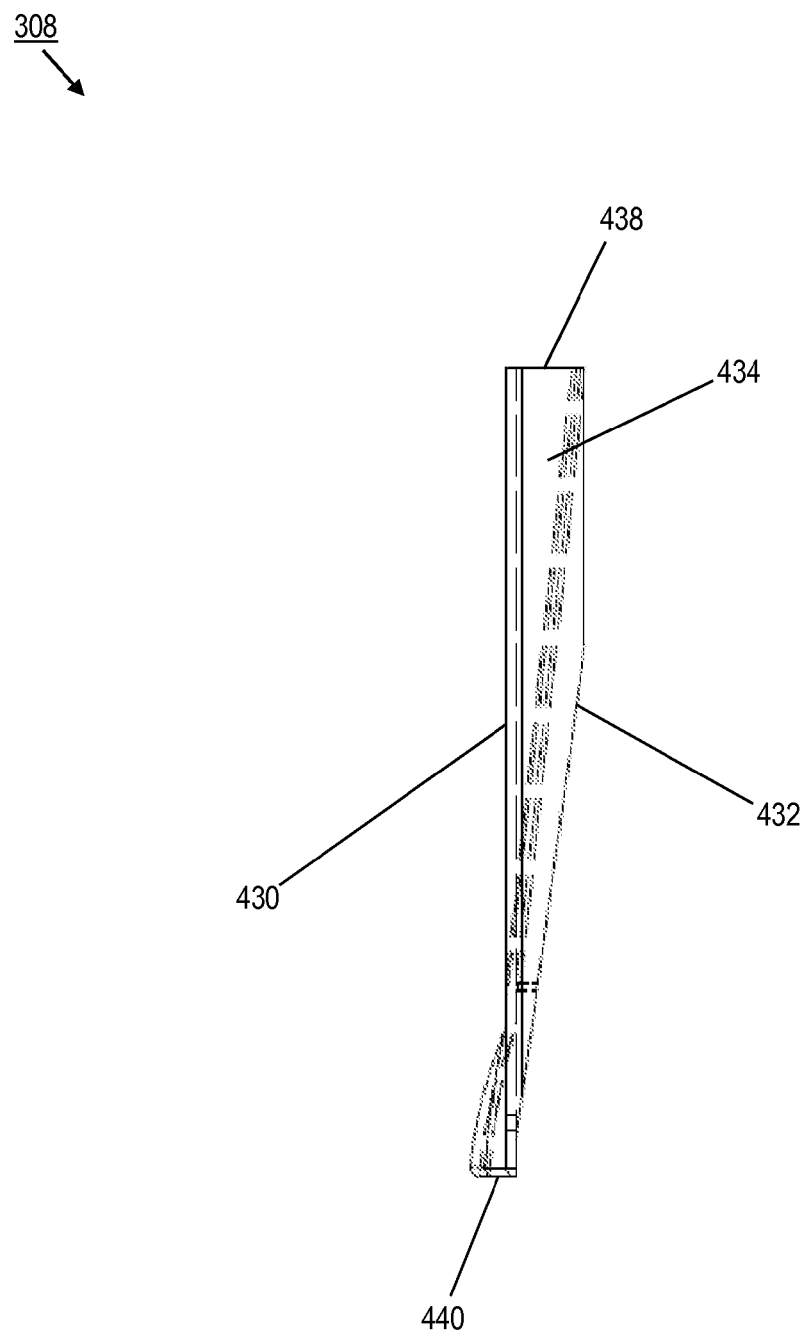

The supporting means 102 includes a seat portion 200, a back portion 300, and a connecting bracket 500. The seat portion 200 includes a seat cover 202 (see FIGS. 4A-4D), a rigid seat insert 204 (see FIGS. 5A-5D), and a soft seat insert 206 (see FIGS. 6A-6C). The back portion 300 includes a back cover 302 (see FIGS. 7A-7D), an upper rigid back insert 304 (see FIGS. 8A-8D), a support rod 306 (see FIGS. 9A-9C), a lower rigid back insert 308 (see FIGS. 10A-10D), and a lower soft back insert 310 (see FIGS. 11A-11C). The connecting bracket 500 (see FIGS. 13A-13D) joins the seat portion 200 to the back portion 300, as disclosed herein.

As used herein, "rigid" refers to structure that generally resists deformation, while "soft" refers to structure that is readily deformable (and may or may not have a tendency to return to its original state after said deformation).

The seat cover 202 (see FIGS. 4A-4D) is formed from a front wall 210, a pair of opposed side walls 212, and a rear opening 214 formed opposite the front wall 210. The seat cover 202 also includes an upper surface 216 that abuts the front wall 210 and the side walls 212. Likewise, the seat cover 202 includes a lower surface 218 that abuts the front wall 210 and the side walls 212. In one exemplary embodiment, the upper surface 216 is joined (e.g., sewn) to one or more of the front wall 210 and the side walls 212. In one exemplary embodiment, the upper surface 216 is formed integrally with one or more of the front wall 210 and the side walls 212. In one exemplary embodiment, the lower surface 218 is joined (e.g., sewn) to one or more of the front wall 210 and the side walls 212. In one exemplary embodiment, the lower surface 218 is formed integrally with one or more of the front wall 210 and the side walls 212.

The upper surface 216 of the seat cover 202 has a slit 220 or other opening that allows for part of the restraining means 104 to extend through the seat cover 202, as disclosed herein. Each of the side walls 212 has a cut-out 222 or other opening that allows for part of the restraining means 104 to extend through the seat cover 202, as disclosed herein.

The rear opening 214 of the seat cover 202 is sufficiently sized and/or shaped to allow for components or material (e.g., the rigid seat insert 204 and the soft seat insert 206) to be inserted into and/or removed from the seat cover 202. A portion of the seat cover 202 just below the upper surface 216 near the rear opening 214 includes a first connector 224; and a portion of the lower surface 218 of the seat cover 202 near the rear opening 214 includes a second connector 226. The first connector 224 and the second connector 226 are operable to interface with one another to effectively close the rear opening 214 of the seat cover 202. Closure of the rear opening 214 of the seat cover 202 prevents the components (e.g., the rigid seat insert 204 and the soft seat insert 206) from readily exiting the seat cover 202. In one exemplary embodiment, the first connector 224 and the second connector 226 constitute a hook-and-loop (e.g., Velcro®) fastener. In one exemplary embodiment, the first connector 224 and the second connector 226 constitute a snap fastener.

In one exemplary embodiment, an elastic retaining strap (not shown) is formed inside the seat cover 202. The elastic retaining strap extends between inner surfaces of the side walls 212 of the seat cover 202. The retaining strap assists in preventing the components (e.g., the rigid seat insert 204 and the soft seat insert 206) from readily exiting the seat cover 202.

The seat cover 202 is made of a strong, yet supple material. In one exemplary embodiment, the seat cover 202 is made of leather or a leather-like material. In one exemplary embodiment, the seat cover 202 is made of vinyl or cloth. The seat cover 202 can be any color or texture without departing from the spirit and scope of the general inventive concepts. In one exemplary embodiment, a color and/or a texture of the seat cover 202 is selected to match that of the installed vehicle seat to which the portable seat assembly 100 is to be mounted.

In one exemplary embodiment, the seat cover 202 is replaced with or otherwise complemented by one or more seating components made of urethane foam. Such seating components, in addition to being sufficiently strong and resilient, can also be seal-sealing should the seating components be punctured or otherwise compromised.

As noted above, the rigid seat insert 204 (see FIGS. 5A-5D) is sized and/or shaped to fit inside the seat cover 202 (i.e., through the rear opening 214 of the seat cover 202). The rigid seat insert 204 defines the seating area and is made of a material that resists deformation. In one exemplary embodiment, the rigid seat insert 204 is made of plastic.

The rigid seat insert 204 includes an upper surface 228 and a lower surface 230. An H-shaped slot 232 or other opening and a T-shaped slot 234 or other opening are formed or otherwise provided in the rigid seat insert 204. The H-shaped slot 232 and the T-shaped slot 234 each allow for a portion of the restraining means 104 to interface with the rigid seat insert 204, as disclosed herein.

A pair of flanges 236 are formed or otherwise provided on opposing sides of the rigid seat insert 204. Each of the flanges 236 includes a partially opened slot 238. The partially opened slots 238 allow for a portion of the restraining means 104 to interface with the rigid seat insert 204, as disclosed herein. Each of the flanges 236 also includes a circular hole 240. The circular holes 240 allow for the rigid seat insert 204 to be pivotally connected, fastened, joined, attached, or otherwise interfaced to the lower rigid back insert 308, as disclosed herein.

As noted above, the soft seat insert 206 (see FIGS. 6A-6C) is sized and/or shaped to fit inside the seat cover 202 (i.e., through the rear opening 214 of the seat cover 202). The soft seat insert 206 provides cushioning to the seating area and is made of a deformable material. In one exemplary embodiment, the soft seat insert 206 is made of foam. In one exemplary embodiment, the soft seat insert 206 is attached to or otherwise interfaced with the rigid seat insert 204. In one exemplary embodiment, the soft seat insert 206 is positioned above or below the rigid seat insert 204, whereby the spatial relationship between the soft seat insert 206 and the rigid seat insert 204 is maintained by the seat cover 202 and its related structure.

The back cover 302 (see FIGS. 7A-7D) is formed from a front wall 312, a pair of opposed side walls 314, and a rear wall 316. The back cover 302 also includes an upper wall 318 that abuts the front wall 312, the side walls 314, and the rear wall 316. Likewise, the back cover 302 includes a lower opening 320 formed opposite the upper wall 318.

In one exemplary embodiment, the upper wall 318 is joined (e.g., sewn) to one or more of the front wall 312, the side walls 314, and the rear wall 316. In one exemplary embodiment, the upper wall 318 is formed integrally with one or more of the front wall 312, the side walls 314, and the rear wall 316.

Figure 7A:
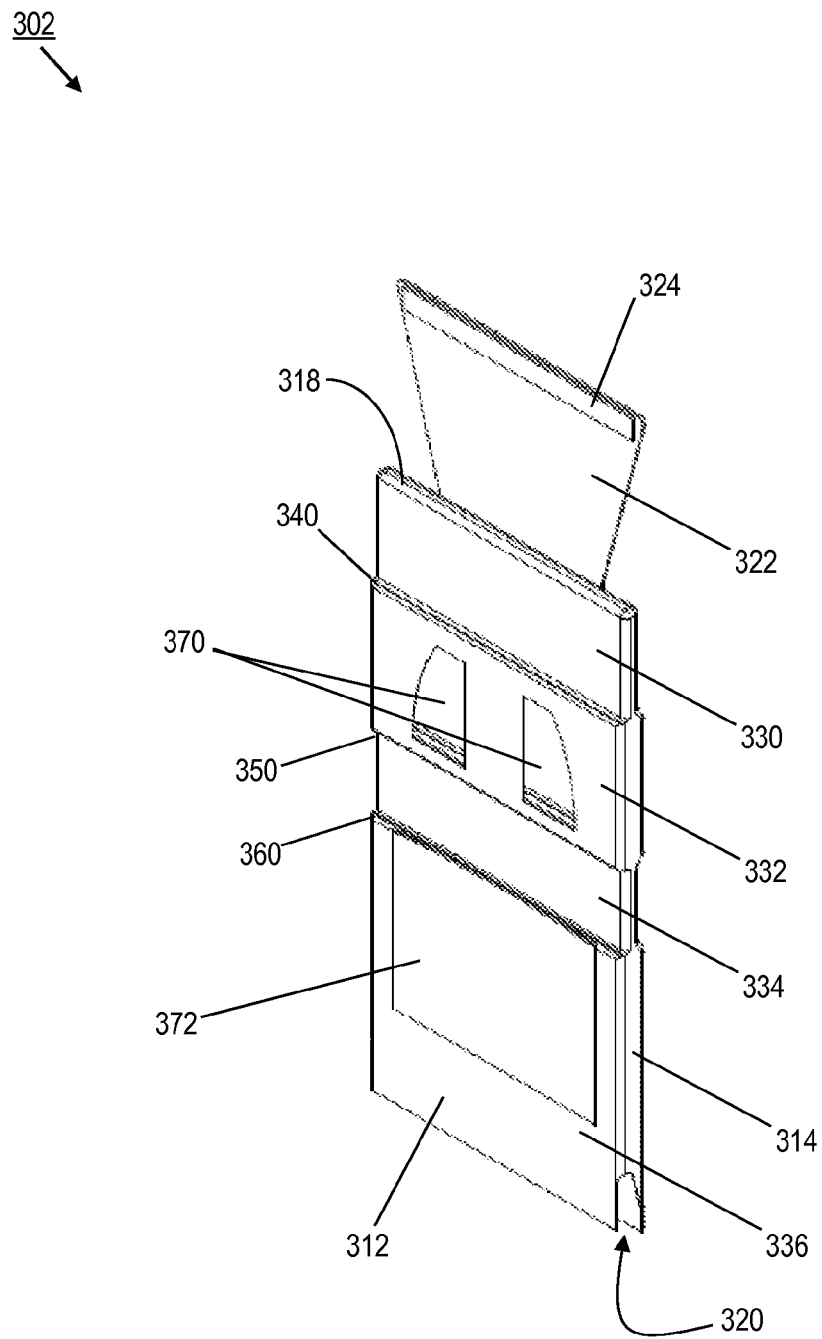
FIGS. 7A-7D show a back cover, according to an exemplary embodiment, which is used in the portable seat assembly of FIG. 1.
Figure 7B:
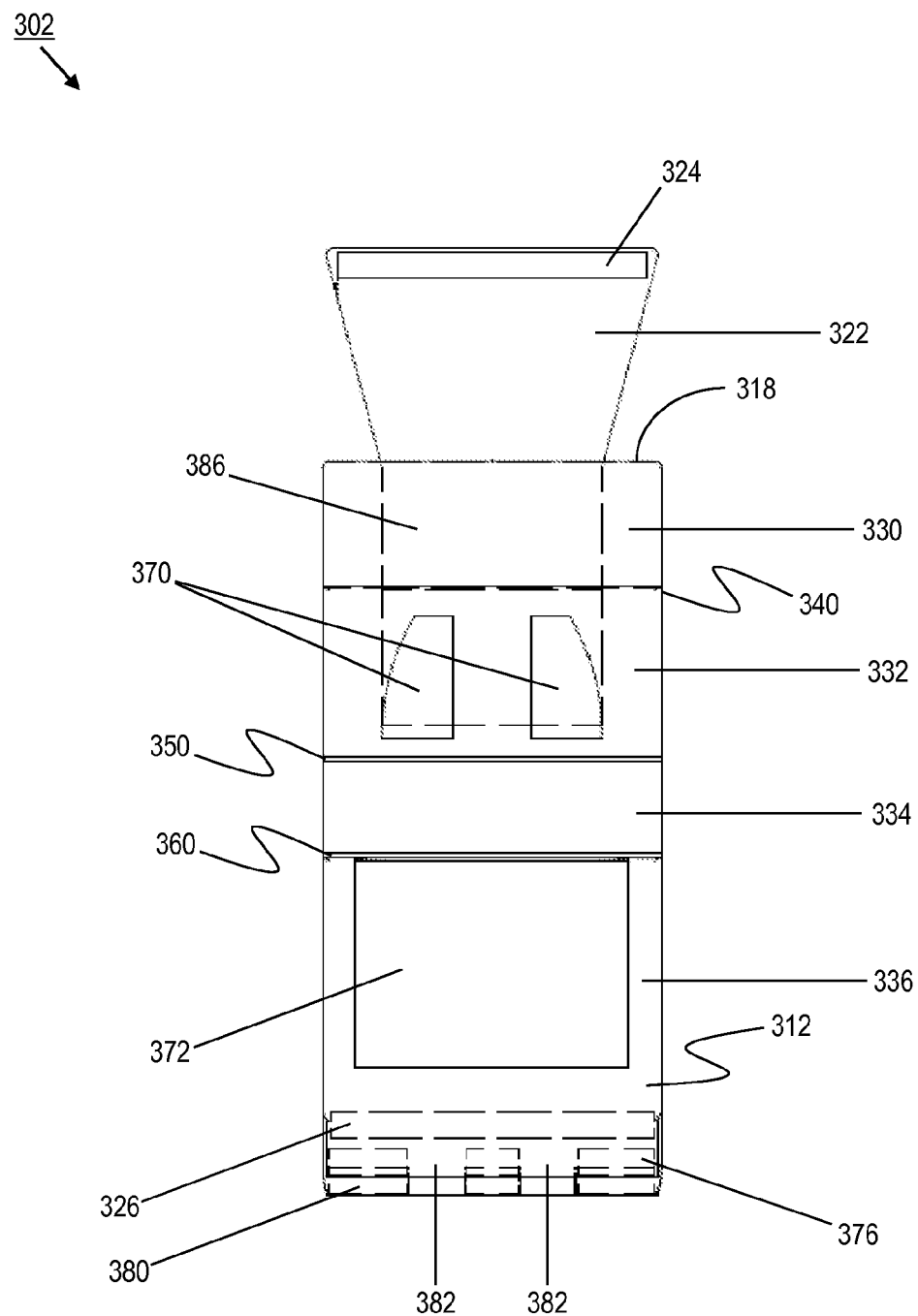
Figure 7C:
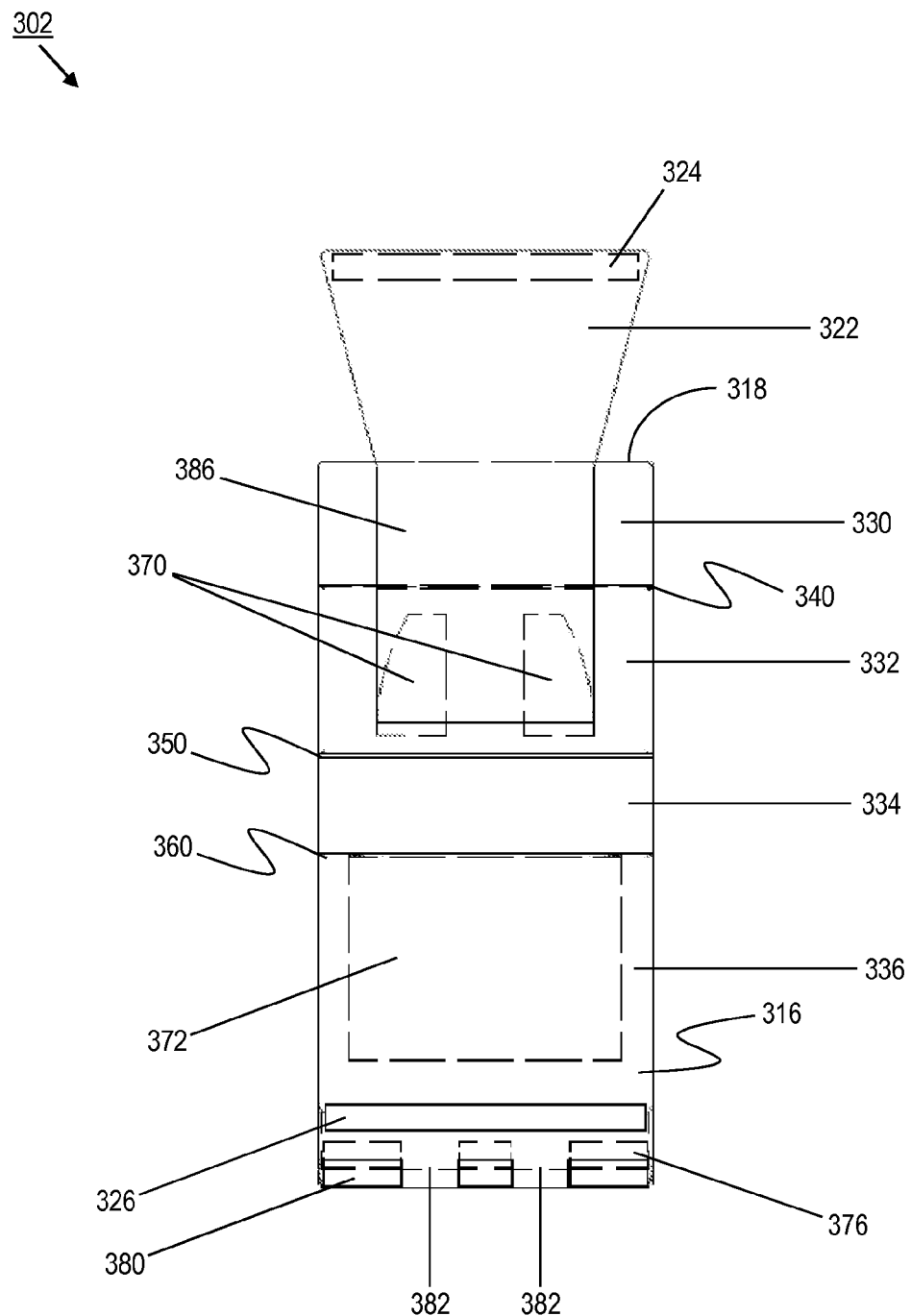
Figure 7D:
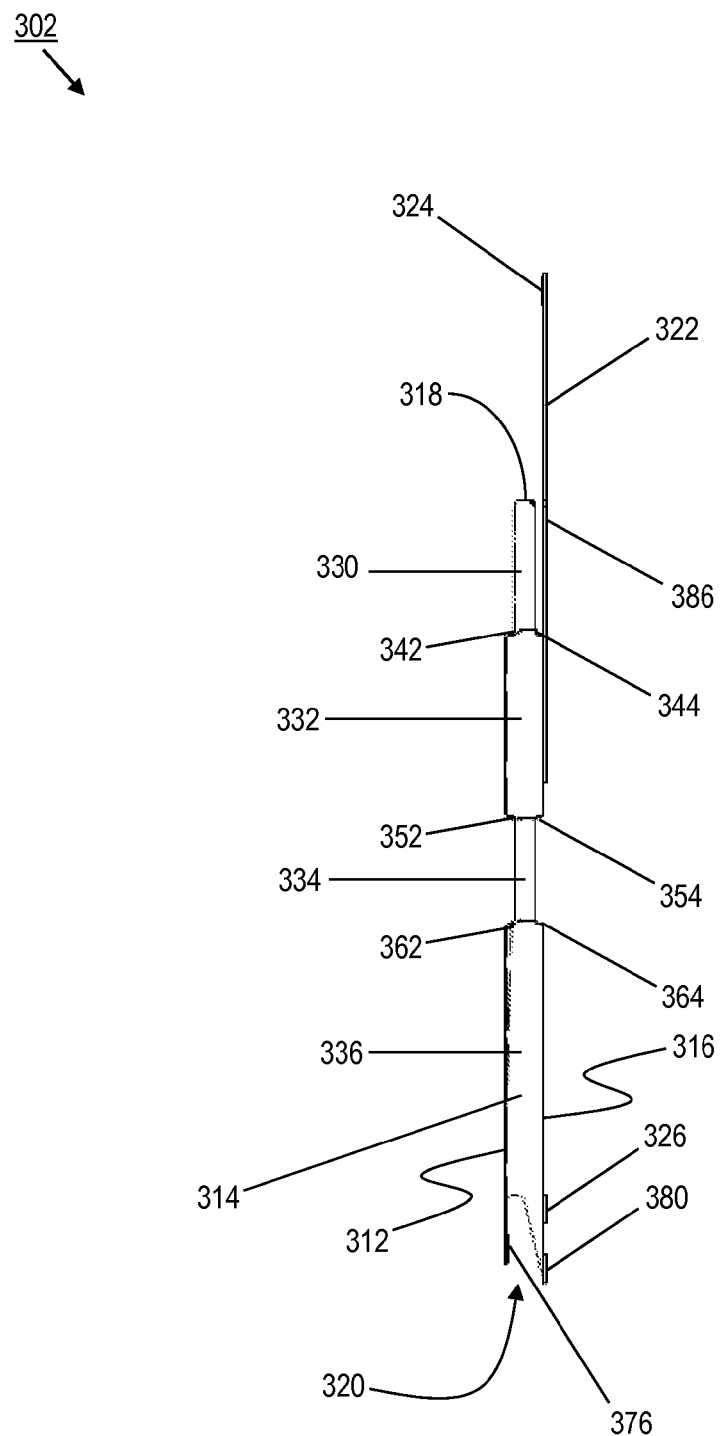
Figure 8A:
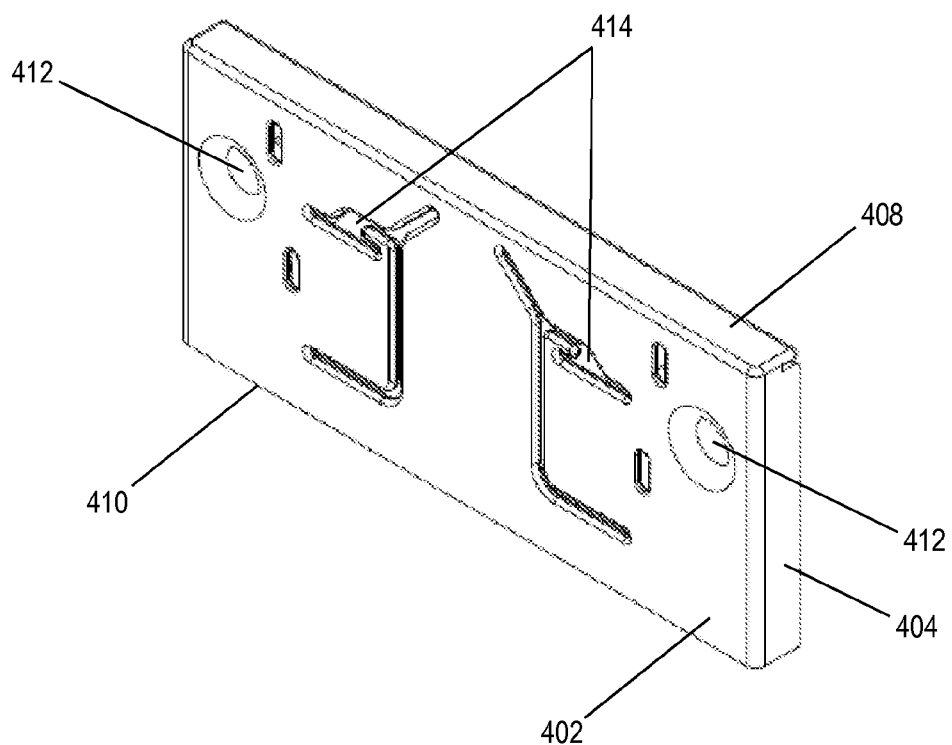
FIGS. 8A-8D show an upper rigid back insert, according to an exemplary embodiment, which is used in the portable seat assembly of FIG. 1.
Figure 8B:
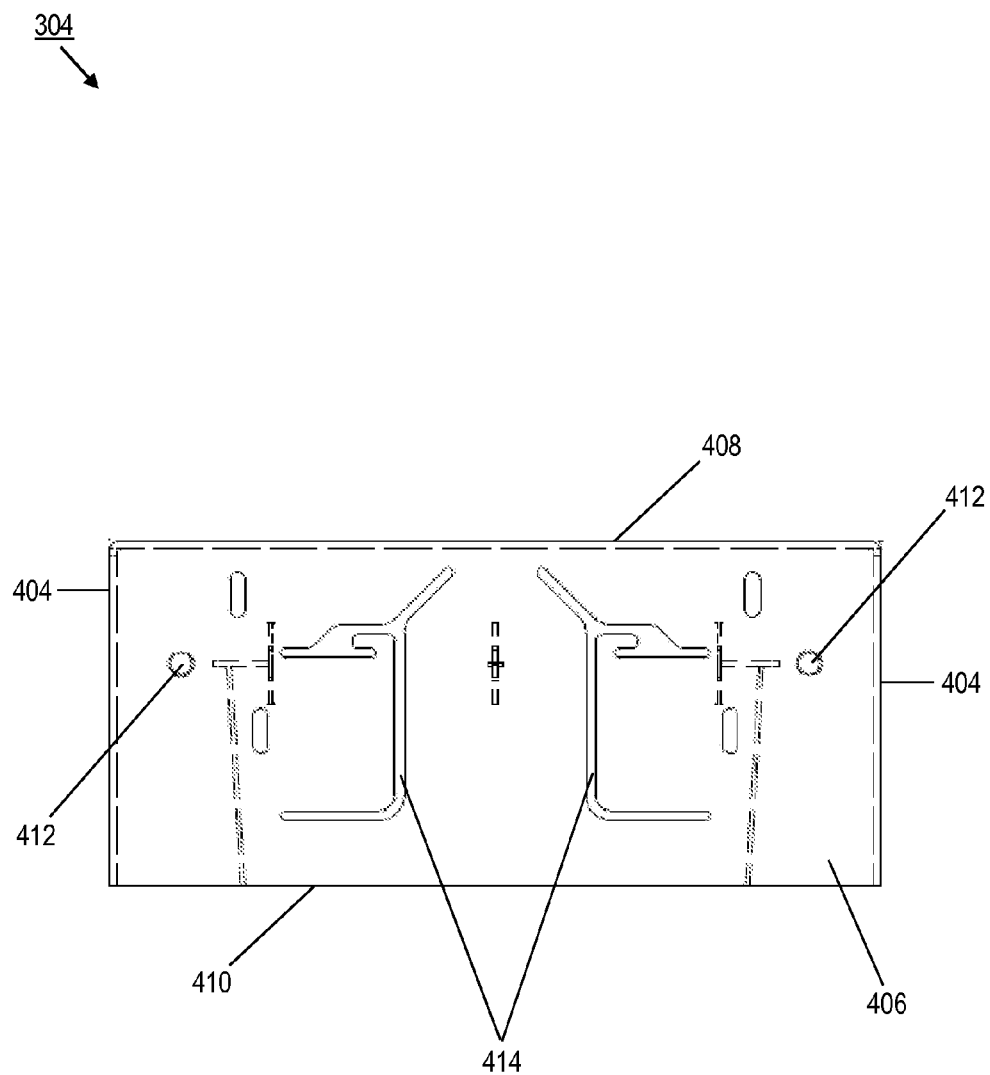
Figure 8C:
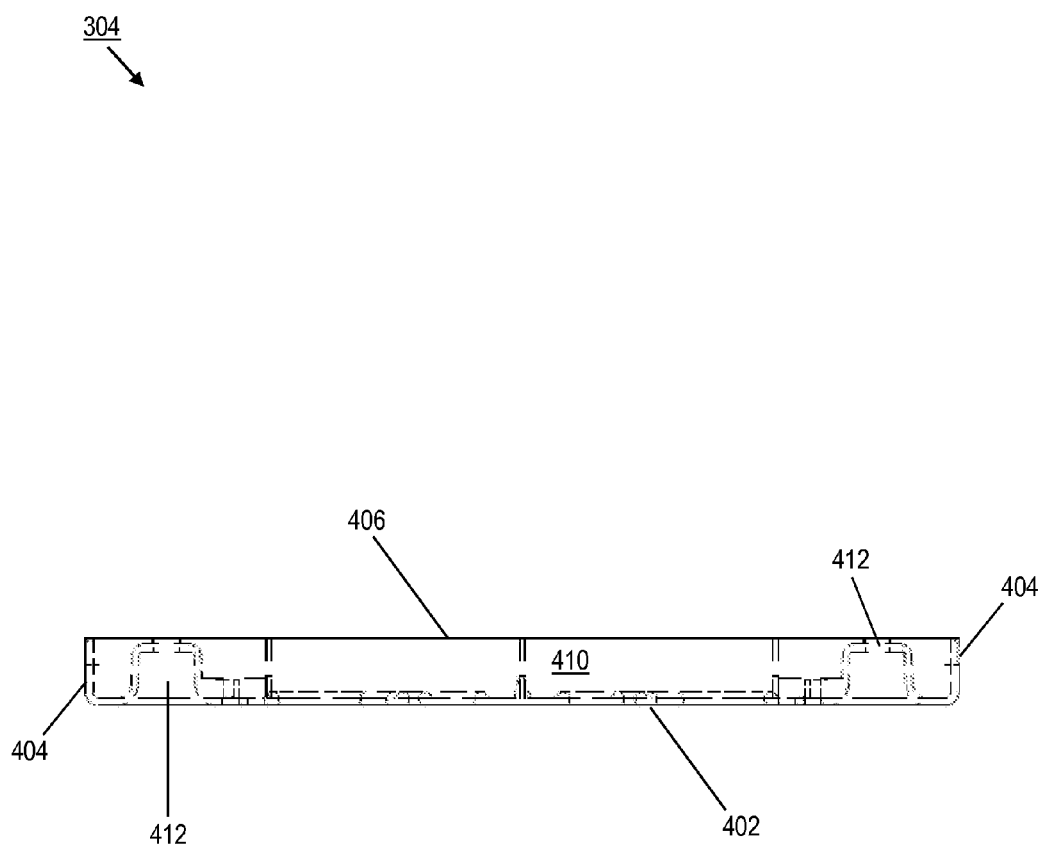
Figure 8D:
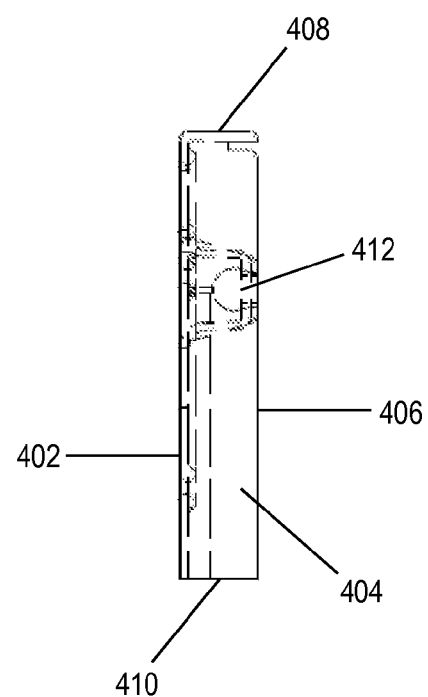

An upper flap 322 is connected, fastened, joined, attached, or otherwise interfaced (e.g., sewn) to the rear wall 316 and extends above the rear wall 318 (see FIG. 7D). An upper flap connector 324 is formed on an outer edge of the upper flap 322. The upper flap connector 324 is complementary to a rear wall connector 326 formed on the rear wall 316 of the back cover 302 near the lower opening 320. In one exemplary embodiment, the upper flap connector 324 and the rear wall connector 326 form a hook-and-loop (e.g., Velcro®) fastener. In one exemplary embodiment, the upper flap connector 324 and the rear wall connector 326 form a snap fastener. The upper flap connector 324 and the rear wall connector 326 engage to secure the portable seat assembly 100 in its collapsed state and disengage to allow the portable seat assembly 100 to assume its expanded state.

The back cover 302 is made of a strong, yet supple material. In one exemplary embodiment, the back cover 302 is made of leather or a leather-like material. In one exemplary embodiment, the back cover 302 is made of vinyl or cloth. The back cover 302 can be any color or texture without departing from the spirit and scope of the general inventive concepts. In one exemplary embodiment, a color and/or a texture of the back cover 302 is selected to match that of the installed vehicle seat to which the portable seat assembly 100 is to be mounted.

The back cover 302 is designed to form a plurality of compartments including an upper compartment 330, an upper middle compartment 332, a lower middle compartment 334, and a lower compartment 336.

The upper compartment 330 extends between the upper wall 318 of the back cover 302 and a first fastener 340 formed on an inner surface of the back cover 302. The first fastener 340 includes a first connector 342 on the inner surface of the front wall 312 and a complementary second connector 344 on the inner surface of the rear wall 316. In one exemplary embodiment, the first fastener 340 is a hook-and-loop (e.g., Velcro®) fastener. In one exemplary embodiment, the first fastener 340 is a snap fastener.

The upper middle compartment 332 extends between the first fastener 340 and a second fastener 350 formed on an inner surface of the back cover 302. The second fastener 350 includes a first connector 352 on the inner surface of the front wall 312 and a complementary second connector 354 on the inner surface of the rear wall 316. In one exemplary embodiment, the second fastener 350 is a hook-and-loop (e.g., Velcro®) fastener. In one exemplary embodiment, the second fastener 350 is a snap fastener.

The lower middle compartment 334 extends between the second fastener 350 and a third fastener 360 formed on an inner surface of the back cover 302. The third fastener 360 includes a first connector 362 on the inner surface of the front wall 312 and a complementary second connector 364 on the inner surface of the rear wall 316. In one exemplary embodiment, the third fastener 360 is a hook-and-loop (e.g., Velcro®) fastener. In one exemplary embodiment, the third fastener 360 is a snap fastener.

The lower compartment 336 extends between the third fastener 360 and the lower opening 320 of the back cover 302.

In one exemplary embodiment, the portion of the back cover 302 defining the upper compartment 330 is made of thicker material than other portions of the back cover 302. In one exemplary embodiment, the portion of the back cover 302 defining the upper compartment 330 has padding or additional material (e.g., foam) attached to its inner surface. In one exemplary embodiment, the portion of the back cover 302 defining the upper compartment 330 receives and holds additional material (e.g., foam). The upper middle compartment 332 receives and holds the upper rigid back insert 304. In one exemplary embodiment, the portion of the back cover 302 defining the lower middle compartment 334 is made of thicker material than other portions of the back cover 302. In one exemplary embodiment, the portion of the back cover 302 defining the lower middle compartment 334 has padding or additional material (e.g., foam) attached to its inner surface. In one exemplary embodiment, the portion of the back cover 302 defining the lower middle compartment 334 receives and holds additional material (e.g., foam). The lower compartment 336 receives and holds the lower rigid back insert 308.

Several openings are formed in the front wall 312 of the back cover 302. In particular, a pair of adjacent openings 370 are formed in the upper middle compartment 332. Each of the openings 370 allows for a portion of the restraining means 104 to extend through the front wall 312 of the back cover 302, as disclosed herein. Furthermore, a single, relatively large opening 372 is formed in the lower compartment 336. This opening 372 provides access to a recessed portion that forms a cavity 444 in the lower rigid back insert 308. The cavity 444 of the lower rigid back insert 308 allows for a portion of the restraining means 104 to be stored in the cavity 444, when the portable seat assembly 100 is in the collapsed state, as disclosed herein.

The lower opening 320 of the back cover 302 is sufficiently sized and/or shaped to allow for components or material (e.g., the upper rigid back insert 304 with the support rod 306 attached, the lower rigid back insert 308, and the lower soft back insert 310) to be inserted into and/or removed from the back cover 302.

A portion of the front wall 312 of the back cover 302 near the lower opening 320 includes three first connectors 376; and a portion of the rear wall 316 of the back cover 302 near the lower opening 320 includes three second connectors 380. The first connectors 376 and the second connectors 380 are operable to interface with one another to effectively close the lower opening 320 of the back cover 302. Closure of the lower opening 320 of the back cover 302 prevents the components (e.g., the upper rigid back insert 304 and support rod 306 combination, the lower rigid back insert 308, and the lower soft back insert 310) from readily exiting the back cover 302. In one exemplary embodiment, the first connectors 376 and the second connectors 380 constitute three hook-and-loop (e.g., Velcro®) fasteners. In one exemplary embodiment, the first connectors 376 and the second connectors 380 constitute three snap fasteners.

The first connectors 376 are separated by a pair of spaces. Similarly, the second connectors 380 are separated by a pair of spaces. Accordingly, when the first connectors 376 interface with the second connectors 380, a pair of openings 382 are formed where the corresponding spaces meet. Each of the openings 382 allows for a portion of the mounting means 104 to extend through the back cover 302, as disclosed herein.

Figure 1E:
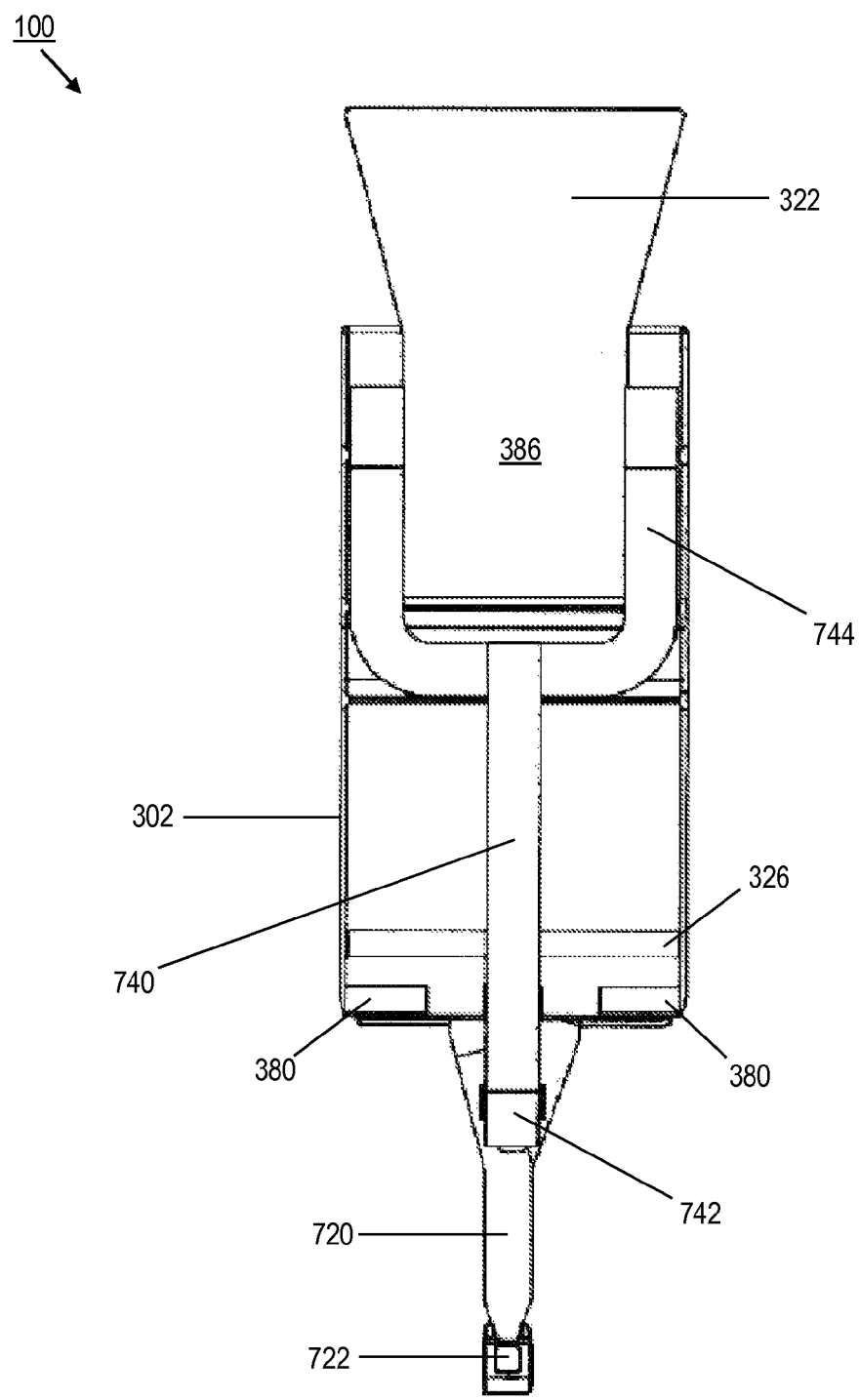
Figure 2:
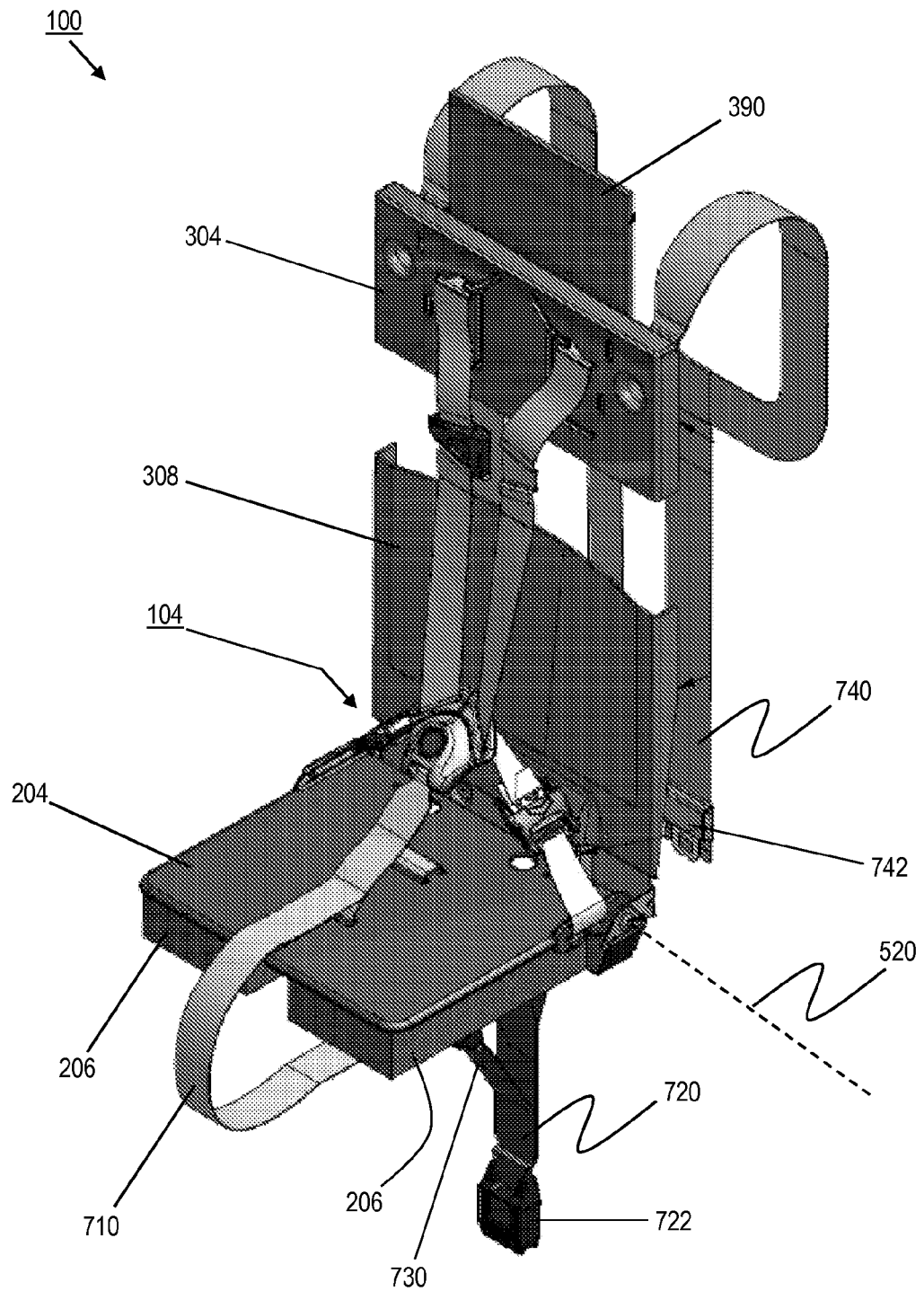
FIG. 2 is a partial perspective view of the portable seat assembly of FIG. 1, wherein a seat cover and a back cover have been removed to better illustrate various internal components of the portable seat assembly.
Figure 12A:
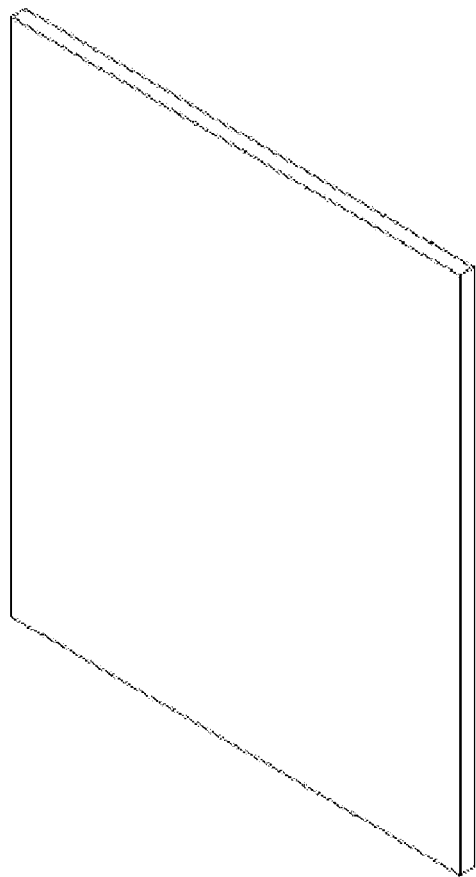
FIGS. 12A-12C show a rigid member, according to an exemplary embodiment, which is used in the portable seat assembly of FIG. 1.
Figure 12B:
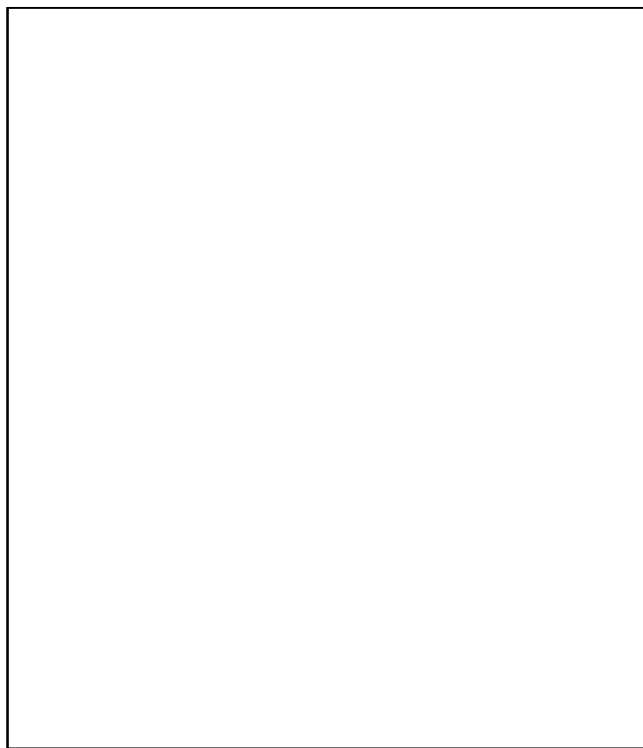
Figure 12C:
Figure 13A:
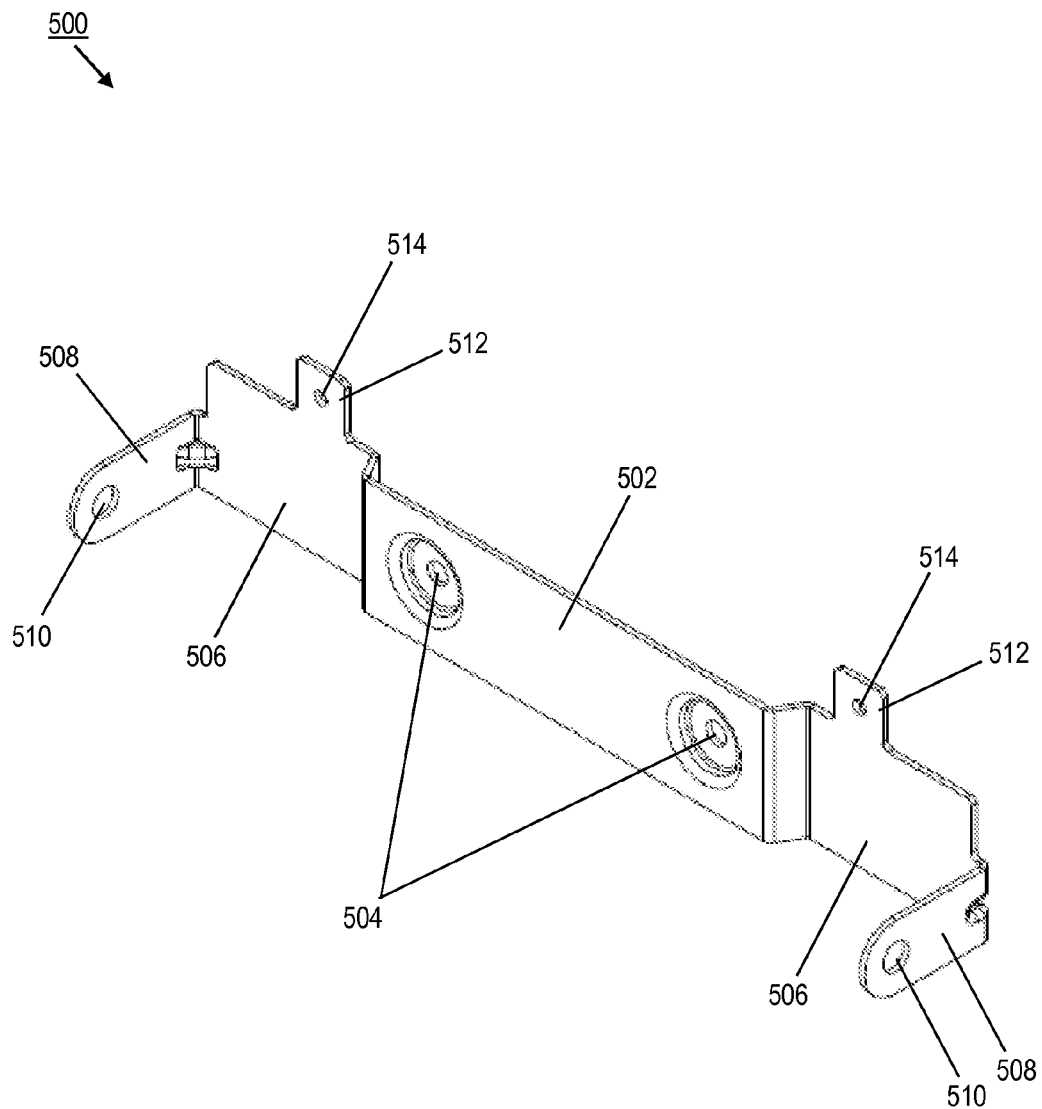
FIGS. 13A-13D show a connecting bracket, according to an exemplary embodiment, which is used in the portable seat assembly of FIG. 1.
Figure 13B:
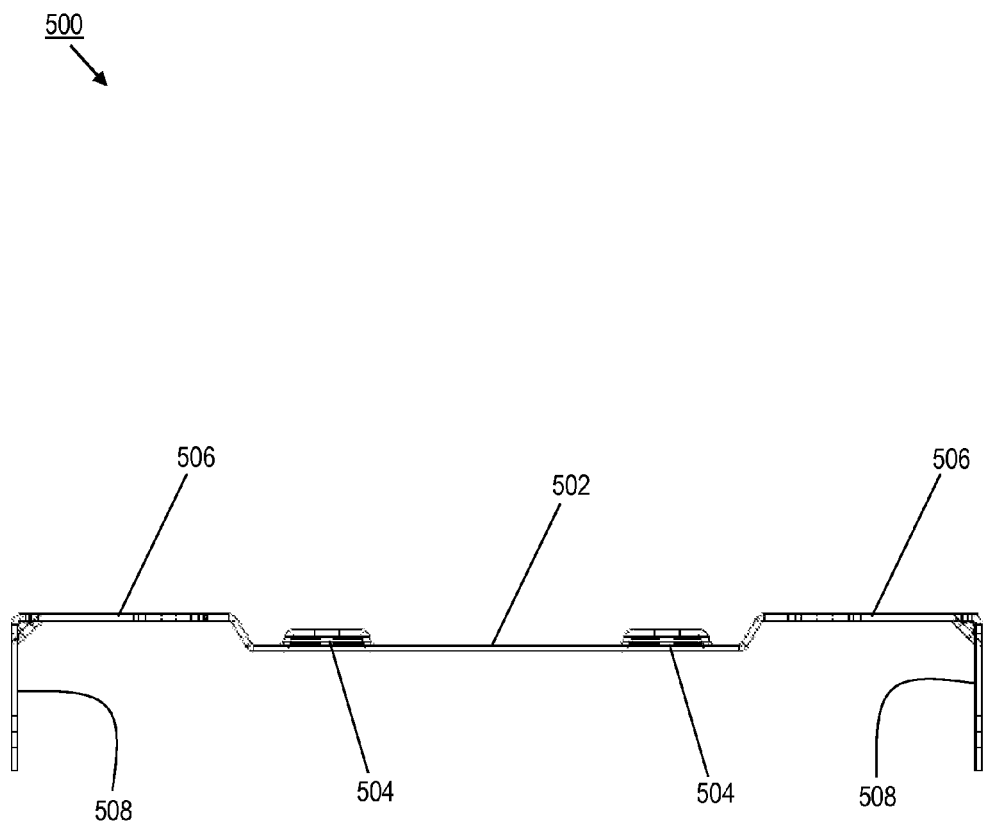
Figure 13C:
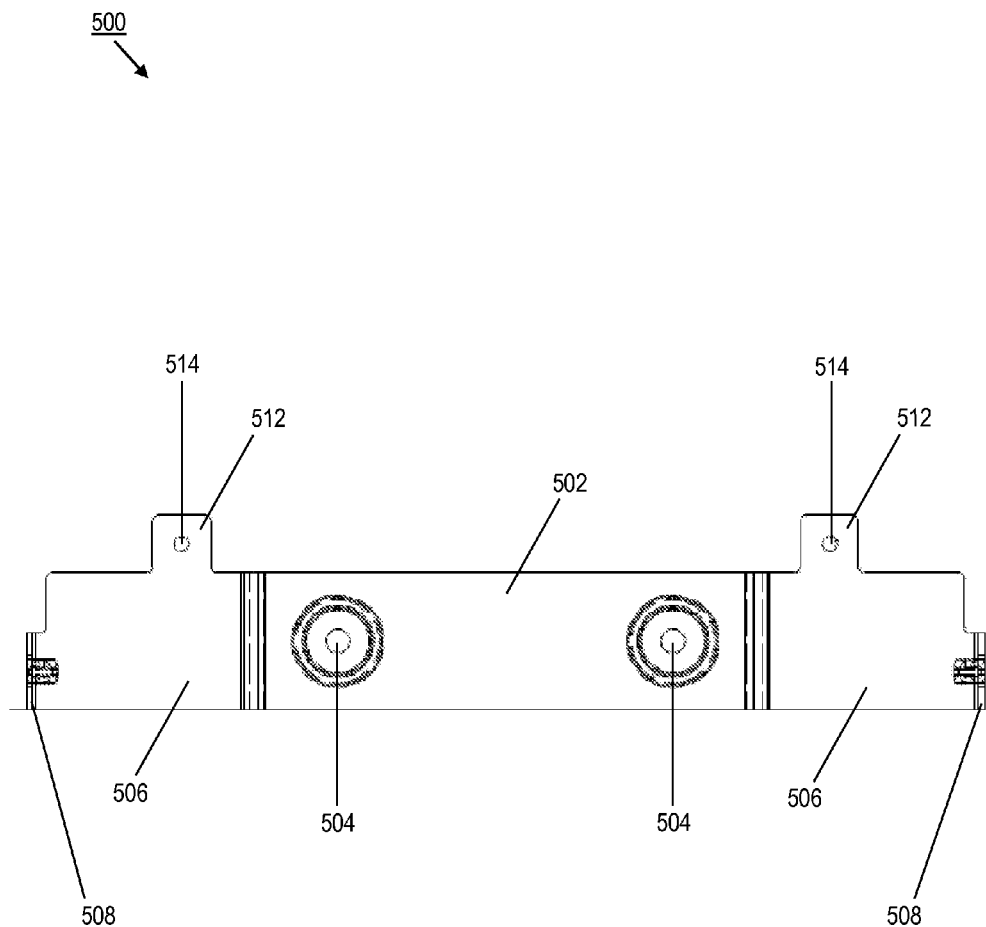
Figure 13D:
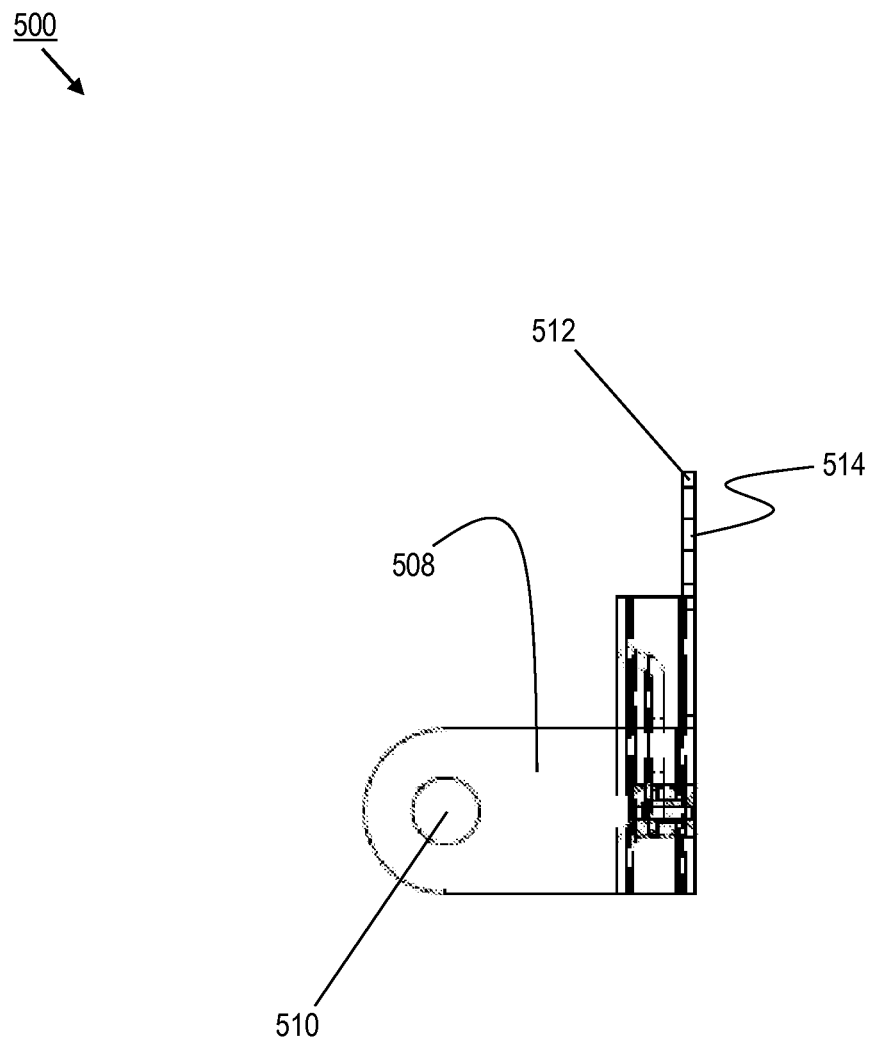

In one exemplary embodiment, the back cover 302 optionally includes a pocket 386 (see FIG. 1E). The pocket 386 can be attached (e.g., sewn) to or formed integrally with the back cover 302. The pocket 386 is provided to receive a rigid member 390 (see FIGS. 12A-12C). The rigid member 390 is made of a material that resists deformation. In one exemplary embodiment, the rigid member 390 is made of plastic. The rigid member 390 provides reinforcing and/or structural support for the portable seat assembly 100 when in either the collapsed state or the expanded state.

As noted above, the upper rigid back insert 304 (see FIGS. 8A-8D) is sized and/or shaped to fit inside the back cover 302 (i.e., through the lower opening 320 of the back cover 302). The upper rigid back insert 304 provides reinforcing and/or structural support for the portable seat assembly 100 when in either the collapsed state or the expanded state. For example, the upper rigid back insert 304 provides support for the upper back region of an occupant of the portable seat assembly 100. The upper rigid back insert 304 is made of a material that resists deformation. In one exemplary embodiment, the upper rigid back insert 304 is made of plastic.

The upper rigid back insert 304 is formed from a front wall 402, a pair of opposed side walls 404, and a rear wall 406. The upper rigid back insert 304 also includes an upper wall 408 that abuts the front wall 402, the side walls 404, and the rear wall 406; and a lower wall 410 that abuts the front wall 402, the side walls 404, and the rear wall 406.

The upper rigid back insert 304 includes a pair of holes 412 or other openings that extend through the rigid back insert 304. The holes 412 allow for the support rod 306 to be securely connected, fastened, joined, attached, or otherwise interfaced to the upper rigid back insert 304, as disclosed herein. In one exemplary embodiment, the support rod 306 is connected to the upper rigid back insert 304 by a pair of bolts extending through the holes 412. In one exemplary embodiment, the support rod 306 is connected to the upper rigid back insert 304 by a pair of rivets extending through the holes 412.

The upper rigid back insert 304 also includes a pair of multi-channel slots 414 that extend through the upper rigid back insert 304. The multi-channel slots 414 each allow for a portion of the restraining means 104 to interface with the upper rigid back insert 304, as disclosed herein. Each of the multi-channel slots 414 has a plurality of positions at which the portion of the restraining means 104 can interface with the upper rigid back insert 304. Consequently, the multi-channel slots 414 allow a height of the restraining means 104 to be readily adjusted relative to the back portion 300 of the portable seat assembly 100.

The support rod 306 (see FIGS. 9A-9C) includes a main body 420 having a tubular, round, or similar cross-section. Each end of the main body 420 has an angled portion 422 that terminates at a flat flange 424. Each flat flange 424 includes a hole 426 or other opening therein. The holes 426 allow for the support rod 306 to be securely connected, fastened, joined, attached, or otherwise interfaced to the upper rigid back insert 304. In particular, the holes 426 in the support rod 306 can be aligned with the corresponding holes 412 in the upper rigid back insert 304 so that fastening members (e.g., bolts, rivets) can be used to secure the support rod 306 to the upper rigid back insert 304.

Figure 16:
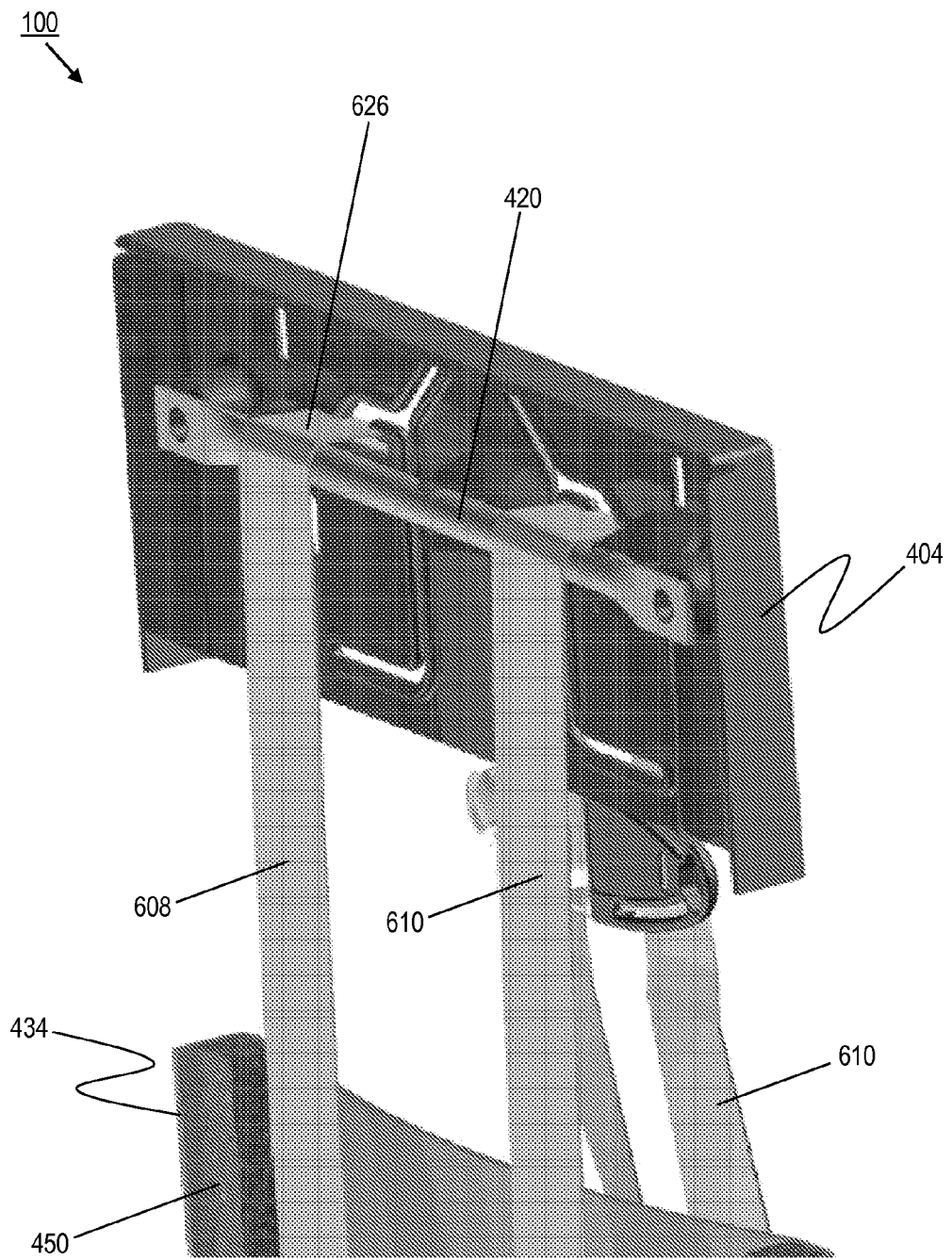
FIG. 16 is a partial perspective view of the portable seat assembly of FIG. 1, wherein a back cover has been removed to better illustrate various internal components of the portable seat assembly.

When secured to the upper rigid back insert 304, the main body 420 of the support rod 306 allows for a portion of the restraining means 104 to interface with the upper rigid back insert 304, as shown in FIG. 16. The support rod 306 can be made of any material having suitable properties (e.g., strength) for supporting the portion of the restraining means 104 relative the portable seat assembly 100. In one exemplary embodiment, the support rod 306 is made of metal. In one exemplary embodiment, the support rod 306 is made of steel (e.g., S45 carbon steel).

Furthermore, the shape and design of the support rod 306 contributes to the overall functionality of the portable seat assembly 100 in both the expanded state and the collapsed state. For example, in the expanded state, the upper back region of an occupant of the portable seat assembly 100 can be safely restrained by the restraining means 104 (interfaced with the support rod 306) in the event of an impact, crash, or the like. Also, since the support rod 306 at least partially fits within a recessed back portion of the upper rigid back insert 304 (see FIG. 16), the portable seat assembly 100 maintains a compact, readily portable profile in the collapsed state.

As noted above, the lower rigid back insert 308 (see FIGS. 10A-10D) is sized and/or shaped to fit inside the back cover 302 (i.e., through the lower opening 320 of the back cover 302). The lower rigid back insert 308 provides reinforcing and/or structural support for the portable seat assembly 100 when in either the collapsed state or the expanded state. For example, the lower rigid back insert 308 provides support for the lower back region of an occupant of the portable seat assembly 100. The lower rigid back insert 308 is made of a material that resists deformation. In one exemplary embodiment, the lower rigid back insert 308 is made of plastic.

The lower rigid back insert 308 has a front wall 430 and a rear wall 432. A pair of flared side walls 434 extend back past at least a portion of the rear wall 432 of the lower rigid back insert 308. The flared side walls 434 are substantially parallel to one another. The lower rigid back insert 308 also has an upper surface 438 that extends between the flared side walls 434; and a lower surface 440 that extends between the flared side walls 434.

The lower rigid back insert 308 includes a pair of holes 442 or other openings. These holes 442 facilitate securing the lower rigid back insert 308 to the connecting bracket 500. In one exemplary embodiment, the lower rigid back insert 308 is secured to the connecting bracket 500 by a pair of bolts extending through the holes 442. In one exemplary embodiment, the lower rigid back insert 308 is secured to the connecting bracket 500 by a pair of rivets extending through the holes 442.

The lower rigid back insert 308 has a curved shape that forms a cavity 444 or otherwise recessed portion. The cavity 444 of the lower rigid back insert 308 allows a portion of the restraining means 104 to be received and held therein when the portable seat assembly 100 is in the collapsed state, as disclosed herein. As a result, a more compact form is achieved by the portable seat assembly 100, when in the collapsed state, as disclosed herein.

As noted above, the lower soft back insert 310 (see FIGS. 11A-11C) is sized and/or shaped to fit inside the back cover 302 (i.e., through the lower opening 320 of the back cover 302). The lower soft back insert 310 provides cushioning to the lower back area and is made of a deformable material. In one exemplary embodiment, the lower soft back insert 310 is made of foam. In one exemplary embodiment, the lower soft back insert 310 is attached to or otherwise interfaced with the lower rigid back insert 308. In one exemplary embodiment, the lower soft back insert 310 is positioned in front of or behind the lower rigid back insert 308, whereby the spatial relationship between the lower soft back insert 310 and the lower rigid back insert 308 is maintained by the back cover 302 and its related structure.

Figure 11A:
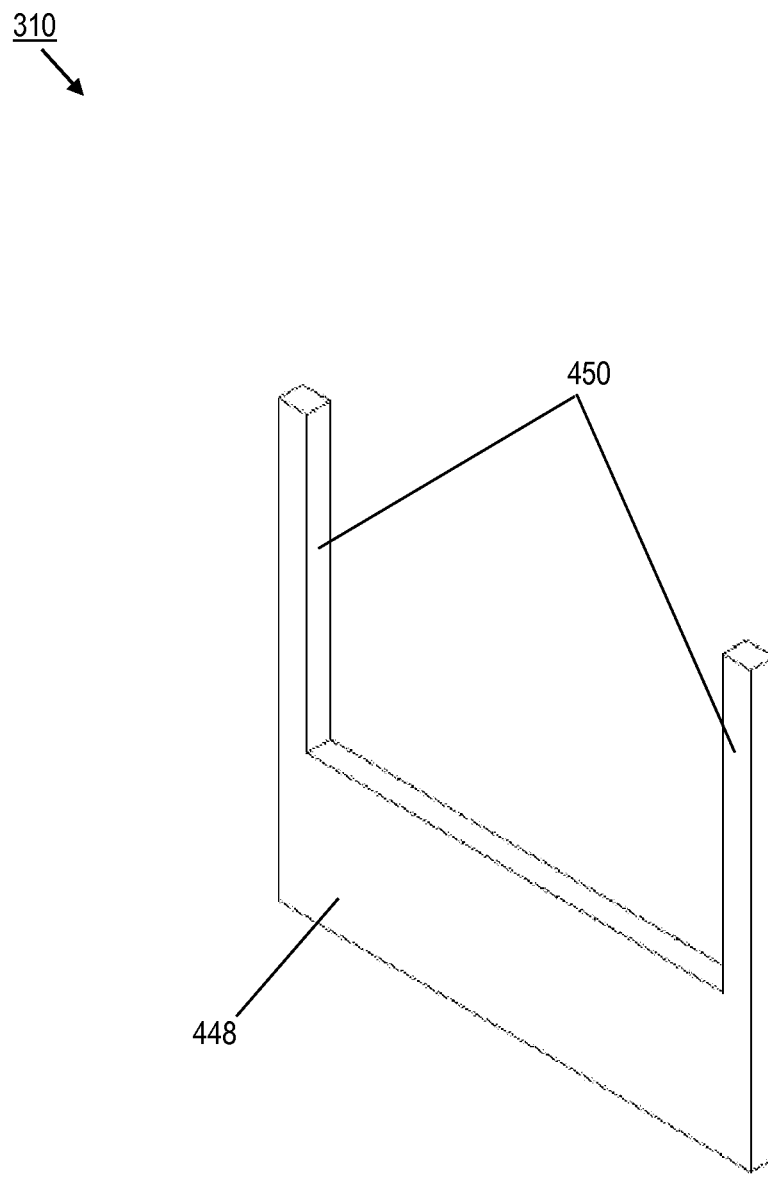
FIGS. 11A-11C show a lower soft back insert, according to an exemplary embodiment, which is used in the portable seat assembly of FIG. 1.
Figure 11B:
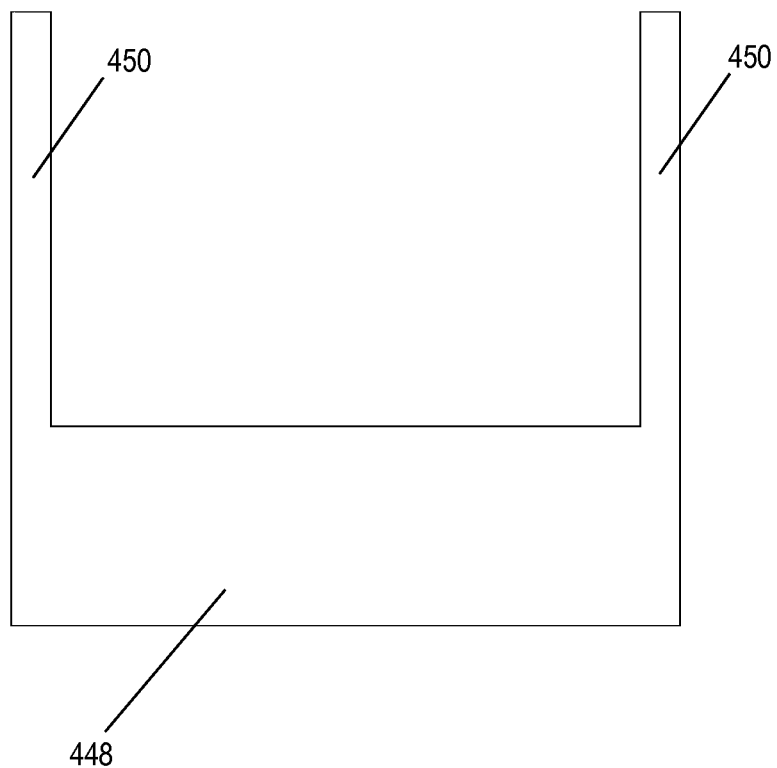
Figure 11C:
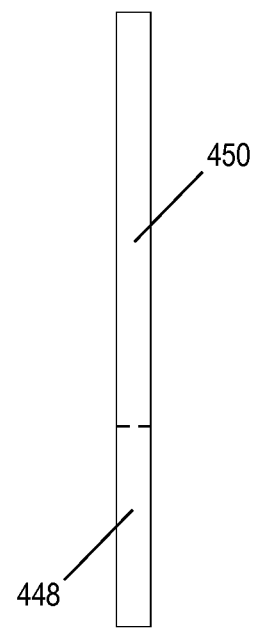

The lower soft back insert 310 has a base portion 448 and two extending finger portions 450, as shown in FIGS. 11A-11C. When positioned in the back cover 302, the lower soft back insert 310 abuts the lower rigid back insert 308. In particular, the base portion 448 of the lower soft back insert 310 generally abuts a region of the lower rigid back insert 308 below the cavity 444, while the finger portions 450 of the lower soft back insert 310 are generally situated adjacent to the flared side walls 434 of the lower rigid back insert 308 with the cavity 444 situated between the finger portions 450.

Figure 14A:
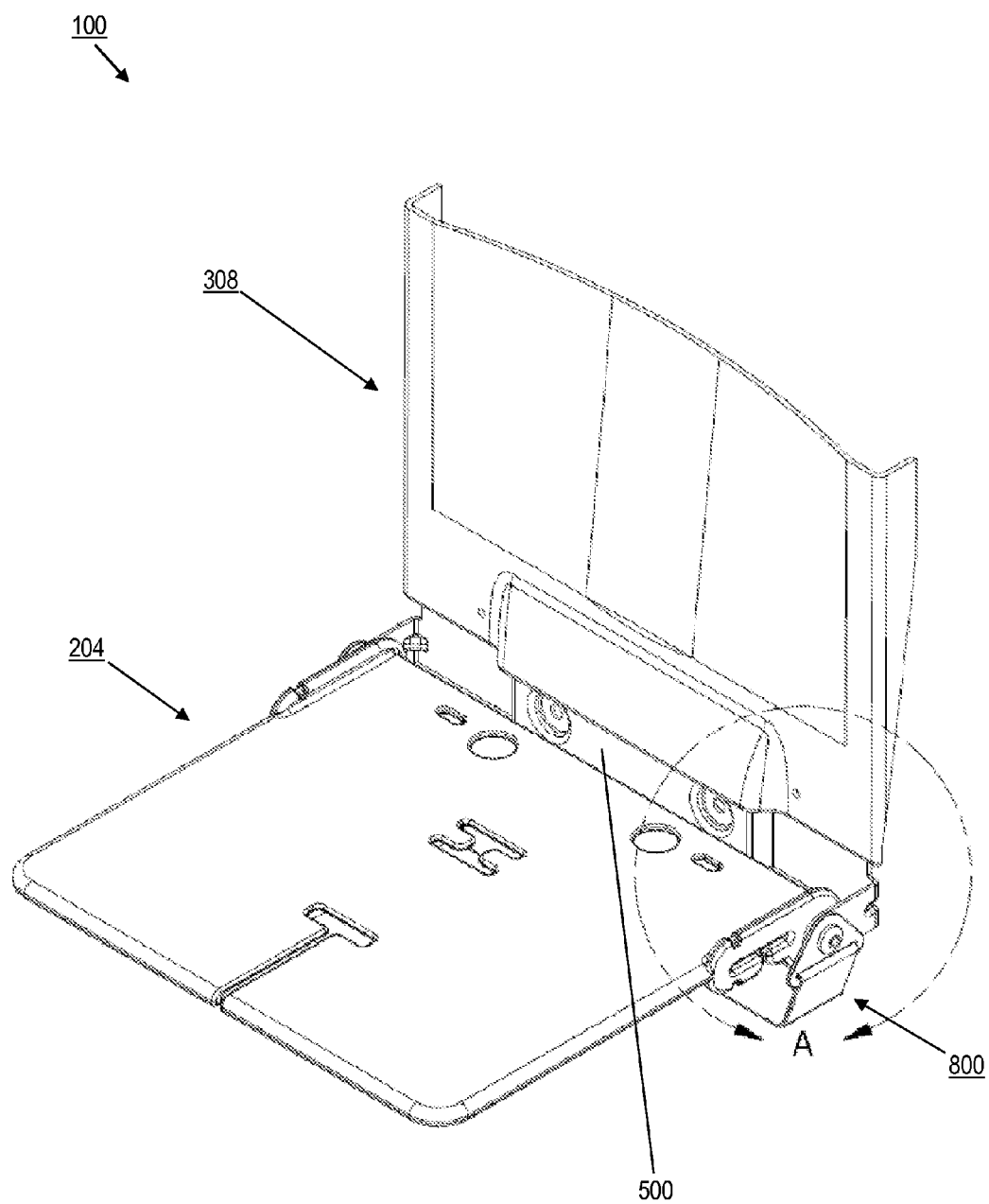
FIGS. 14A-14B are partial perspective views of the portable seat assembly of FIG. 1 illustrating an interface between the rigid seat insert of FIGS. 5A-5D, the lower rigid back insert of FIGS. 10A-10D, the connecting bracket of FIGS. 13A-13D, and the carrying strap of FIGS. 19A-19C.
Figure 14B:
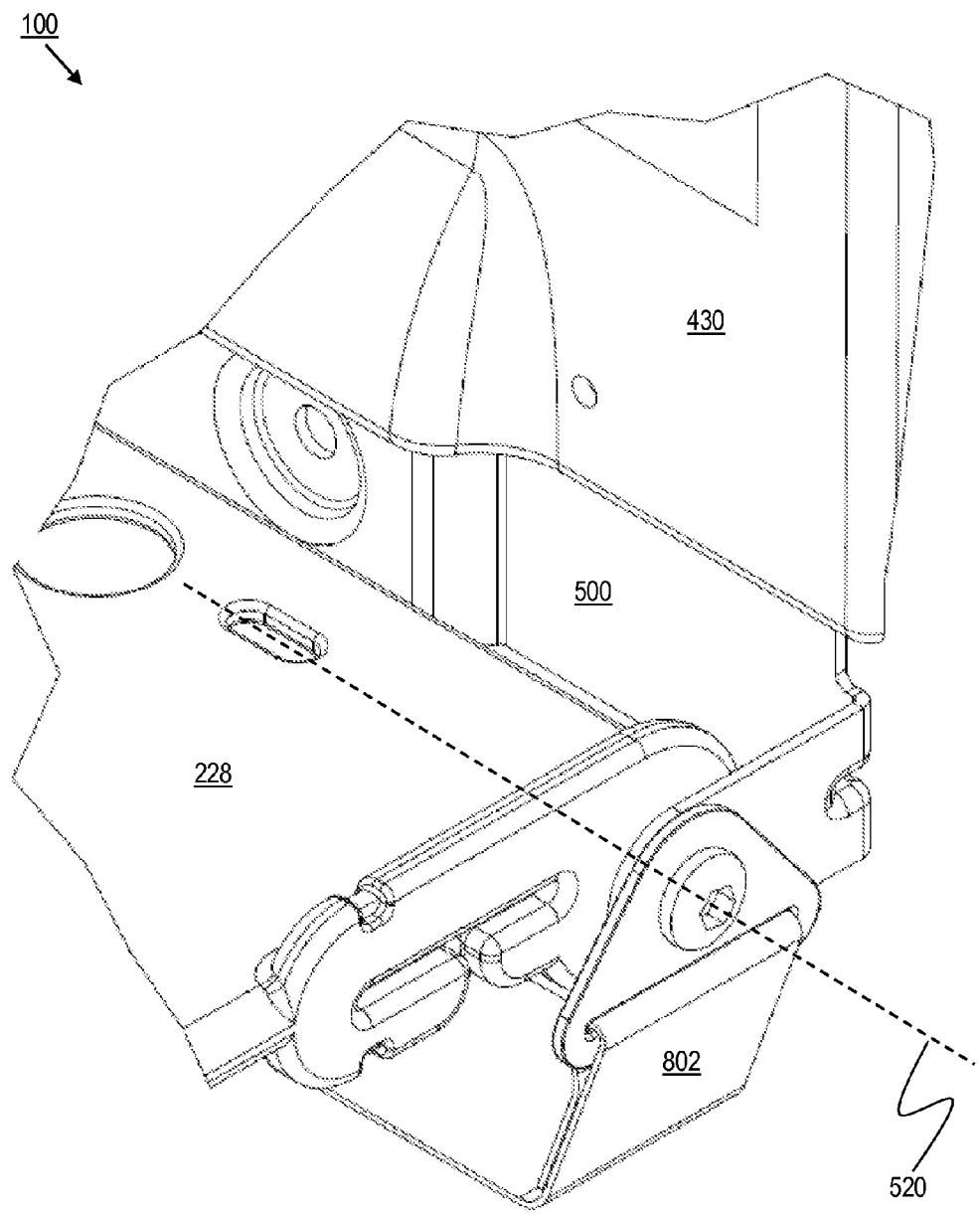

The seat portion 200 and the back portion 300 of the supporting means 102 are connected, fastened, joined, attached, or otherwise interfaced to one another by the connecting bracket 500 (see FIGS. 14A-14B). The connecting bracket 500 (see FIGS. 13A-13D) includes a central portion 502 having a substantially flat or similar cross-section. The central portion 502 of the connecting bracket 500 includes a pair of holes 504 or other openings therein. The holes 504 allow for a portion of the retraining means 104 (i.e., the left shoulder belt 608 and the right shoulder belt 610) to be securely connected, fastened, joined, attached, or otherwise interfaced to the connecting bracket 500.

Each end of the central portion 502 has an offset side portion 506 that terminates at a flat flange 508. Each side portion 506 includes an upper flange 512 that includes a hole 514 or other opening therein. The holes 514 allow for the connecting bracket 500 to be securely connected, fastened, joined, attached, or otherwise interfaced to the lower rigid back insert 308. In particular, the holes 514 in the side portions 506 can be aligned with the corresponding holes 442 in the lower rigid back insert 308 so that fastening members (e.g., bolts, rivets) can be used to secure the connecting bracket 500 to the lower rigid back insert 308.

Each flat flange 508 includes a hole 510 or other opening therein. The holes 510 allow for the connecting bracket 500 to be securely connected, fastened, joined, attached, or otherwise interfaced to the rigid seat insert 204. In particular, the holes 510 in the flat flanges 508 can be aligned with the corresponding holes 240 in the flanges 236 of the rigid seat insert 204 so that fastening members (e.g., bolts, rivets) can be used to secure the connecting bracket 500 to the rigid seat insert 204. Thus, because the connecting bracket 500 is secured to the lower rigid back insert 308, the lower rigid back insert 308 is also secured to the rigid seat insert 204.

In this manner, the seat portion 200 and the back portion 300 are joined to one another (e.g., by a bolt, rivet) to form a pivot point, wherein the seat portion 200 and the back portion 300 can move relative to one another about an axis 520 extending through the pivot point (see FIG. 14B). In general, the seat portion 200 and the back portion 300 can be moved to form an angle of at least approximately 90 degrees between the seat portion 200 and the back portion 300, when the portable seat assembly 100 is in the expanded state (see, e.g., FIGS. 1A and 1D). Furthermore, the seat portion 200 and the back portion 300 can be moved to form an angle of approximately 0 degrees (i.e., where the seat portion 200 and the back portion 300 are substantially parallel to one another), when the portable seat assembly 100 is in the collapsed state (see, e.g., FIG. 3).

Figure 15A:
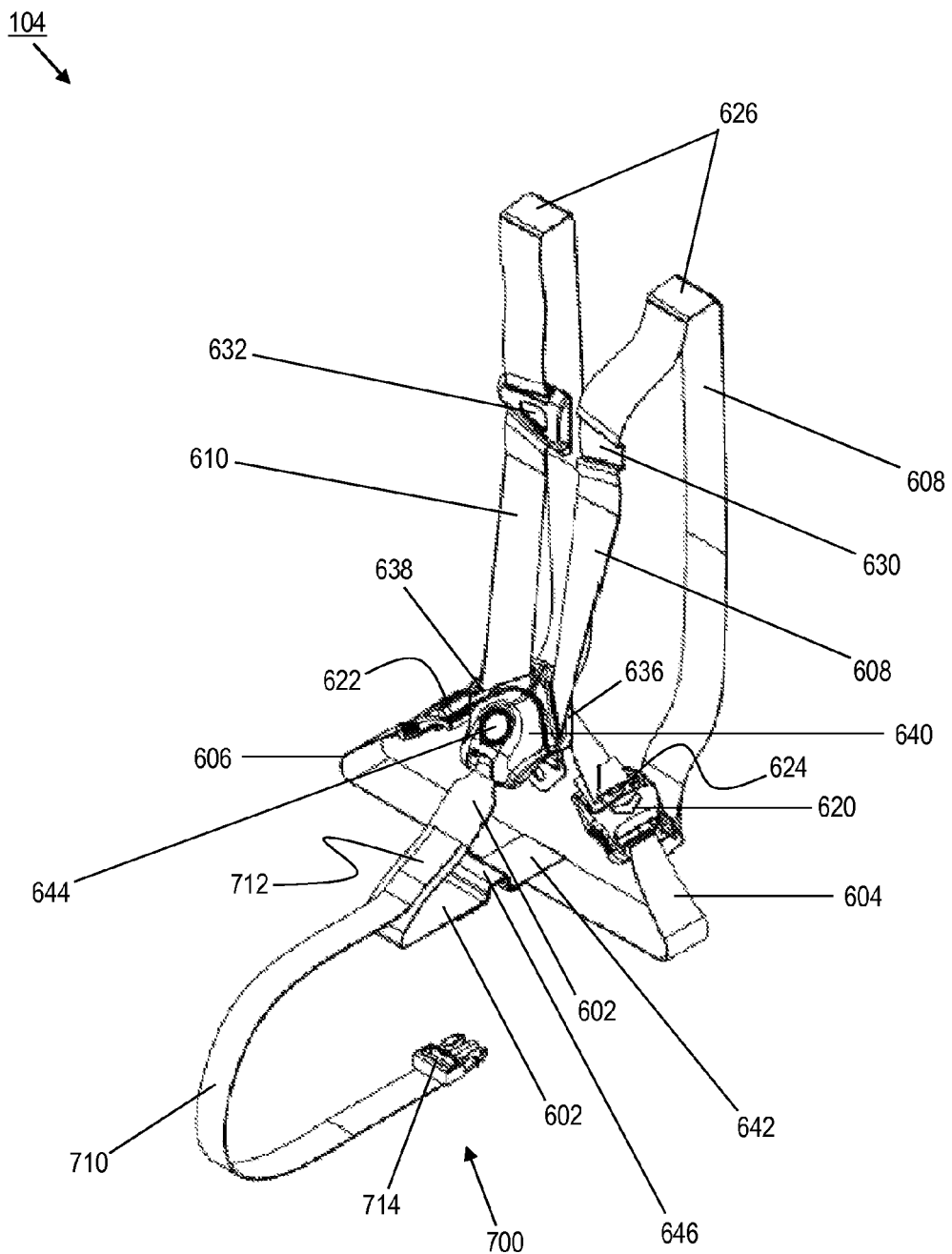
FIGS. 15A-15C show a restraining means in the form of a five-point harness, according to an exemplary embodiment, which is used in the portable seat assembly of FIG. 1.
Figure 15B:
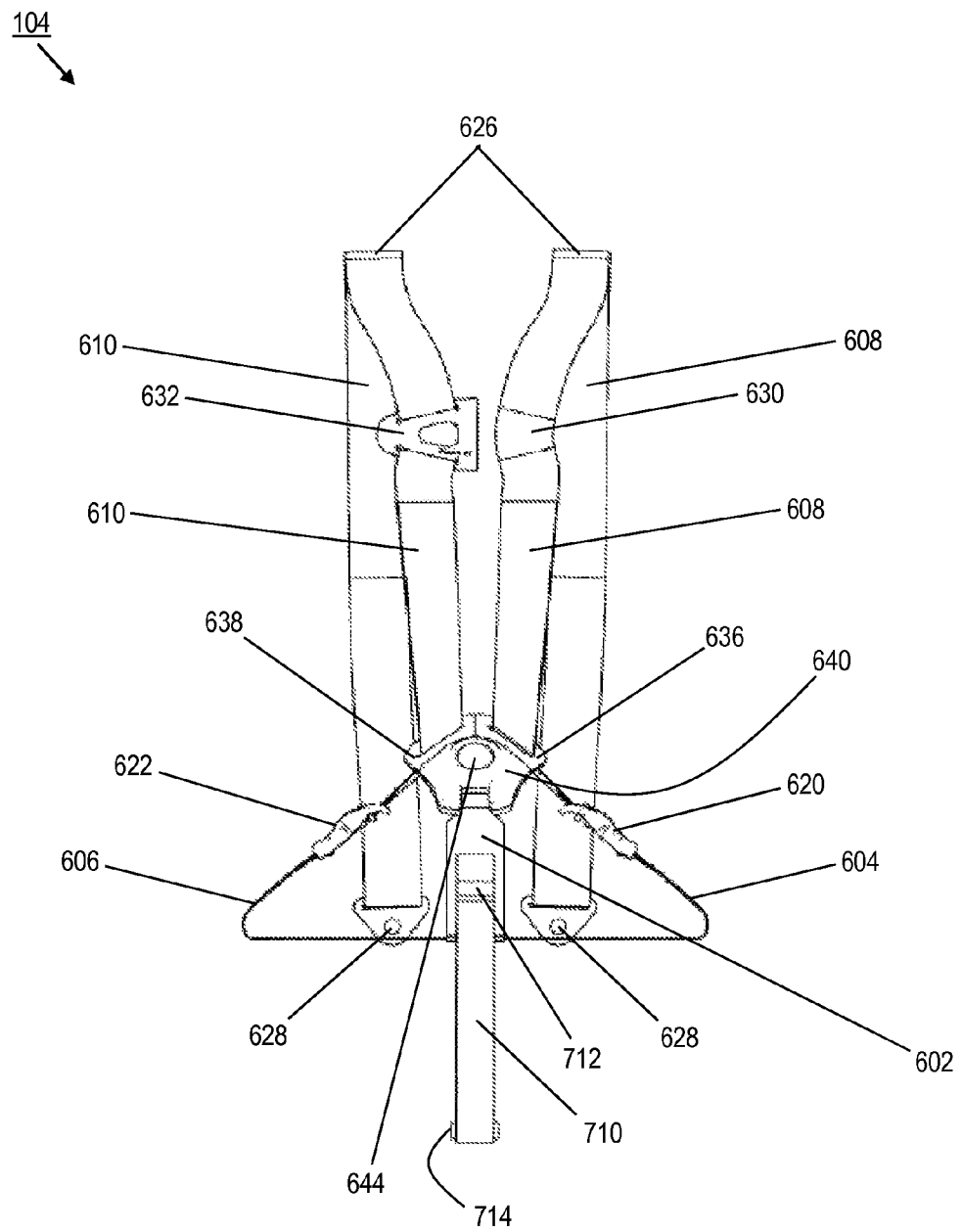
Figure 15C:
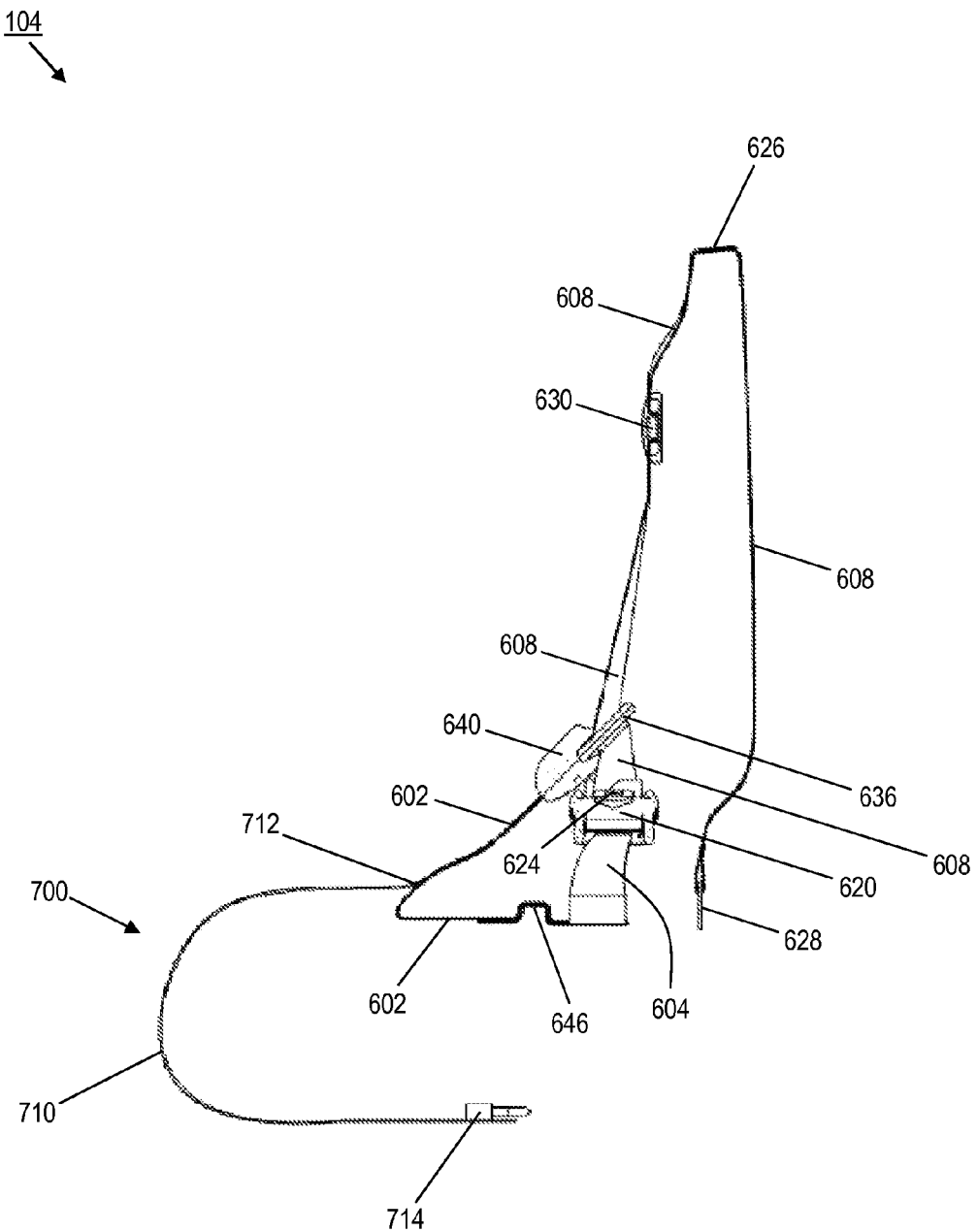

The restraining means 104 can be embodied by any structure sufficient to safely secure an occupant within the portable seat assembly 100. In addition to safely securing the occupant while in the expanded state, the restraining means 104 should also be sized and/or configured to readily stow or otherwise fit within the portable seat assembly 100 while in the collapsed state. In one exemplary embodiment, the restraining means 104 is a five-point harness, connected, fastened, joined, attached, or otherwise interfaced to the portable seat assembly 100, as shown in FIGS. 15A-15C. The general inventive concepts, however, contemplate other restraining means configurations including, for example, a two-point seat belt and a 3-point seat belt. In some exemplary embodiments, the restraining means may include, in whole or part, restraining structure integral to the vehicle in which the portable seat assembly 100 is currently mounted.

The restraining means 104 includes a middle lap belt 602, a left lap belt 604, a right lap belt 606, a left shoulder belt 608, and a right shoulder belt 610. In one exemplary embodiment, these belts (or webs, straps, or the like) are made of a fabric. Each of the belts has one or more ends that is attached, connected, fastened, joined, attached, anchored, interfaced, or the like (either directly or indirectly) to some part of the portable seat assembly 100.

For example, the left lap belt 604 and the right lap belt 606 each have one end that is formed integrally or otherwise connected to one another. The lap belts 604, 606 extend from this common end, such that the left lap belt 604 and the right lap belt 606 each pass through one of the slots 238 formed in the flanges 236 of the rigid seat insert 204, with the common end of the belts 604, 606 disposed on an under side of the rigid seat insert 204 (within the seat cover 202).

The other ends of the left lap belt 604 and the right lap belt 606, opposite the common end, terminate at a left holder 620 and a right holder 622, respectively. The left holder 620 receives and holds an end of the left shoulder belt 608, while the right holder 622 receives and holds an end of the right shoulder belt 610. The holders 620, 622 each include a release mechanism 624 that when depressed or otherwise activated, allows the ends of the belts 608, 610 to move further in or further out of the respective holders 620, 622. In this manner, a functional length of the left shoulder belt 608 and a functional length of the right shoulder belt 610 can be independently adjusted, which facilitates use of the portable seat assembly 100 for occupants of different shapes and sizes.

The other ends of the left shoulder belt 608 and the right shoulder belt 610 extend through the slots 414 of the upper rigid back insert 304. As noted above, the slots 414 have two or more different channels in which the belts 608, 610 could be positioned to further adjust the functional length of the left shoulder belt 608 and the functional length of the right shoulder belt 610, independently.

The ends of the belts 608, 610 passing through the slots 414 pass over the main body 420 of the support rod 306 secured to the upper rigid back insert 304 (see FIG. 16). In one exemplary embodiment, bends 626 are formed (e.g., sewn) in the belts 608, 610, at or near a location where the belts 608, 610 pass over the support rod 306. The ends of the belts 608, 610 then continue down the back side of the portable seat assembly 100 (within the back cover 302), where they are connected, fastened, joined, attached, or otherwise interfaced, respectively, to the connecting bracket 500 via connecting members (e.g., bolts, rivets) extending through the holes 504 in the connecting bracket 500 and corresponding holes 628 or the like in the ends of the belts 608, 610.

A left clasp member 630 is positioned on a portion of the left shoulder belt 608 located outside the back cover 302. A right clasp member 632 is positioned on a portion of the right shoulder belt 610 located outside the back cover 302. The left clasp member 630 and the right clasp member 632 are sized and/or shaped to releasably fasten to one another to prevent undesired movement of the belts 608, 610 with respect to an occupant and/or to further secure the occupant within the portable seat assembly 100. The left clasp member 630 and the right clasp member 632 are intended to be positioned approximately at an armpit level of the occupant. In one exemplary embodiment, the clasp members 630, 632 can be readily separated through manual force.

A left tongue member 636 is positioned on a portion of the left shoulder belt 608 located outside the back cover 302 and between the left clasp member 630 on the left shoulder belt 608 and the left holder 620 of the left lap belt 604. A right tongue member 638 is positioned on a portion of the right shoulder belt 610 located outside the back cover 302 and between the right clasp member 632 on the right shoulder belt 610 and the right holder 622 of the right lap belt 606. The tongue members 636, 638 are sized and/or shaped to fit in and be releasably held within a buckle 640 of the middle lap belt 602. The tongue members 636, 638 can move (e.g., slide) freely on the belts 608, 610 between the clasp members 630, 632 and the holders 620, 622, which further facilitates use of the portable seat assembly 100 for occupants of different shapes and sizes.

Furthermore, the middle lap belt 602 is connected, fastened, joined, attached, or otherwise interfaced (e.g., sewn) at one end to the common end of the lap belts 604, 606, thereby forming a tri-end 642 where the middle lap belt 602, the left lap belt 604, and the right lap belt 606 intersect. This tri-end 642 is disposed on an under side of the rigid seat insert 204 (within the seat cover 202). The middle lap belt 602 snakes through the H-shaped slot 232 and up out the T-shaped slot 234 of the rigid seat insert 204. In one exemplary embodiment, a hump 646 is formed (e.g., sewn) in the middle lap belt 602 at or near a location where the middle lap belt 602 extends through the H-shaped slot 232 of the rigid seat insert 204.

The buckle 640 of the middle lap belt 602 is disposed on an upper side of the rigid seat insert 204 and located outside the seat cover 202. The buckle 640 includes a release member in the form of a button 644. When the tongue members 636, 638 are held in (i.e., in locked engagement with) the buckle 640, activation (e.g., through manual pressure) of the button 644 allows the tongue members 636, 638 to be released from engagement with the buckle 640. In this manner, the occupant can be readily secured in and released from the restraining means of the portable seat assembly 100.

The interface between the middle lap belt 602, the left lap belt 604, and the right lap belt 606, as described herein, functions to keep each of the lap belts 602, 604, and 606 relatively fixed with respect to one another and the portable seat assembly 100. Thus, since the left shoulder belt 608 and the right shoulder belt 610 are fixed to the supporting means 102, when the belts 608, 610 interface with the belts 602, 604, and 606 at the buckle 640, the occupant is securely retained in the portable seat assembly 100. In particular, the restraining means 104 is configured such that the middle lap belt 602 extends between the legs of the occupant, the left lap belt 604 wraps or otherwise extends over the left leg of the occupant, the right lap belt 604 wraps or otherwise extends over the right leg of the occupant, the left shoulder belt 608 wraps or otherwise extends over the left shoulder of the occupant, and the right shoulder belt 610 wraps or otherwise extends over the right shoulder of the occupant.

The mounting means 106 can be embodied by any structure sufficient to mount, install, attach, or otherwise secure the portable seat assembly 100 (in the expanded state) to an installed seat (e.g., a factory seat) or related structure of a vehicle. As noted above, once so mounted, the portable seat assembly 100 can safely secure a child occupant within the vehicle.

Figure 17A:
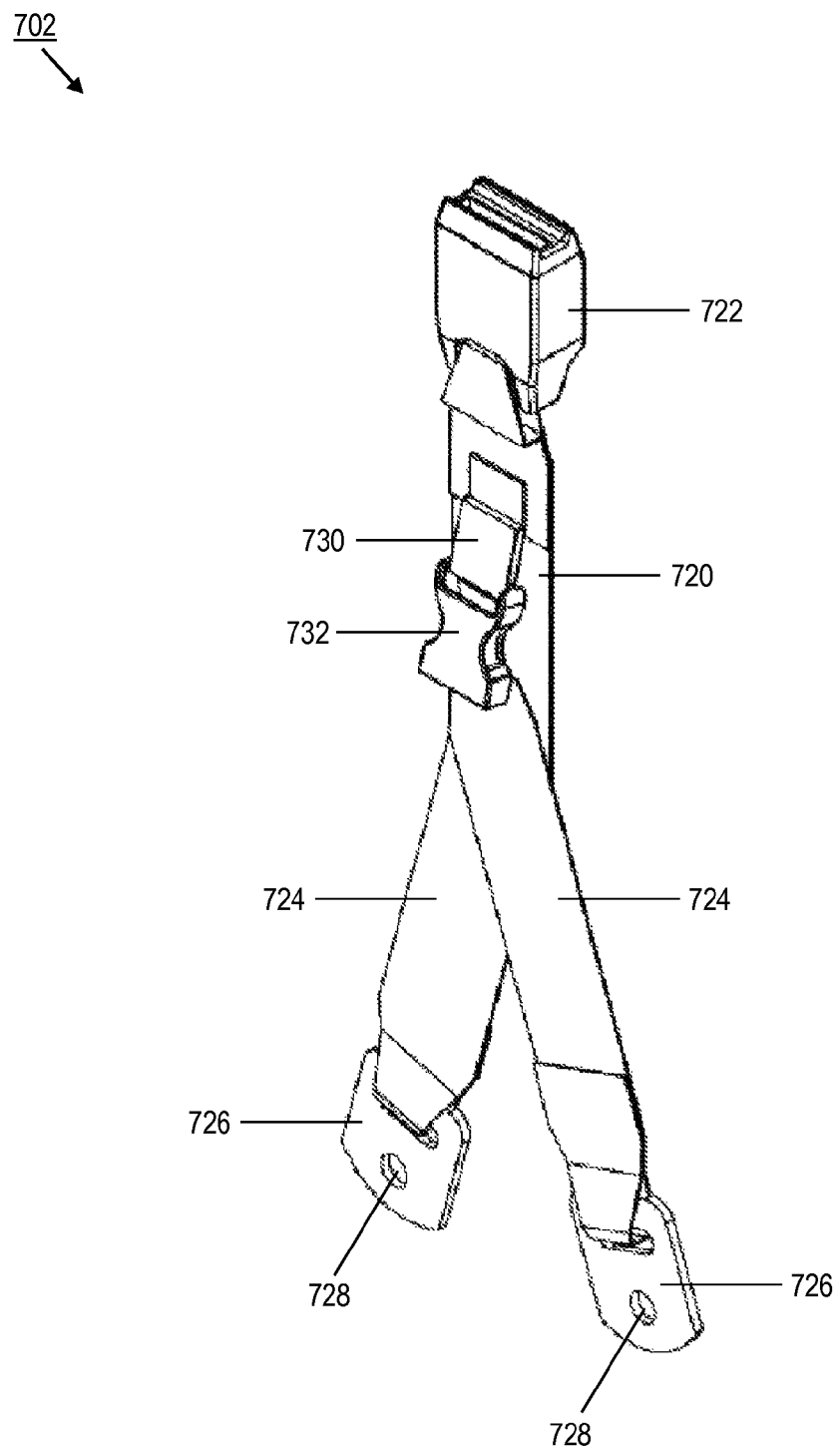
FIGS. 17A-17B show a lower mounting assembly, according to an exemplary embodiment, which is used in the portable seat assembly of FIG. 1.
Figure 17B:
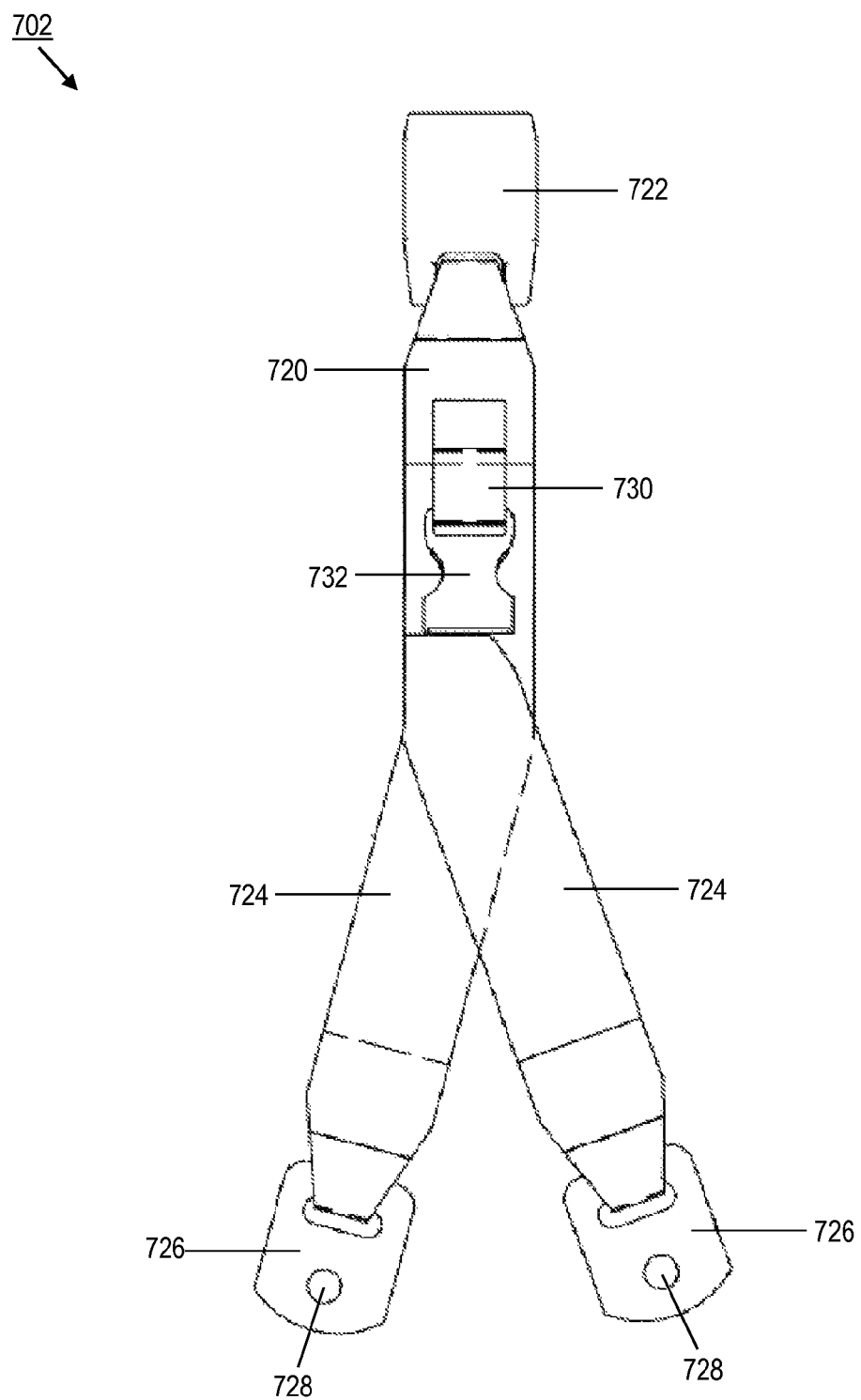
Figure 18A:
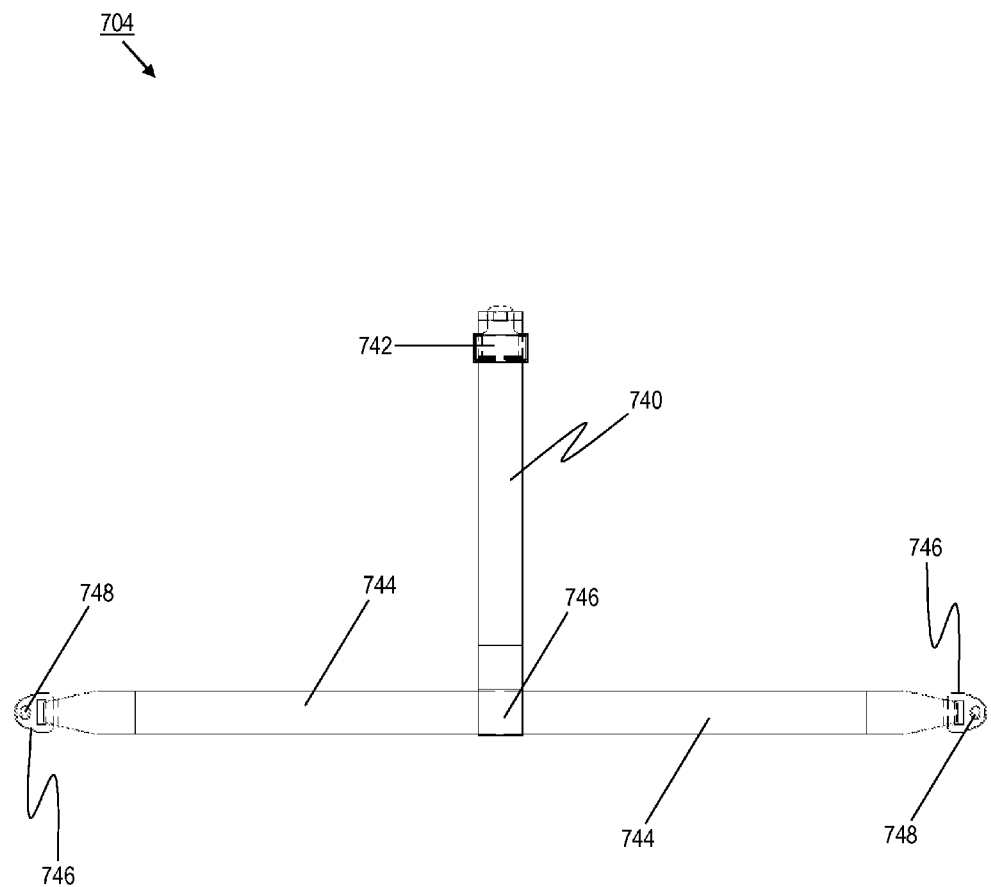
FIGS. 18A-18C show a rear mounting assembly, according to an exemplary embodiment, which is used in the portable seat assembly of FIG. 1.
Figure 18B:
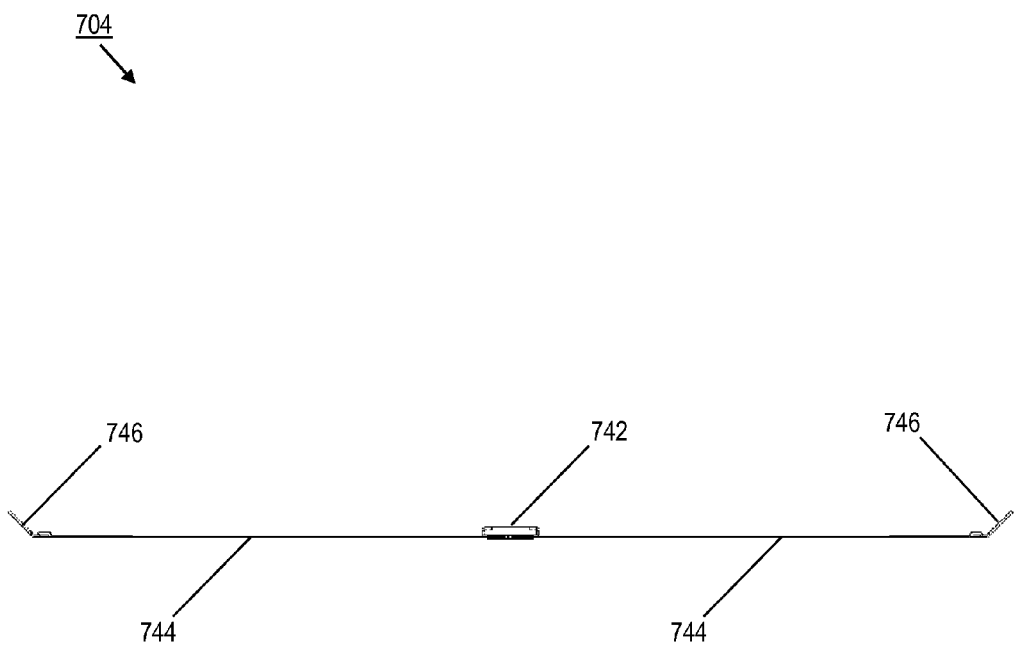
Figure 18C:
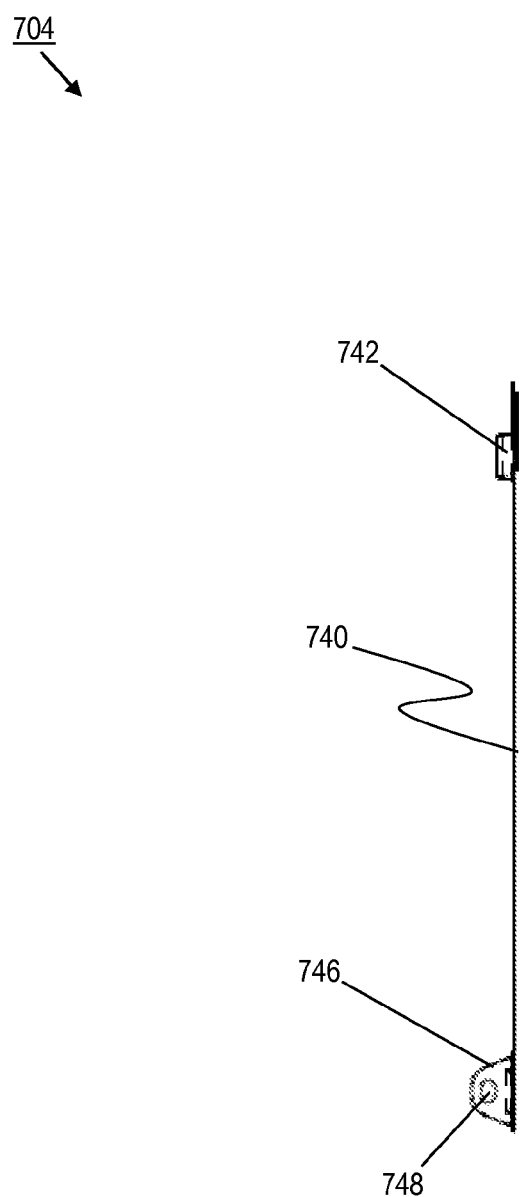

The mounting means 106 includes a front mounting assembly 700 (see FIGS. 15A-15C), a lower mounting assembly 702 (see FIGS. 17A-17B), and a rear mounting assembly 704 (see FIGS. 18A-18C).

The front mounting assembly 700 includes a front belt 710, web, strap, or the like. One end of the front belt 710 is connected, fastened, joined, attached, or otherwise interfaced (e.g., sewn) to the middle lap belt 602 of the restraining means 104, at an overlapping area 712. The other end of the front belt 710 ends in a front connector 714 (e.g., a tongue).

The lower mounting assembly 702 includes a main belt 720, web, strap, or the like. One end of the main belt 720 ends in a lower rear connector 722 (e.g., a buckle). The other end of the main belt 720 is connected, fastened, joined, attached, or otherwise interfaced (e.g., sewn) to two side straps 724. Each of the side straps 724 ends at a connector 726 including a hole 728. The holes 728 of the connectors 726 are operable to connect the lower mounting assembly 702 to the portable seat assembly 100. In particular, the holes 728 in the connectors 726 can be aligned with the corresponding holes 504 in the connecting bracket 500 so that fastening members (e.g., bolts, rivets) can be used to secure the lower mounting assembly 702 to the connecting bracket 500 (see FIG. 1D).

The lower mounting assembly 702 also includes a sub-belt 730, web, strap, or the like. One end of the sub-belt 730 ends in a lower front connector 732 (e.g., a buckle). The other end of the sub-belt 730 is connected, fastened, joined, attached, or otherwise interfaced (e.g., sewn) to the main strap 720.

The rear mounting assembly 704 includes a main belt 740, web, strap, or the like. One end of the main belt 740 ends in a rear connector 742 (e.g., a tongue). The other end of the main belt 720 is connected, fastened, joined, attached, or otherwise interfaced (e.g., sewn) to two side straps 744, at an overlapping area 746. Each of the side straps 744 ends at a connector 746 including a hole 748. The holes 748 of the connectors 726 are operable to connect the rear mounting assembly 704 to the portable seat assembly 100. In particular, the holes 748 in the connectors 746 can be aligned with the corresponding holes 412 in the upper rigid back insert 304 so that fastening members (e.g., bolts, rivets) can be used to secure the rear mounting assembly 704 to the back portion 300 of the portable seat assembly 100 (see FIG. 1D).

In another exemplary embodiment, the mounting means 106 is replaced by or augmented with an alternative mounting means adapted to interface with one or more latch brackets or similar structure predisposed within the vehicle.

Figure 22:
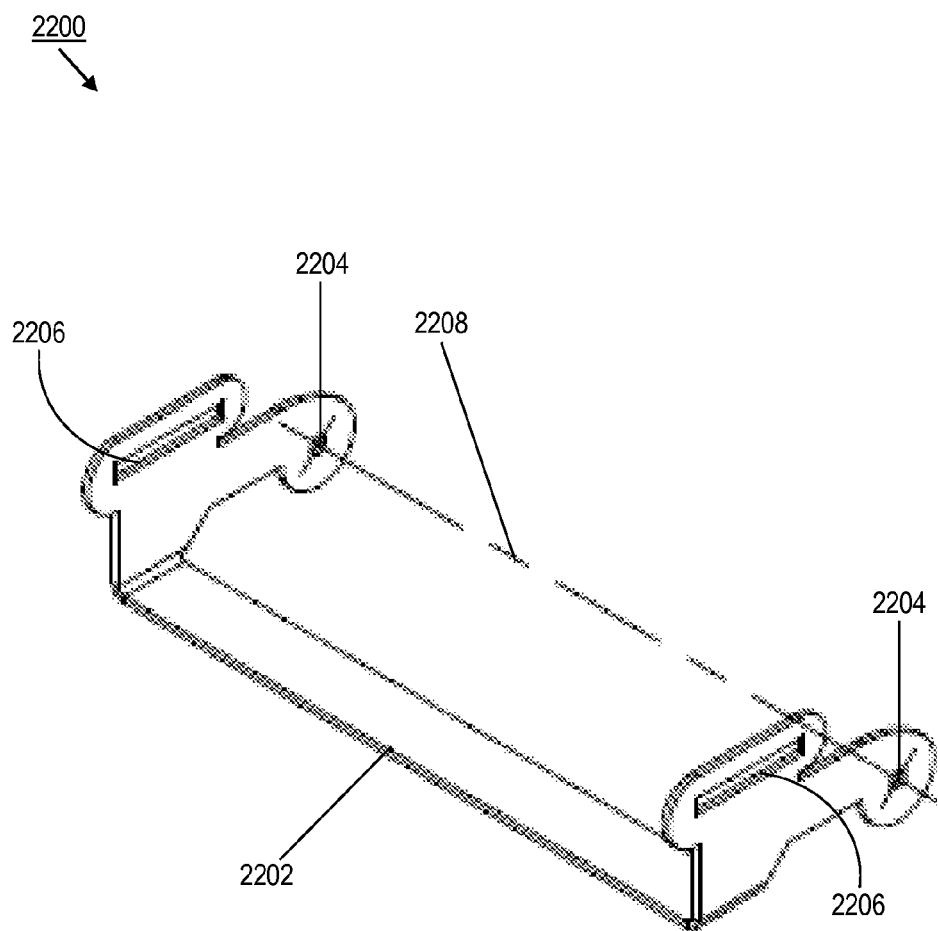
FIG. 22 is a perspective view of an alternative mounting means, according to an exemplary embodiment, in the form of a belt receptacle.

In yet another exemplary embodiment, the mounting means 106 is replaced by or augmented with an alternative mounting means, such as a belt receptacle 2200, which is secured or otherwise interfaced with the portable seat assembly 100. As shown in FIG. 22, the belt receptacle 2200 includes a body 2202 having a flanged member extending from each end of the body 2202 and substantially perpendicular thereto. The flanged members extend up along opposite sides of the seat portion 200 of the portable seat assembly 100. Each flanged member includes a connecting aperture 2204 and a belt opening 2206. The connecting apertures 2204 are used to secure, connect, or otherwise interface the belt receptacle 2200 to the portable seat assembly 100. In particular, the connecting apertures 2204 of the belt receptacle 2200 can be aligned along a connecting axis 2208 (e.g., the axis 520) with the corresponding holes 510 in the flat flanges 508 of the connecting bracket 500 and the corresponding holes 240 in the flanges 236 of the rigid seat insert 204 so that fastening members (e.g., bolts, rivets) can be used to secure the belt receptacle 2200 to both the connecting bracket 500 and the rigid seat insert 204 of the portable seat assembly 100.

Once secured to the portable seat assembly 100, the belt receptacle 2200 can be used to mount the portable seat assembly 100 to a seat of a vehicle in which the mounting means 106 would not work or not work as well. For example, use of the belt receptacle 2200 may work better to secure the portable seat assembly 100 to a seat in an airplane. In this regard, the portable seat assembly 100 is placed on the airplane seat and a belt assembly, such as a belt assembly associated with the airplane seat or a belt assembly of the portable seat assembly 100, passes through the belt openings 2206 and engage to secure the portable seat assembly 100 to the airplane seat.

Figure 19A:
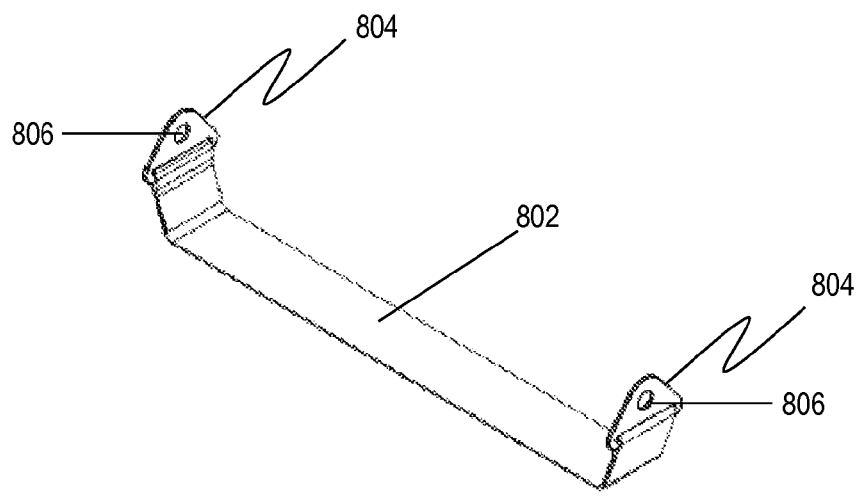
FIGS. 19A-19C show a carrying strap, according to an exemplary embodiment, which is used in the portable seat assembly of FIG. 1.
Figure 19B:
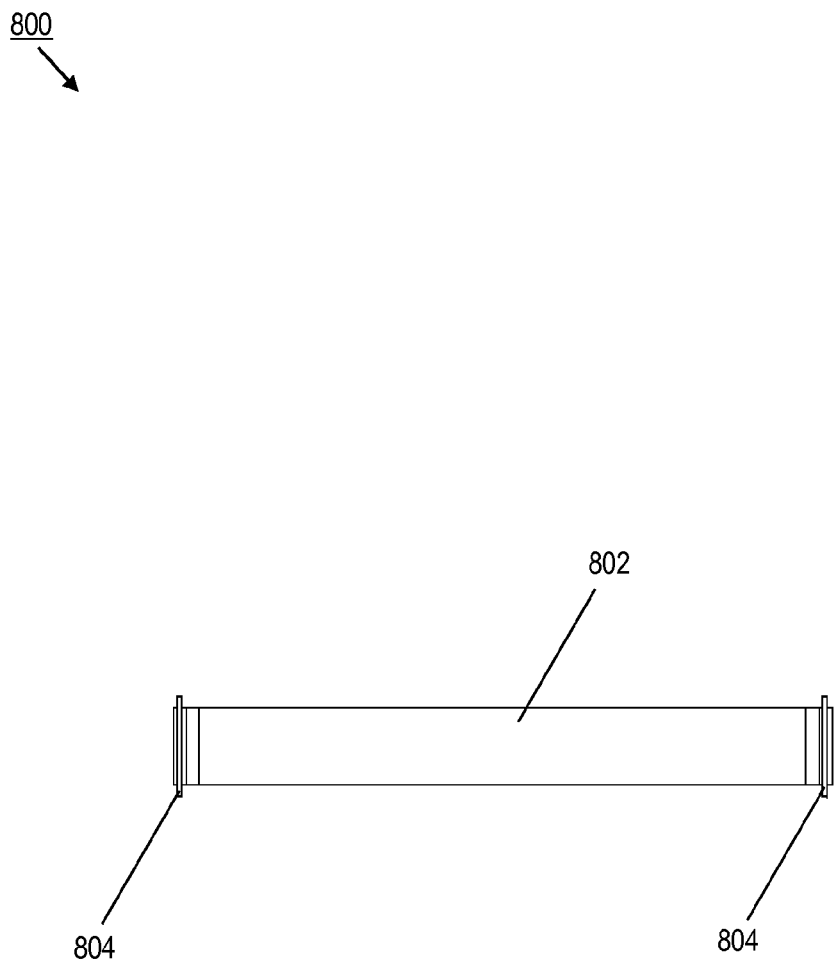
Figure 19C:
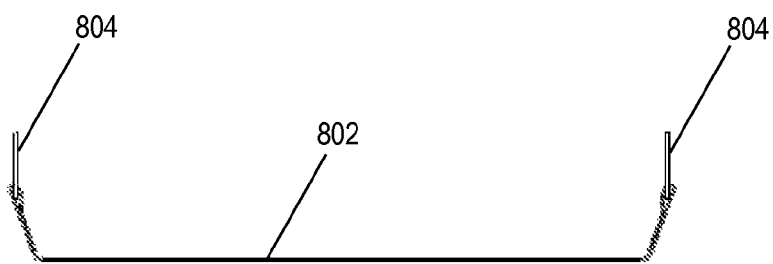

The portable seat assembly 100 also includes a carrying strap 800 (see FIGS. 19A-19C). The carrying strap 800 facilitates transport of the portable seat assembly 100 (in its collapsed state) by a user. The carrying strap 800 includes a strap 802, belt, web, or the like. Each end of the strap 802 is connected, fastened, joined, attached, or otherwise interfaced (e.g., sewn) to a connector 804 including a hole 806. The holes 806 of the connectors 804 are operable to connect the carrying strap 800 to the portable seat assembly 100. In particular, the holes 806 in the connectors 804 can be aligned with the corresponding holes 510 in the flat flanges 508 of the connecting bracket 500 and the corresponding holes 240 in the flanges 236 of the rigid seat insert 204 so that fastening members (e.g., bolts, rivets) can be used to secure the carrying strap 800 to both the connecting bracket 500 and the rigid seat insert 204 of the portable seat assembly 100 (see FIGS. 14A-14B).

Figure 20A:
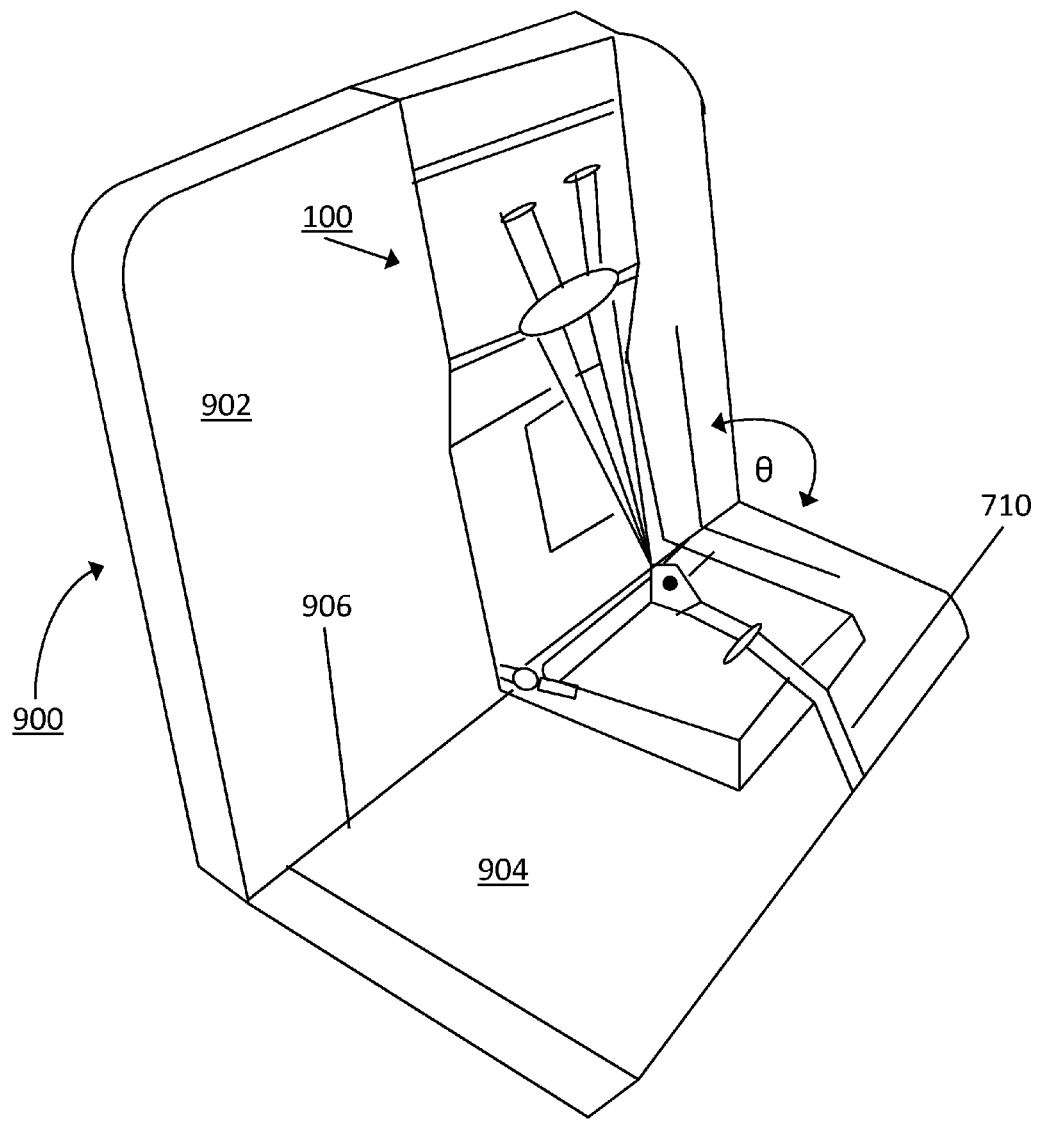
FIGS. 20A-20C are images showing the portable seat assembly of FIG. 1 being mounted on a vehicle seat, according to an exemplary embodiment.
Figure 20B:
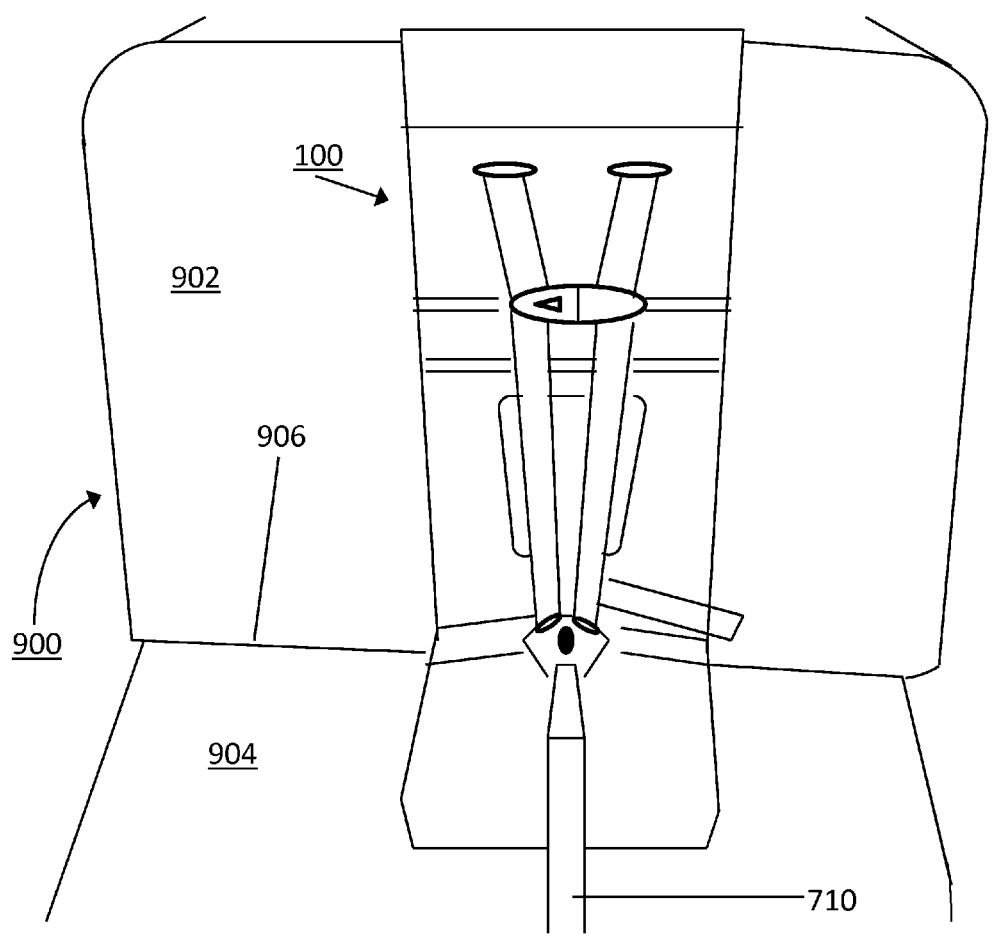
Figure 20C:
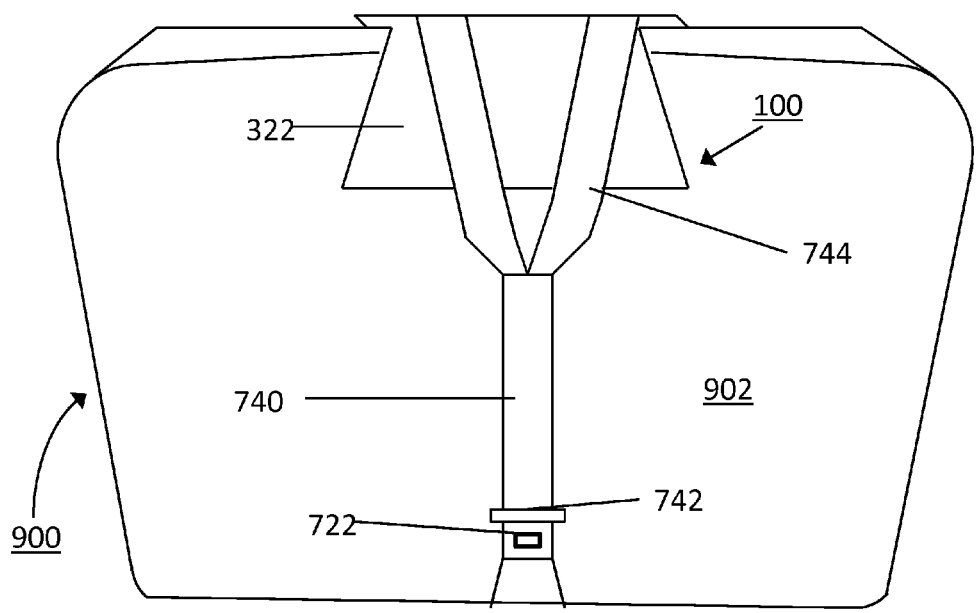

To mount the portable seat assembly 100 in its expanded state, the portable seat assembly 100 is first placed on a vehicle seat 900 (see FIGS. 20A-20C). In this manner, the seat portion 200 and the back portion 300 of the portable seat assembly 100 are positioned on the vehicle seat such that an angle θ is formed between the seat portion 200 and the back portion 300 (see FIG. 20A). In one exemplary embodiment, the angle θ is between 85° and 95°. In one exemplary embodiment, the angle θ is 90°. In one exemplary embodiment, the angle θ is greater than 90°. The portable seat assembly 100 is mounted to the vehicle seat 900, as described below, such that the angle θ is substantially fixed. As a result, the portable seat assembly 100 in the expanded state contours to or otherwise fits against the vehicle seat on which it is being mounted (e.g., the vehicle seat 900) and provides a stable seating surface for its occupant.

In one exemplary embodiment, the vehicle seat 900 is a bench-type seat (e.g., a bus seat) that includes a seat back 902 and a seat base 904. A seat opening 906 is formed where the seat back 902 and the seat base 904 meet (see FIGS. 20A-20B).

When the portable seat assembly 100 is placed on the vehicle seat 900, the lower mounting assembly 702 is forced down into the seat opening 906 between the seat back 902 and the seat base 904, such that at least the lower rear connector 722 and the lower front connector 732 of the lower mounting assembly 702 are disposed below the vehicle seat 900. It may require application of manual force to insert the lower mounting assembly 702 through the seat opening 906.

Thereafter, the portable seat assembly 100 is placed on the vehicle seat 900 such that the back portion 300 of the portable seat assembly 100 leans against or otherwise abuts the seat back 902 of the vehicle seat 900. The upper flap 322 of the back portion 300 extends over and wraps around the top of the seat back 902 (see FIG. 20C). Likewise, the rear mounting assembly 704 extends over and wraps around the top of the seat back 902. Thus, the upper flap 322 and the rear mounting assembly 704 initially assist in holding the back portion 300 of the portable seat assembly 100 in an upright position against the seat back 902. With the rear mounting assembly 704 extending down the back of the seat back 902, the rear connector 742 of the main belt 740 of the rear mounting assembly 704 can engage or otherwise interface with the rear connector 722 of the main belt 720 of the lower mounting assembly 702 (see FIG. 20C). Depending on the dimensions of the vehicle seat 900, the connectors 742 and 722 may engage one another behind the vehicle seat 900 or below the vehicle seat 900.

Additionally, when the portable seat assembly 100 is placed on the vehicle seat 900, the seat portion 200 of the portable seat assembly 100 rests on the seat base 904. As a result, the front mounting assembly 700 extends over a front of the seat base 904 of the vehicle seat 900 (see FIGS. 20A-20B). In particular, the front belt 710 wraps around the front of the seat base 904 and under the vehicle seat 900. In this manner, the front connector 714 of the front belt 710 of the front mounting assembly 700 can engage or otherwise interface with the lower front connector 732 of the of the sub-belt 730 of the lower mounting assembly 702. Typically, the connectors 714 and 732 will engage one another below the vehicle seat 900.

With the connectors 742 and 722 engaged with one another and the connectors 714 and 732 engaged with one another, the portable seat assembly 100 is securely mounted on or otherwise fastened to the vehicle seat 900.

The portable seat assembly 100 can be readily dismounted from the vehicle seat 900 or other structure at any time by reversing these steps. In particular, the portable seat assembly 100 can be dismounted from the vehicle seat 900 by disengaging the connectors 742 and 722 from one another and disengaging the connectors 714 and 732 from one another.

Thereafter, to place the seat in the collapsed state from the expanded state, the portable seat assembly 100 in the expanded state is manually folded or otherwise manipulated to assume the collapsed state. As an initial matter, the restraining means 104 and the mounting means 106 are situated such that they will be substantially housed inside the portable seat assembly 100 in the collapsed state.

Figure 3:
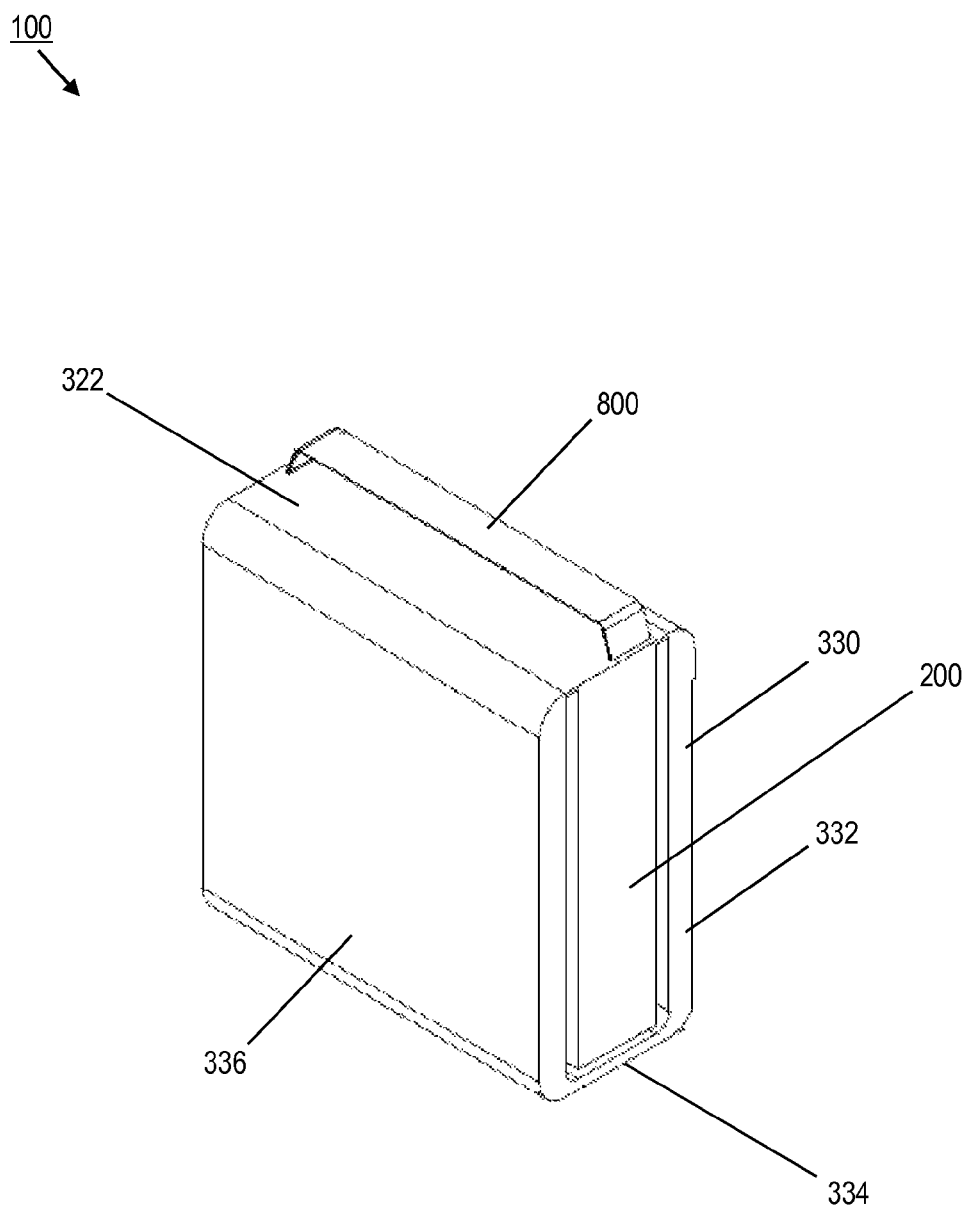
FIG. 3 is a perspective view of the portable seat assembly of FIG. 1, wherein the portable seat assembly is in a collapsed state.
Figure 4A:
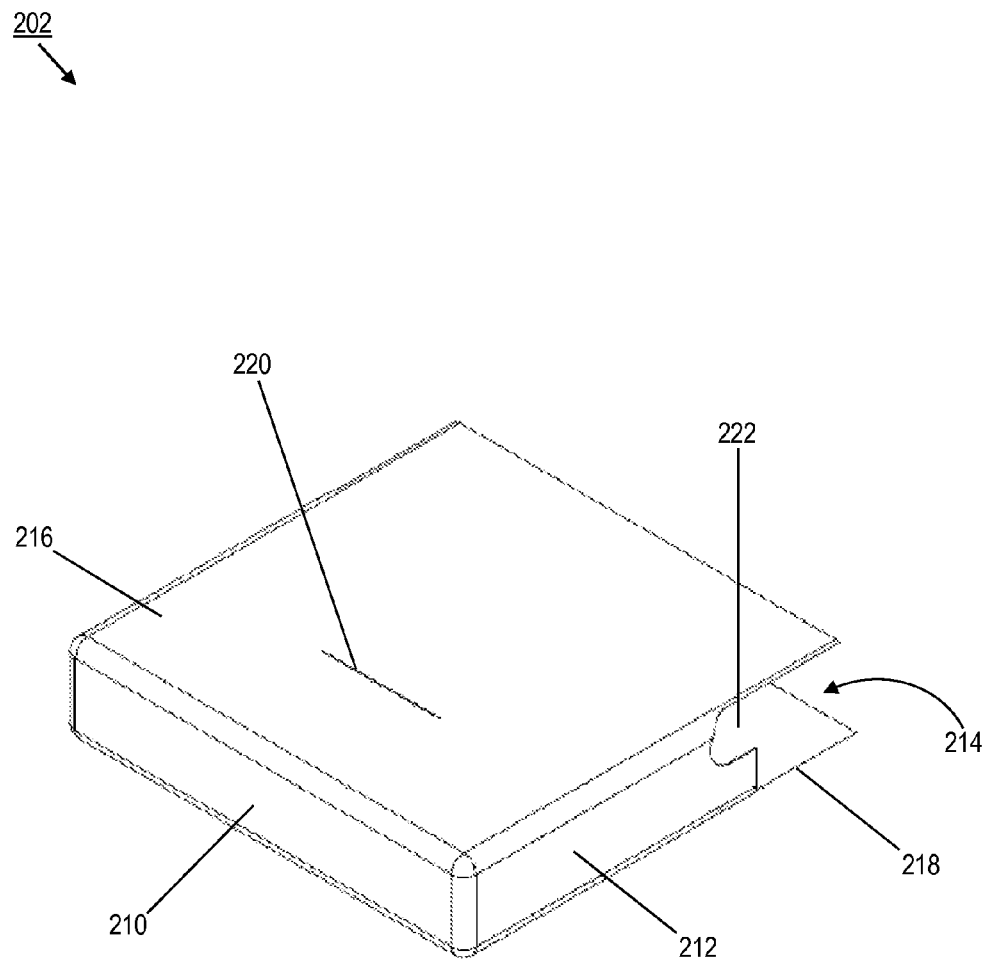
FIGS. 4A-4D show a seat cover, according to an exemplary embodiment, which is used in the portable seat assembly of FIG. 1.
Figure 4B:
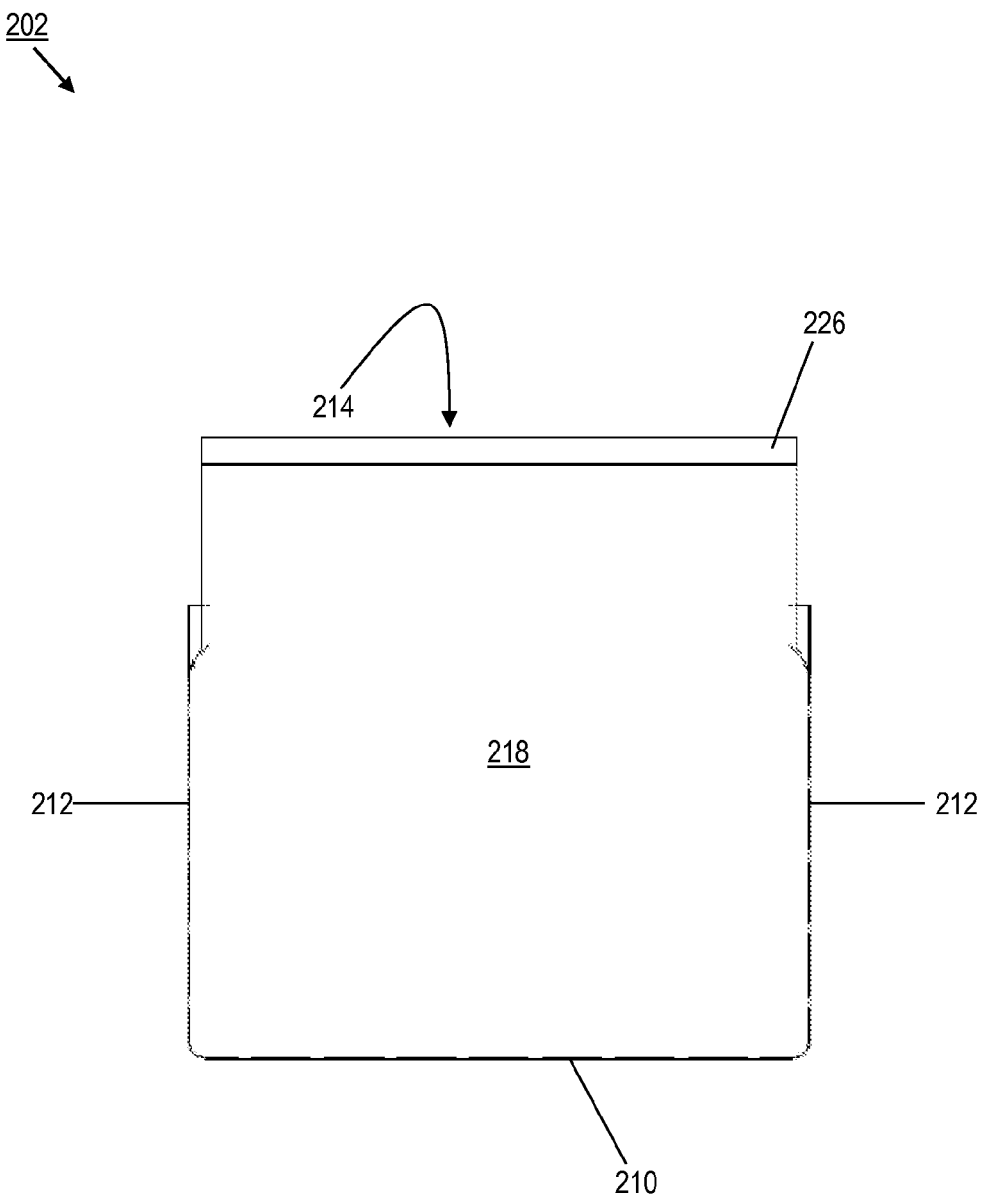
Figure 4C:
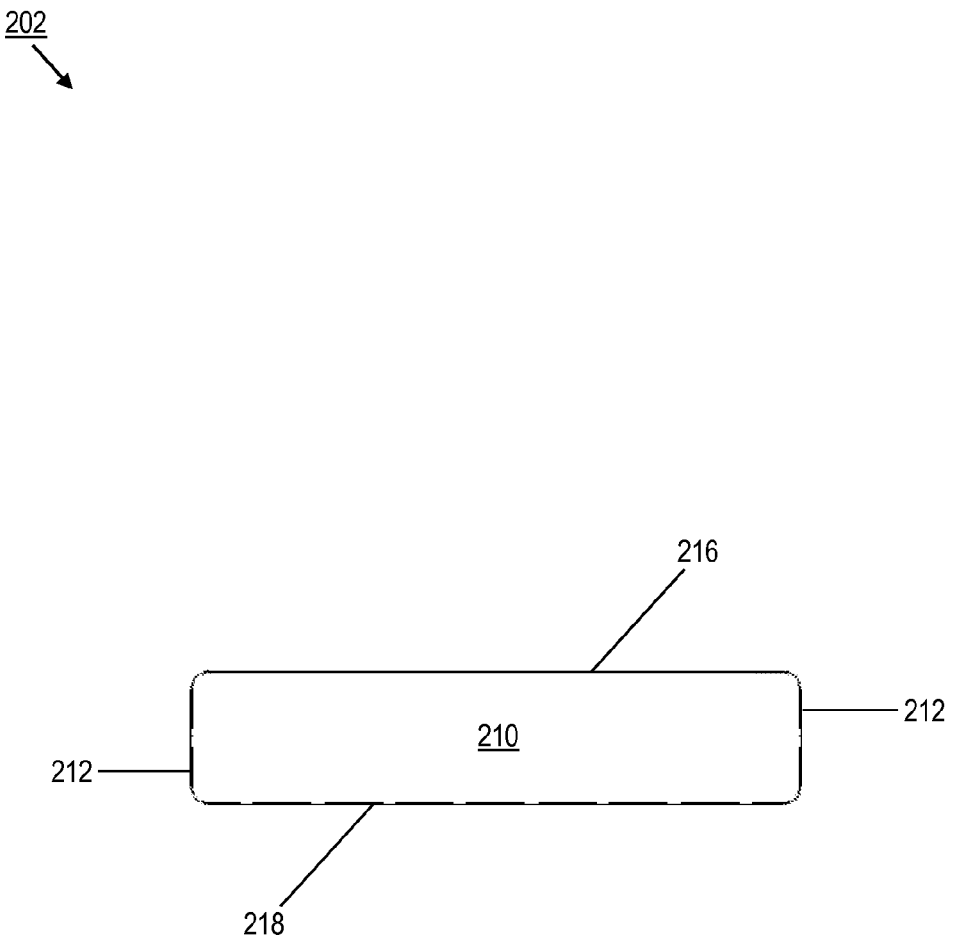
Figure 4D:
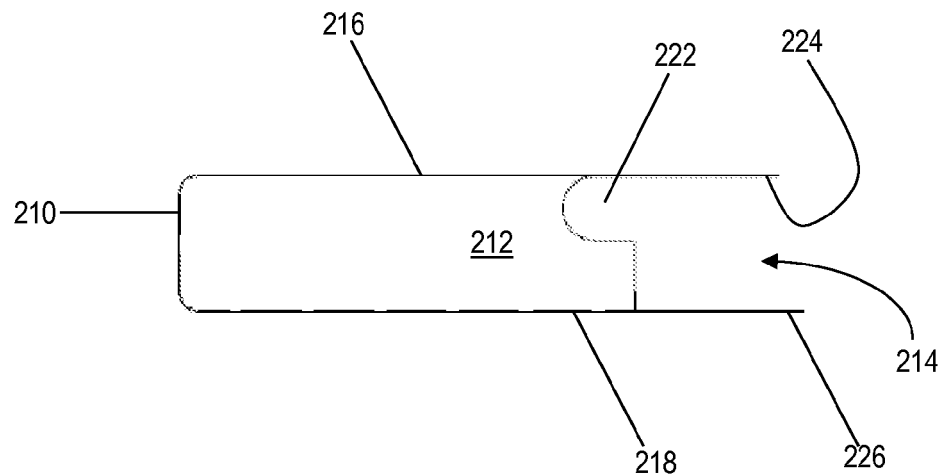
Figure 5A:
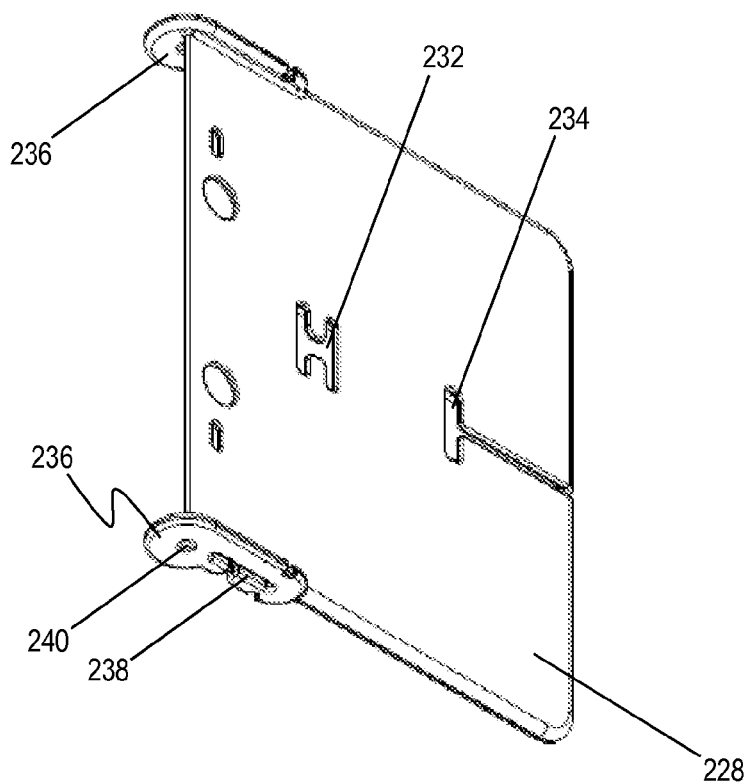
FIGS. 5A-5D show a rigid seat insert, according to an exemplary embodiment, which is used in the portable seat assembly of FIG. 1.
Figure 5B:
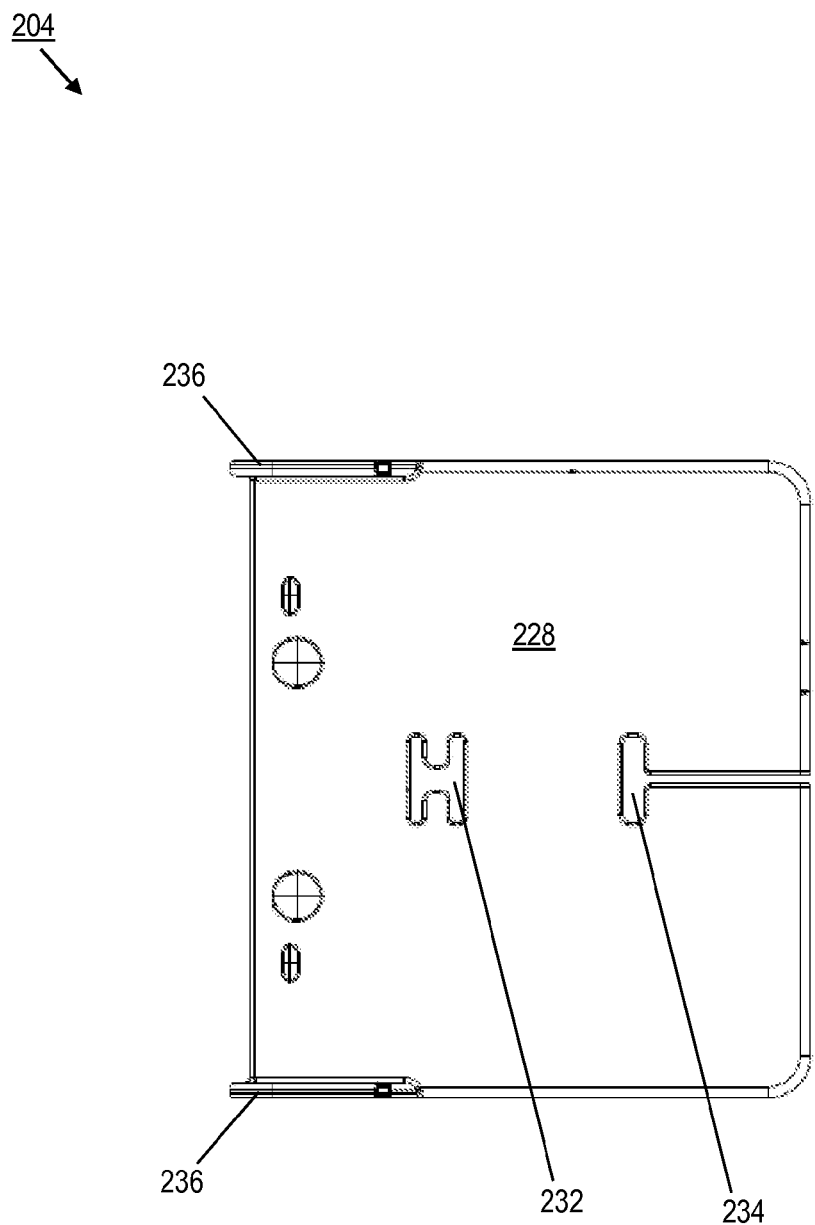
Figure 5C:
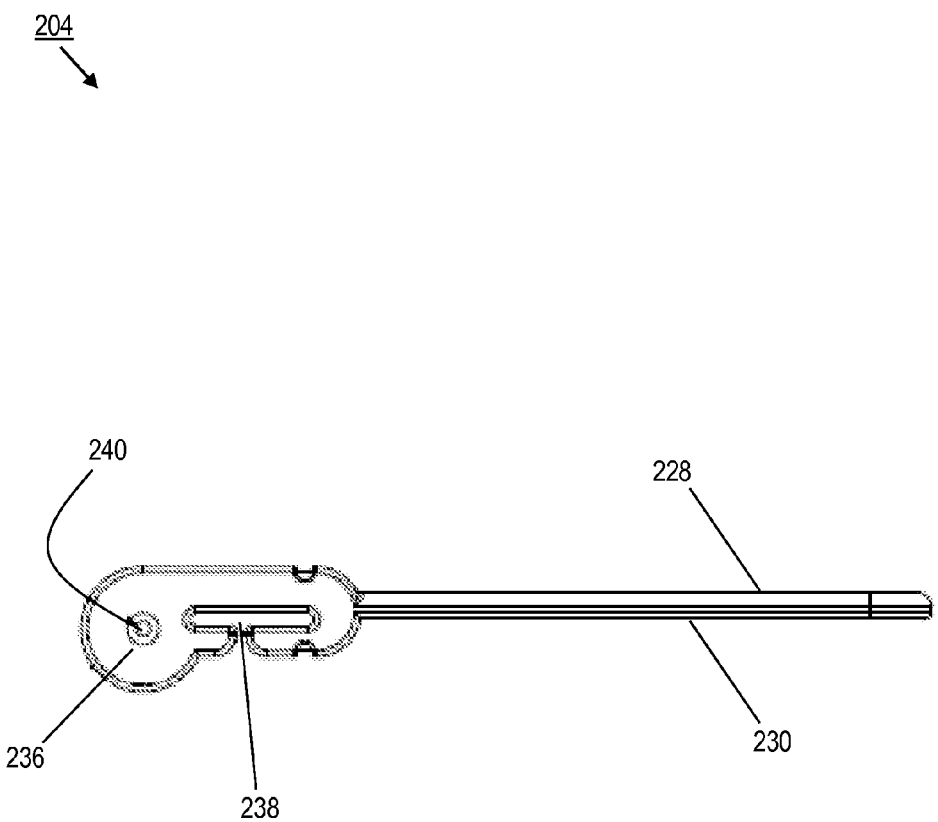
Figure 5D:
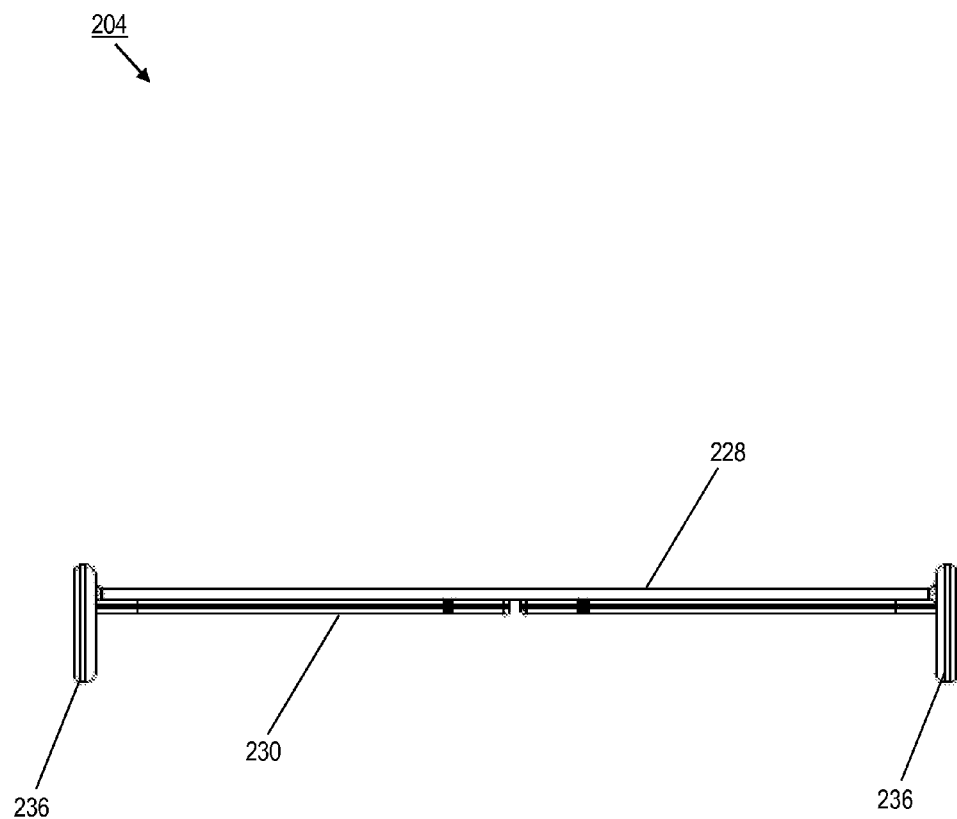
Figure 21:
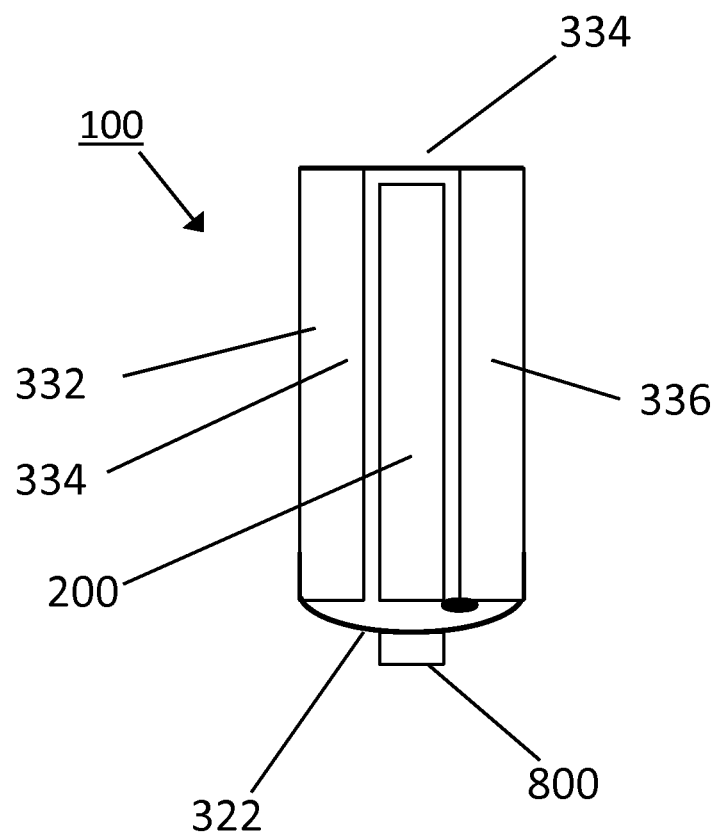
FIG. 21 is an image showing a perspective view of the portable seat assembly of FIG. 1, wherein the portable seat assembly is in a collapsed state.

For example, as shown in FIGS. 3 and 21, the seat portion 200 is folded upward (about the axis 520) so that it abuts or is otherwise adjacent to the lower compartment 336 of the back portion 300. Once the seat portion 200 is folded up, the seat portion 200 and the lower compartment 336 are substantially parallel to one another. Additionally, portions of the restraining means 104 and the mounting means 106 can be held between the seat portion 200 and the lower compartment 336.

Next, the lower middle compartment 334 of the back portion 300 is folded over the front of the seat portion 200, such that the lower middle compartment 334 abuts or is otherwise adjacent to the front of the seat portion 200. Then, the upper compartment 330 and the upper middle compartment 332 of the back portion 300 are folded as a unit to abut or otherwise be adjacent to the seat portion 200. Once the upper compartment 330 and the upper middle compartment 332 are folded up, the upper compartment 330 and the upper middle compartment 332 are each substantially parallel to the seat portion 200.

Finally, the upper flap 322 of the back portion 300 is folded over the rear of the seat portion 200, such that the upper flap 322 abuts or is otherwise adjacent to the rear of the seat portion 200. Portions of the upper flap 322 may also abut or otherwise be adjacent to other portions of the seat portion 200. As shown in FIG. 21, the upper flap 322 can be fed through the carrying strap 800 so that the carrying strap 800 remains fully functional. The upper flap connector 324 attaches to the rear wall connector 326 on the rear wall 316 of the back cover 302 to secure the portable seat assembly in the collapsed state.

In the collapsed state, the portable seat assembly 100 forms a relatively compact profile. In one exemplary embodiment, the portable seat assembly 100 has dimensions of approximately 5.88 in. by 13.00 in. by 13.50 in. (width/length/height), when in the collapsed state. In one exemplary embodiment, the portable seat assembly 100 has a width of less than 6 in., when in the collapsed state. In one exemplary embodiment, the portable seat assembly 100 has a length of less than 14 in., when in the collapsed state. In one exemplary embodiment, the portable seat assembly 100 has a height of less than 14 in., when in the collapsed state.

The above description of specific embodiments has been given by way of example. From the disclosure given, those skilled in the art will not only understand the general inventive concepts and their attendant advantages, but will also find apparent various changes and modifications to the systems and methods disclosed.

Figure 23:
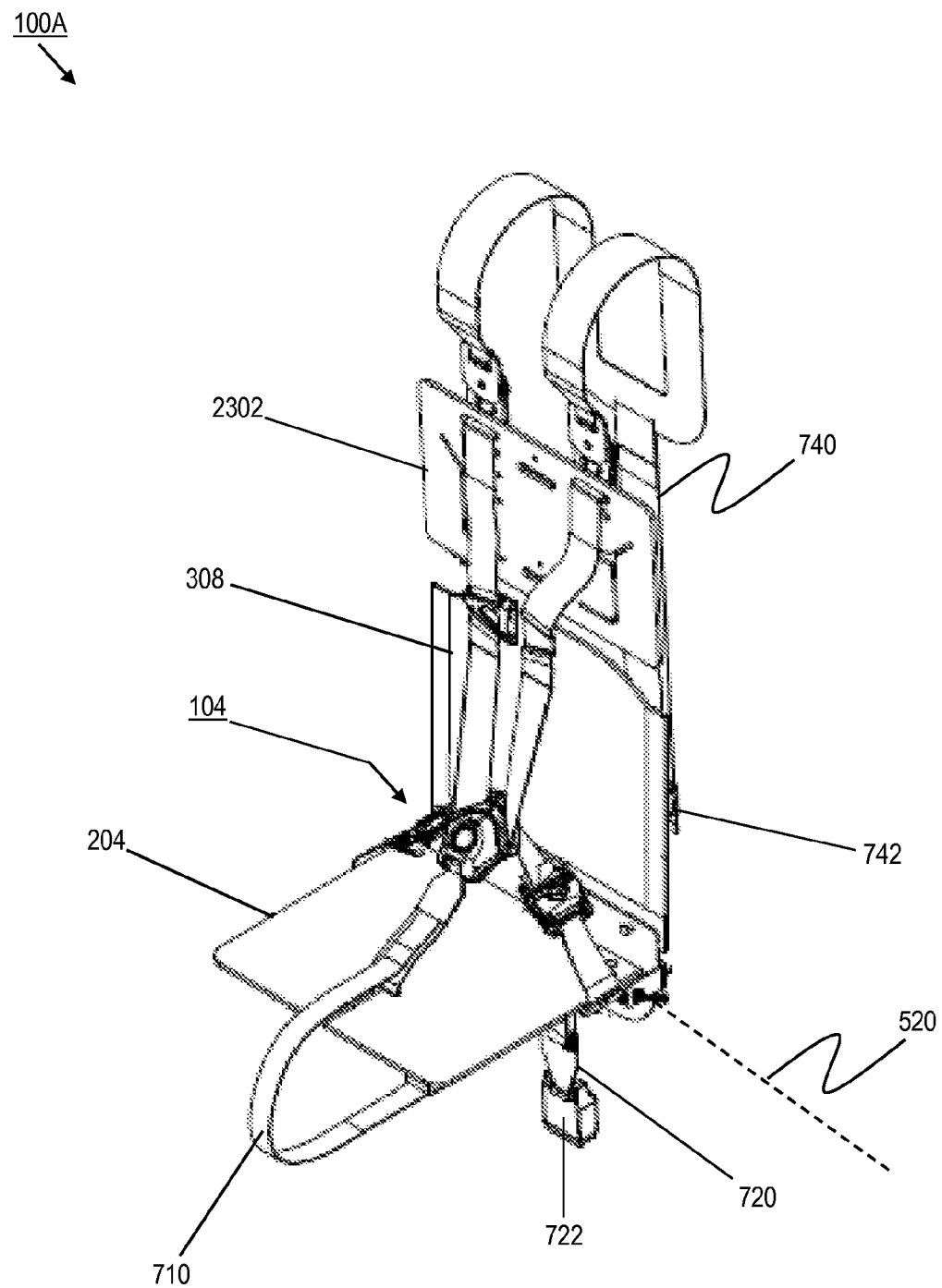
FIG. 23 is a partial perspective view of a portable seat assembly, according to an alternative exemplary embodiment, wherein a support rod is not utilized.

For example, an alternative portable seat assembly 100A, as shown in FIG. 23, is encompassed by the general inventive concepts. The portable seat assembly 100A includes an upper rigid back insert 2302 that is sufficiently strong to function without the need for any external support member such as the support rod 306 described above.

It is sought, therefore, to cover this and all other such changes and modifications as fall within the spirit and scope of the general inventive concepts, as described and claimed herein, and any equivalents thereof.

The invention claimed is:

1. A seat assembly operable to selectively assume one of an expanded state and a collapsed state, the seat assembly comprising:
   a seat portion; and
   a back portion including a lower part and an upper part,
   wherein the seat portion includes a bottom surface for resting on a mounting surface;
   wherein the seat portion includes a top surface opposite the bottom surface;
   wherein the upper part of the back portion includes a first side and a second side opposite the first side;
   wherein the lower part of the back portion includes a first side and a second side opposite the first side;
   wherein the seat portion and the back portion are pivotably connected to one another,
   wherein the seat portion and the back portion are positioned relative to one another in the expanded state such that an angle θ is formed between the seat portion and the lower and upper parts of the back portion, and
   wherein the seat portion and the back portion are positioned relative to one another in the collapsed state such that: (i) the bottom surface of the seat portion is aligned with and abuts one of the first side and the second side of the upper part of the back portion; and (ii) the top surface of the seat portion is aligned with and abuts one of the first side and the second side of the lower part of the back portion.

2. The seat assembly of claim 1, further comprising mounting means for securing the seat assembly to fixed structure within a vehicle.

3. The seat assembly of claim 2, wherein the fixed structure is a seat of the vehicle.

4. The seat assembly of claim 3, wherein the seat of the vehicle includes a seat base and a seat back, and
   wherein an opening is formed where the seat base abuts the seat back.

5. The seat assembly of claim 4, wherein the mounting means interfaces with at least one of the seat base, the seat back, and the opening.

6. The seat assembly of claim 4, wherein the mounting means includes a front mount assembly, a lower mount assembly, and a rear mount assembly, wherein the lower mount assembly extends through the opening between the seat base and the seat back, wherein the front mount assembly wraps around the seat base and interfaces with the lower mount assembly, and wherein the rear mount assembly wraps around the seat back and interfaces with the lower mount assembly.

7. The seat assembly of claim 2, wherein when the seat assembly is mounted to the fixed structure, the angle $\theta$ is substantially fixed.

\* \* \* \* \*